(12) United States Patent
Ogawa

(10) Patent No.: US 8,547,438 B2
(45) Date of Patent: Oct. 1, 2013

(54) APPARATUS, METHOD AND PROGRAM FOR RECOGNIZING AN OBJECT IN AN IMAGE

(75) Inventor: Kaname Ogawa, Kanagawa (JP)

(73) Assignee: Sony Corporation (JP)

(*) Notice: Subject to any disclaimer, the term of this patent is extended or adjusted under 35 U.S.C. 154(b) by 886 days.

(21) Appl. No.: 12/655,790

(22) Filed: Jan. 7, 2010

(65) Prior Publication Data
US 2010/0177206 A1 Jul. 15, 2010

(30) Foreign Application Priority Data

Jan. 9, 2009 (JP) .................. P2009-003869

(51) Int. Cl.
H04N 5/225 (2006.01)
H04N 5/228 (2006.01)
G06K 9/46 (2006.01)
G06K 9/66 (2006.01)

(52) U.S. Cl.
USPC .................. 348/169; 348/222.1; 382/190

(58) Field of Classification Search
None
See application file for complete search history.

(56) References Cited

U.S. PATENT DOCUMENTS

| 2001/0040985 | A1* | 11/2001 | Okano et al. | 382/117 |
| 2002/0191818 | A1* | 12/2002 | Matsuo et al. | 382/118 |
| 2006/0177110 | A1* | 8/2006 | Imagawa et al. | 382/118 |
| 2007/0086660 | A1 | 4/2007 | Ai et al. | |
| 2008/0304749 | A1* | 12/2008 | Ogawa | 382/190 |

FOREIGN PATENT DOCUMENTS

| JP | 2006031387 A | 2/2006 |
| JP | 2006350704 A | 12/2006 |
| JP | 2007-109229 A | 4/2007 |
| JP | 2008305342 A | 12/2008 |

OTHER PUBLICATIONS

Office Action from Japanese Application No. 2009-003869, dated Dec. 7, 2010.

* cited by examiner

Primary Examiner — Justin P Misleh
(74) Attorney, Agent, or Firm — Lerner, David, Littenberg, Krumholz & Mentlik, LLP

(57) ABSTRACT

An object detecting apparatus includes an evaluation information storage unit that stores evaluation information used for computing an evaluation value for each of a plurality of objects, where the evaluation value is used for evaluating which one of the objects is contained in an image, a determination information storage unit that stores determination information used for determining whether the object is contained in an image in association with each of the objects, a computing unit that computes the evaluation value for each of the objects by extracting features from a plurality of areas of the image using the evaluation information and comparing two of the extracted features, and a determination unit that determines whether the object is contained in the image using the determination information associated with the object relating to the evaluation value that satisfies a predetermined condition among the evaluation values computed for the objects.

14 Claims, 37 Drawing Sheets

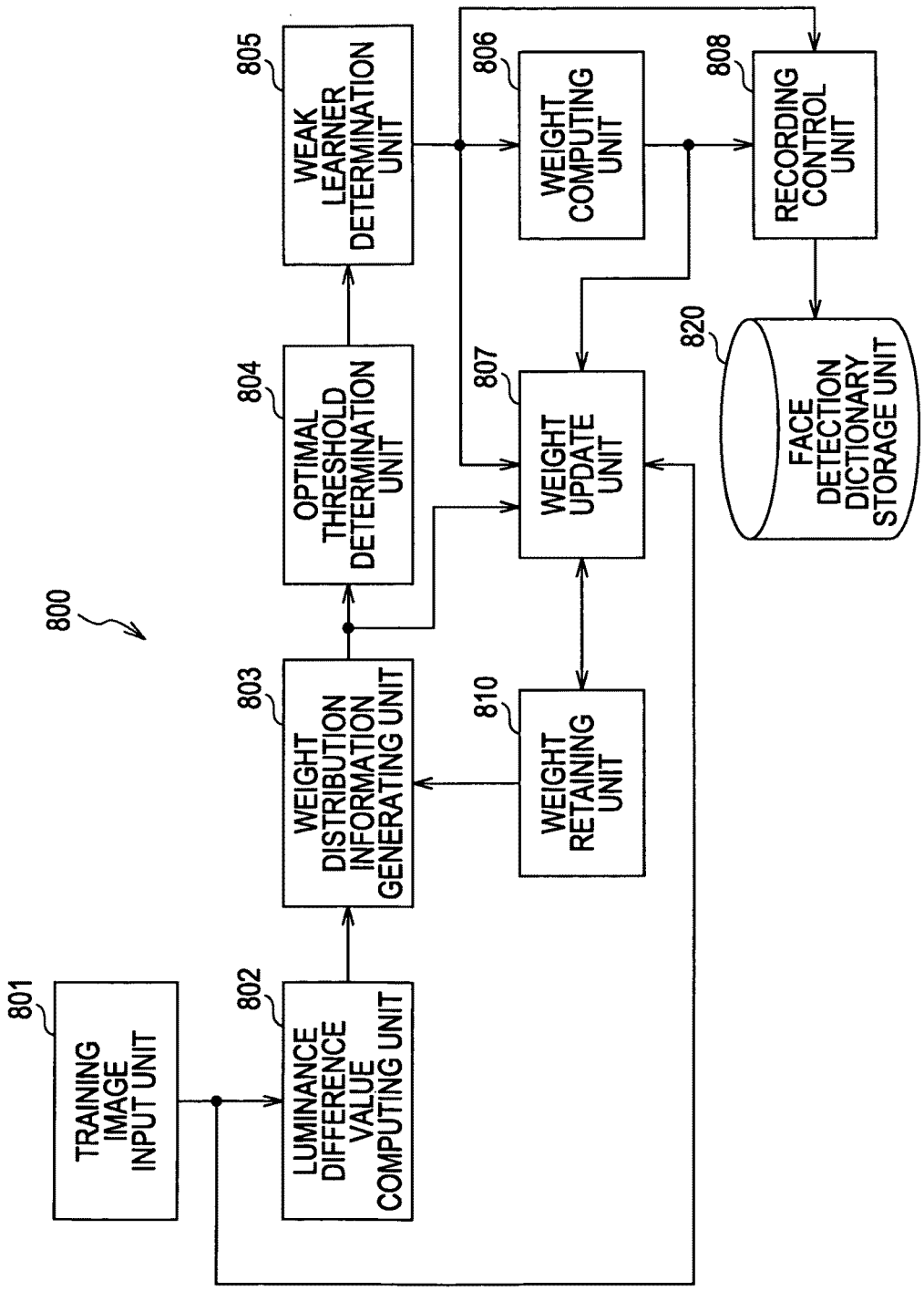

| TRAINING IMAGE IDENTIFICATION INFORMATION ($x_i$) | WEIGHT ($W_i^t$) | FACE-IMAGE/ NON-FACE IMAGE INDICATIVE INFORMATION ($y_i$) |
|---|---|---|
| $x_1$ | $W_1^t$ | 1 |
| $x_2$ | $W_2^t$ | 1 |
| ⋮ | ⋮ | ⋮ |
| $x_i$ | $W_i^t$ | −1 |
| ⋮ | ⋮ | ⋮ |
| $x_K$ | $W_K^t$ | −1 |

| t | POSITION 1 | | POSITION 2 | | THRESHOLD VALUE ($\theta$) | WEIGHT ($\alpha$) | |
|---|---|---|---|---|---|---|---|
| | u1 | v1 | u2 | v2 | | H | L |
| 1 | ... | ... | ... | ... | ... | ... | ... |
| 2 | ... | ... | ... | ... | ... | ... | ... |
| ⋮ | ⋮ | ⋮ | ⋮ | ⋮ | ⋮ | ⋮ | ⋮ |
| T | ... | ... | ... | ... | ... | ... | ... |

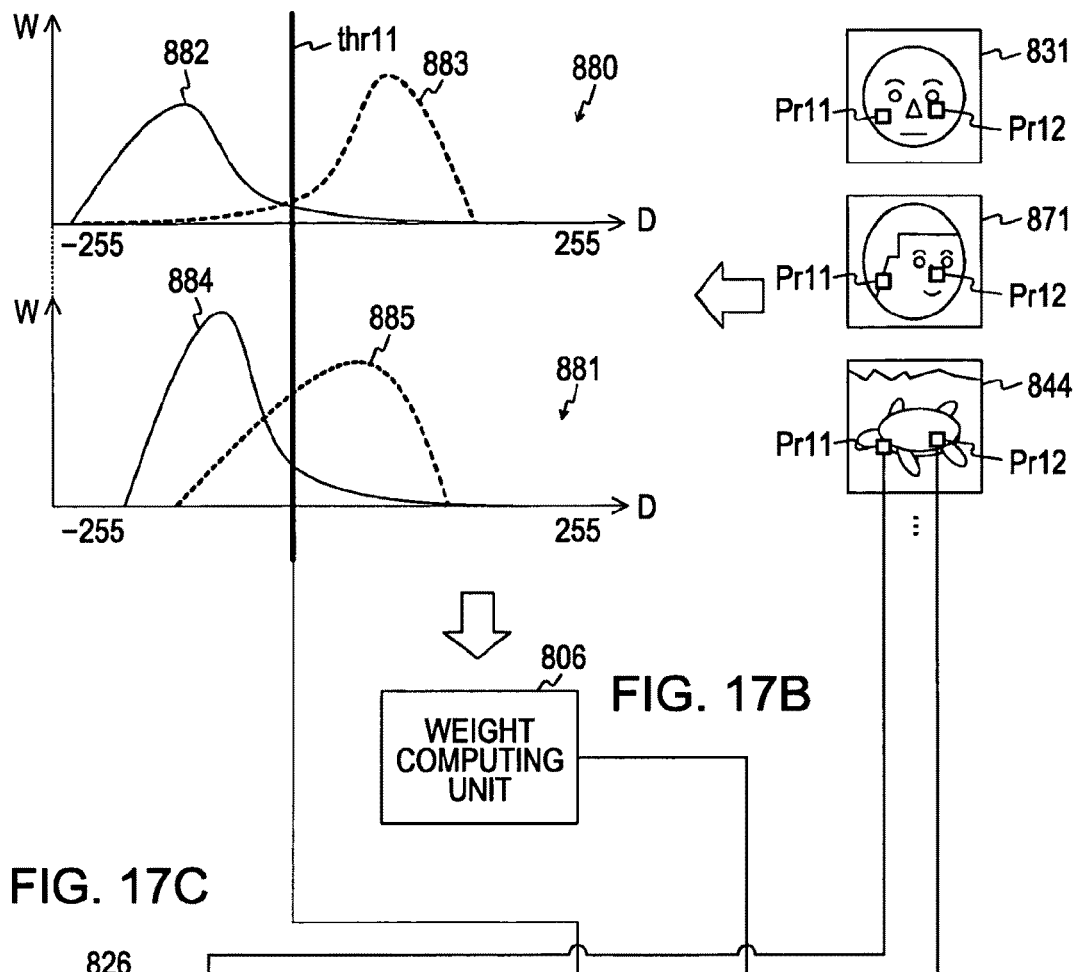

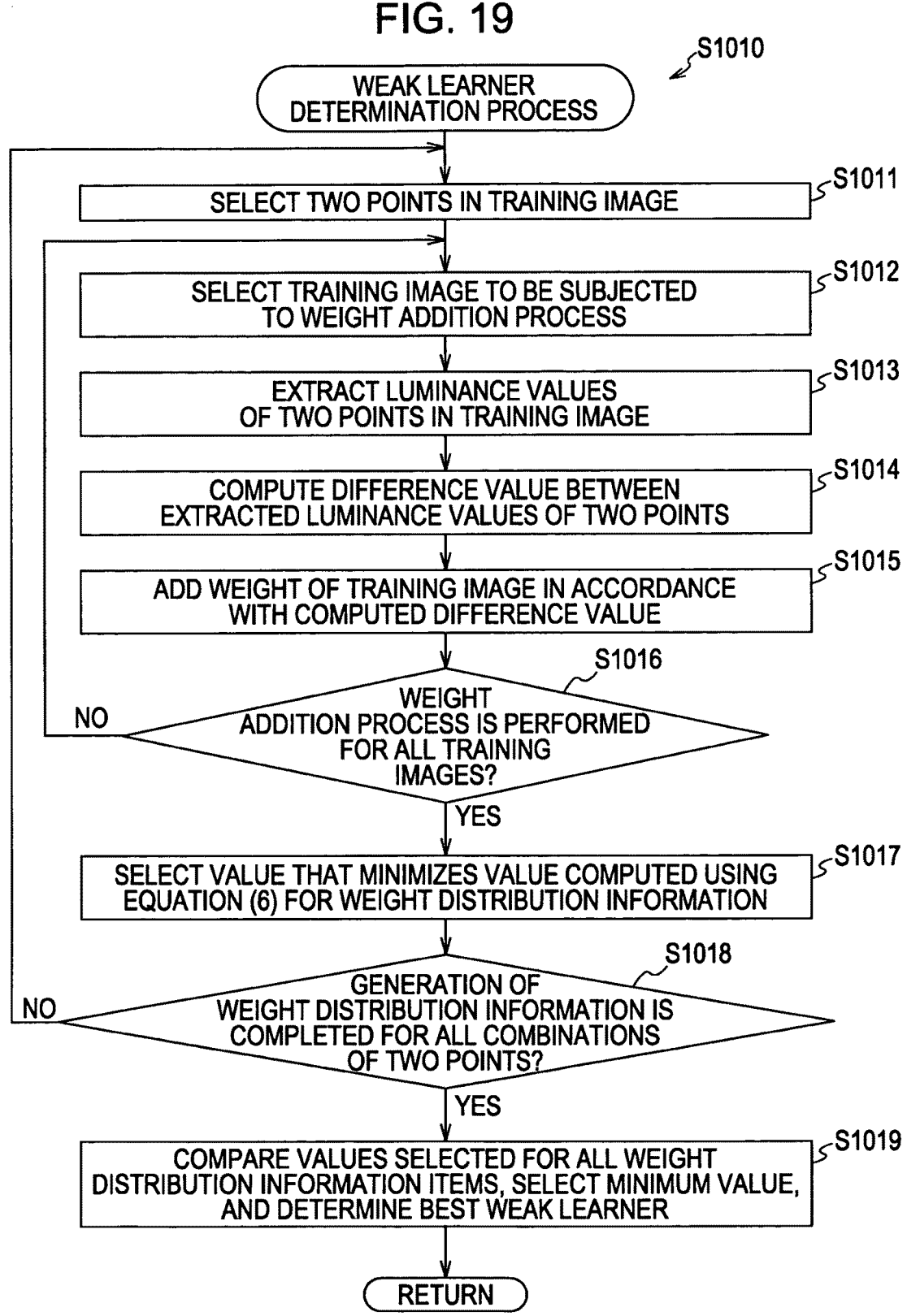

FIG. 24A
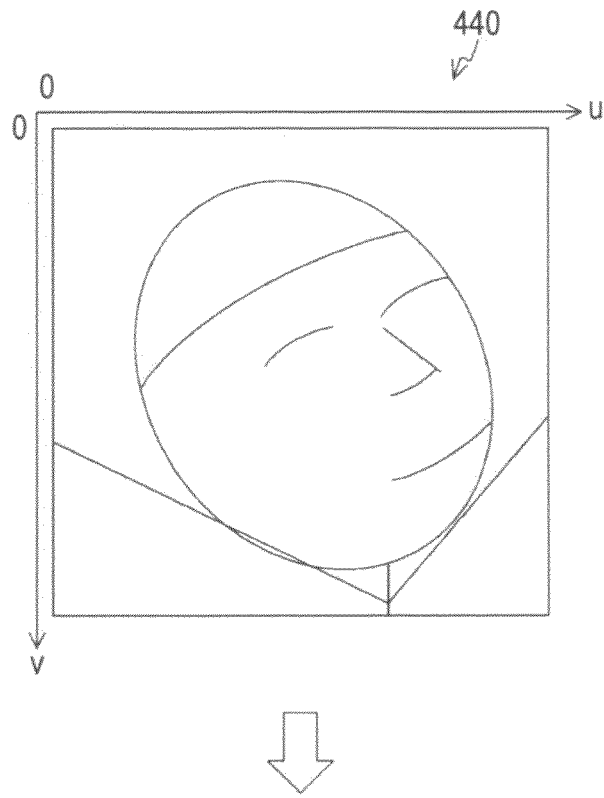
FIG. 24B  FIG. 24C  FIG. 24D
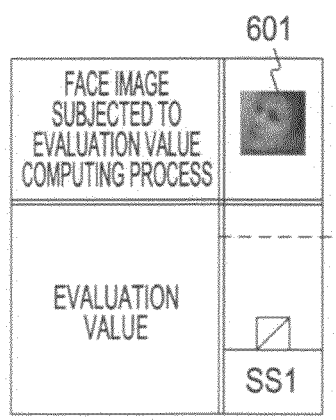
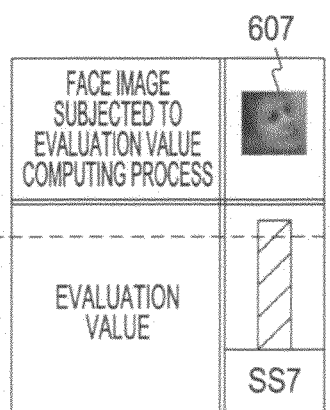
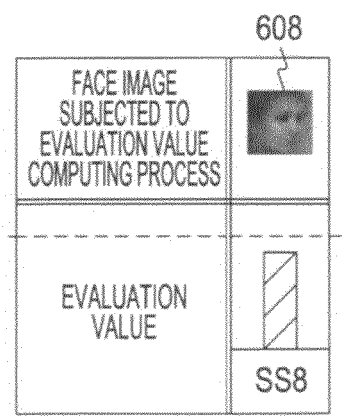
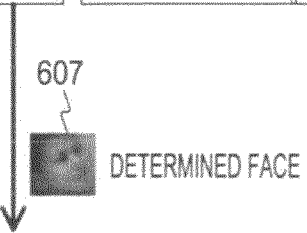

FIG. 25A
FIG. 25B
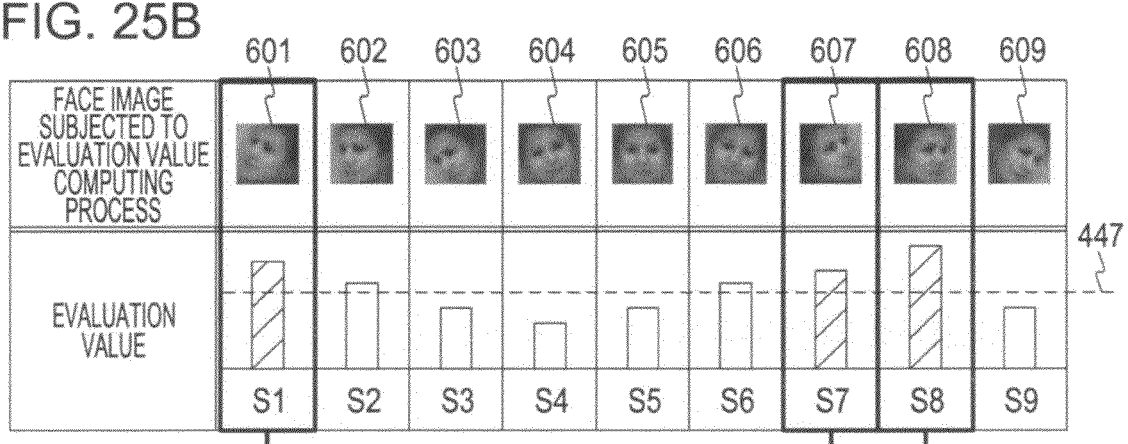
FIG. 25C
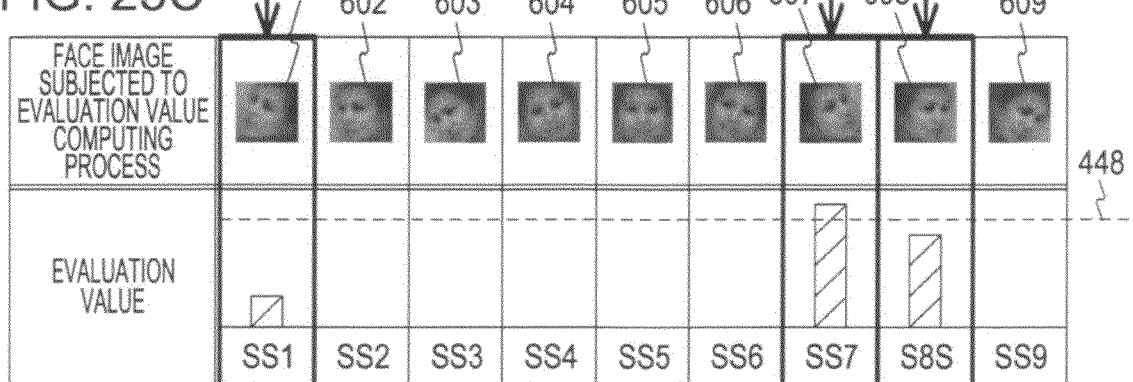
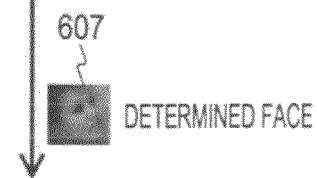
DETERMINED FACE

500

ROTATE RIGHT 90 DEGREES

502

ROTATE LEFT 90 DEGREES

ROTATE 180 DEGREES

501

503

FIG. 35B
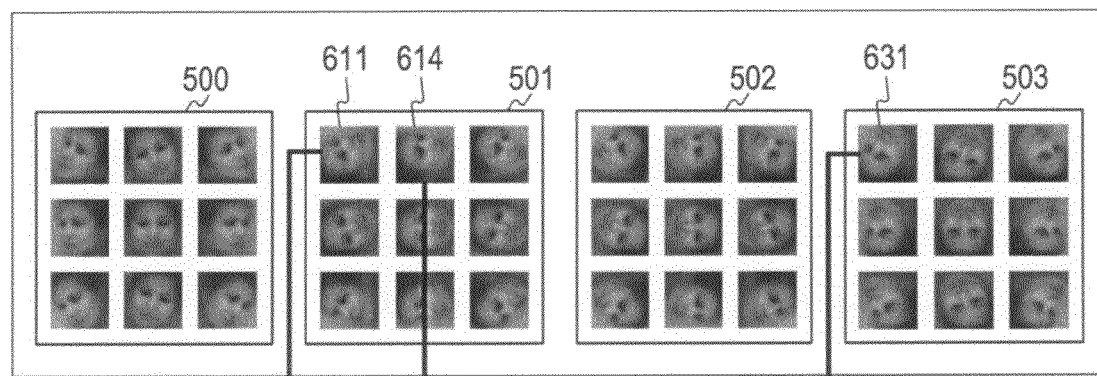
FIG. 35C 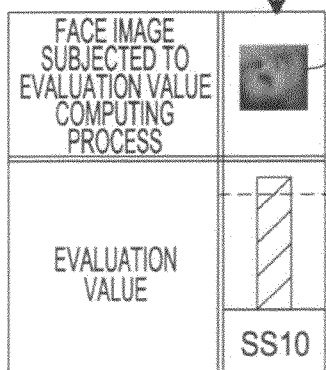 FIG. 35D 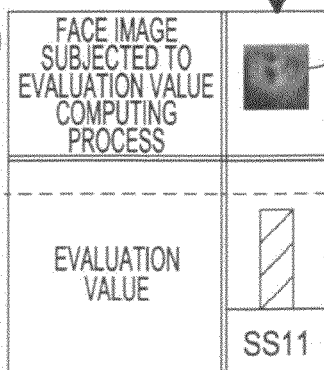 FIG. 35E 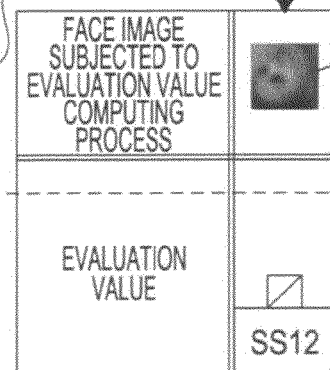

APPARATUS, METHOD AND PROGRAM FOR RECOGNIZING AN OBJECT IN AN IMAGE

CROSS-REFERENCE TO RELATED APPLICATION

The present application claims priority from Japanese Patent Application No. JP 2009-003869 filed in the Japanese Patent Office on Jan. 9, 2009, the entire content of which is incorporated herein by reference.

BACKGROUND OF THE INVENTION

1. Field of the Invention

The present invention relates to an object detecting apparatus and an image pickup apparatus for detecting an object (e.g., the face of a person) from an image, an object detecting method, and a program for causing a computer to execute the method.

2. Description of the Related Art

An object recognition technology for recognizing what an object contained in an image captured by an image pickup apparatus, such as a digital still camera or a digital video camera, is has been developed. For example, as the object recognition technology, a face detection technology for detecting the face of a person facing front from a captured image through image processing using the features, such as luminance and a color has been proposed. However, the face of a person may not be a front face. The face of the person may be turned to either side (e.g., the left side or the right side). Accordingly, for example, when only a front face is to be detected, it is difficult to detect a face turned in another direction and, therefore, the face of a person may not be properly detected.

Accordingly, a particular object detecting apparatus has been developed. The particular object detecting apparatus includes a plurality of determination units each provided for a direction of the face using a tree hierarchical structure. The particular object detecting apparatus sequentially determines the direction of the face in accordance with the branch indicated by the tree structure and detects a face (refer to, for example, Japanese Unexamined Patent Application Publication No. 2007-109229 and, in particular, FIG. 2).

SUMMARY OF THE INVENTION

According to the above-described existing technologies, since the face is detected by sequentially determining the direction of the face, the face other than the frontal face can be detected. That is, the face of a person that is directed in one of different directions can be detected.

However, in the above-described existing technologies, if, for example, an error occurs in the determination made before a leaf is reached, an improper combination of a direction of a target face and a leaf are formed. Consequently, face detection using the leaf may not function properly.

Accordingly, the present invention provides an object detecting apparatus, an image pickup apparatus, an object detecting method, and a program capable of increasing the detection accuracy of an object.

According to an embodiment of the present embodiment, an object detecting apparatus, an object detecting method for use in the object detecting apparatus, and a program for causing a computer to execute the object detecting method are provided. The object detecting apparatus includes an evaluation information storage unit configured to store evaluation information used for computing an evaluation value for each of a plurality of objects, where the evaluation value is used for evaluating which one of the objects is contained in an image, a determination information storage unit configured to store determination information used for determining whether the object is contained in an image in association with each of the objects, a computing unit configured to compute the evaluation value for each of the objects by extracting features from a plurality of areas of an image using the evaluation information and comparing two of the extracted features, and a determination unit configured to determine whether the object is contained in the image using the determination information associated with the object relating to the evaluation value that satisfies a predetermined condition among the evaluation values computed for the objects. By using the object detecting apparatus, the object detecting method, or the program, features are extracted from a plurality of areas of an image. An evaluation value is computed for each of the objects by comparing two of the extracted features, and it is determined whether the object is contained in the image using the determination information associated with the object relating to the evaluation value that satisfies a predetermined condition among the evaluation values computed for the objects.

The above-described determination information is information used for computing an evaluation value used when features are extracted from the plurality of areas of the image and it is determined whether the object is contained in the image or not by comparing two features among the extracted features, and the evaluation information can be information used for computing an evaluation value of the object using a condition less strict than a condition used for computing an evaluation value of the object using the determination information. In this way, the evaluation value of the object can be computed by using evaluation information under a condition that is less strict than a condition used for computing an evaluation value of the object using the determination information.

The object detecting apparatus can further include a selection unit configured to select a predetermined number of evaluation values having high values from the top from among the evaluation values computed for the objects. The determination unit can make the determination using the determination information associated with the object relating to the selected evaluation value. Thus, the determination can be made by selecting a predetermined number of evaluation values having high values from the top from among the evaluation values computed for the objects and using the determination information associated with the object relating to the selected evaluation value.

The selection unit can select, from among the predetermined number of the evaluation values, the evaluation value higher than a predetermined value as the evaluation value that satisfies the predetermined condition. Thus, the evaluation value higher than a predetermined value can be selected from among the predetermined number of the evaluation values.

The evaluation information can include a combination of two positions in the image, a threshold value, and a weight value assigned to each of the objects. The computing unit can extract a feature from two areas of the image identified by the two positions, compare the extracted feature with the threshold value, compute the weight value using the comparison result for each of the objects, and compute the evaluation value for each of the object. Thus, the evaluation value for each of the object can be computed by extracting a feature from two areas of the image identified by the two positions, comparing the extracted feature with the threshold value, and computing the weight value using the comparison result for each of the objects.

The object detecting apparatus can further include a position computing unit configured to compute, by rotating the two positions contained in the evaluation information about the center of the image by a predetermined angle, two new positions in the image for computing evaluation values relating to a plurality of new objects, and a second determination information storage unit configured to store determination information relating to each of the plurality of new objects after the object is rotated by the predetermined angle in association with the new object. The computing unit can perform computation of the weight value for two areas of the image identified by the two new computed positions for each of the new objects and compute the evaluation value for each of the new objects. The determination unit can determine whether the object is contained in the image using the determination information associated with the object relating to the evaluation value that satisfies the predetermined condition among the evaluation values computed for the objects and the evaluation values computed for the new objects. Thus, the evaluation value can be computed for each of new objects by computing, through rotation of the two positions contained in the evaluation information about the center of the image by a predetermined angle, two new positions and computing the weight value for two areas of the image identified by the two new computed positions for each of the new objects. Subsequently, it can be determined whether the object is contained in the image using the determination information associated with the object relating to the evaluation value that satisfies the predetermined condition among the evaluation values computed for the objects and the evaluation values computed for the new objects.

The computing unit can compute a difference value between the features extracted from the two areas, compare the computed difference value with the threshold value, and compute the evaluation value on the basis of the comparison result. Thus, a difference value between the features extracted from the two areas can be computed. The difference value can be compared with the threshold value, and the evaluation value can be computed on the basis of the comparison result.

The evaluation information can include a plurality of the combinations, and the computing unit can compute the evaluation value for each of the objects by sequentially computing the weight value of the object for each of the combinations. Thus, by sequentially computing the weight value of each of the objects for each of the combinations, the evaluation value can be computed for each of the objects.

The determination unit can extract features from a plurality of areas of the image using the determination information associated with the object relating to the evaluation value that satisfies the predetermined condition, compare two of the extracted features, compute an evaluation value for each of the objects associated with the evaluation values that satisfy the predetermined condition, and determine whether the object is contained in the image on the basis of the evaluation value. Thus, features can be extracted from a plurality of areas of the image using the determination information associated with the object relating to the evaluation value that satisfies the predetermined condition. An evaluation value can be computed for each of the objects associated with the evaluation values that satisfy the predetermined condition by comparing two of the extracted features, and the determination can be made using the evaluation values.

The determination unit can determine that the object relating to the highest evaluation value among the evaluation values of the objects computed using the determination information is contained in the image. Thus, it can be determined that the object relating to the highest evaluation value among the evaluation values of the objects computed using the determination information is contained in the image.

The determination unit can determine that the object relating to the highest evaluation value is contained in the image if the highest evaluation value is higher than a predetermined value. Thus, if the highest evaluation value is greater than the predetermined value, it can be determined that the object relating to the highest evaluation value is contained in the image.

The plurality of objects can be faces of a person turned in different directions. Thus, it can be determined whether the face is contained in the image.

The plurality of objects can be animals including at least one of a dog and a cat. Thus, it can be determined whether at least one of a dog and a cat is contained in the image.

According to another embodiment of the present embodiment, an image pickup apparatus, a processing method for use in the image pickup apparatus, and a program for causing a computer to execute the processing method are provided. An image pickup apparatus includes an evaluation information storage unit configured to store evaluation information used for computing an evaluation value, where the evaluation value is used for evaluating which one of a plurality of objects is contained in an image, a determination information storage unit configured to store determination information used for determining whether the object is contained in an image in association with each of the objects, an image pickup unit configured to generate captured images by capturing images of a subject, an image retrieving unit configured to retrieve an image to be determined from the captured images, a computing unit configured to compute the evaluation value for each of the objects by extracting features from a plurality of areas of the image to be determined using the evaluation information and comparing two of the extracted features, and a determination unit configured to determine whether the object is contained in the image to be determined using the determination information associated with the object relating to the evaluation value that satisfies a predetermined condition among the evaluation values computed for the objects. Thus, features can be extracted from a plurality of areas of an image to be determined, and the evaluation value can be computed for each of the objects by comparing two of the extracted features. Subsequently, it can be determined whether the object is contained in the image to be determined using the determination information associated with the object relating to the evaluation value that satisfies a predetermined condition among the evaluation values computed for the objects.

According to the embodiments of the present invention, the accuracy of detecting an object can be advantageously increased.

BRIEF DESCRIPTION OF THE DRAWINGS

FIG. 4 is a functional block diagram of a learning apparatus according to the first embodiment of the present invention;

FIGS. 10A to 10C schematically illustrate a method for recording, in a face detection dictionary, various values corresponding to the weak learner determined by a weak learner determination unit according to the first embodiment of the present invention;

FIGS. 17A to 17C schematically illustrate a method for recording, in the face detection dictionary, various values corresponding to the weak learner determined by the weak learner determination unit according to the first embodiment of the present invention;

FIG. 19 is a flowchart illustrating a processing procedure of a weak learner determination sub-process of the object detection dictionary generation process performed by the learning apparatus according to the first embodiment of the present invention;

FIGS. 24A to 24D illustrate an example of an image to be determined retrieved by the image retrieving unit according to the first embodiment of the present invention and evaluation values computed for the image to be determined by a face determination unit;

FIGS. 25A to 25C are schematic illustrations of the processing flow of a face detection process performed by the face detection unit according to the first embodiment of the present invention;

FIGS. 35A to 35E are schematic illustrations of the processing flow of a face detection process performed by the face detection unit according to the second embodiment of the present invention;

DESCRIPTION OF THE PREFERRED EMBODIMENTS

Exemplary embodiments of the present invention are described below. The descriptions are made in the following order:

1. First Embodiment (face detection control: an example of face detection from an image and an example of generation of dictionary information used for the face detection)

2. Second Embodiment (face detection control: a modification of the face detection from an image)

1. First Embodiment

Exemplary Configuration of Image Pickup Apparatus

Figure 1:
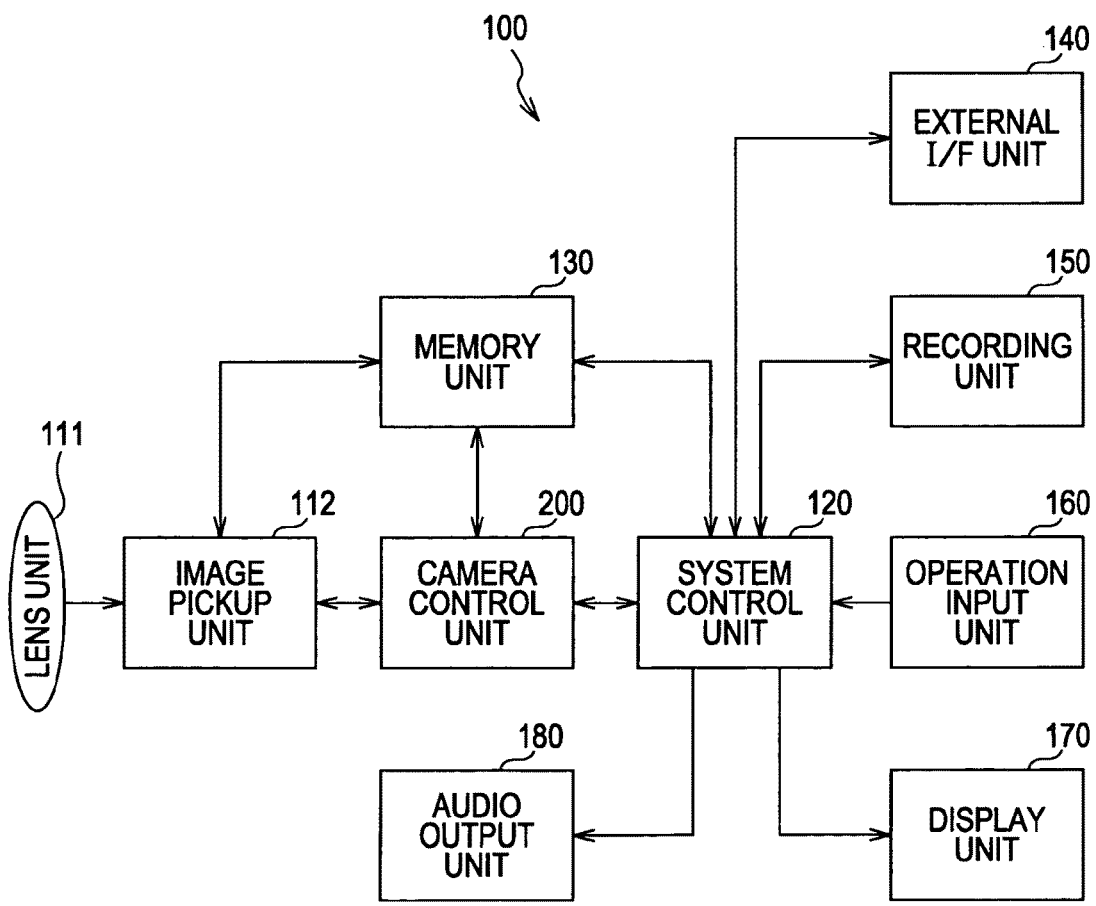
FIG. 1 is a functional block diagram of an image pickup apparatus according to a first embodiment of the present invention.

FIG. 1 is a functional block diagram of an image pickup apparatus 100 according to a first embodiment of the present invention. The image pickup apparatus 100 includes a lens unit 111, an image pickup unit 112, a system control unit 120, a memory unit 130, an external interface (I/F) unit 140, a recording unit 150, an operation input unit 160, a display unit 170, an audio output unit 180, and a camera control unit 200. For example, the image pickup apparatus 100 can be realized by a digital still camera that captures an image of an object, generates image data, extracts features of the image and, subsequently, performs various image processing using the extracted features.

The lens unit 111 includes a plurality of lenses (e.g., a zoom lens and a focus lens) that converges light output from an object. The incident light from the object is supplied to the image pickup unit 112 via the lens unit 111.

The image pickup unit 112 includes an image pickup device (not shown) having an electronic shutter function and a signal processing unit (not shown) for processing a signal output from the image pickup device and generating a captured image (image data). That is, in the image pickup unit 112, an optical image of an object incident through the lens unit 111 is formed on the image pickup device, which performs an imaging operation. The signal processing apparatus performs signal processing on an imaging signal. Thus, a captured image is generated. Thereafter, the generated captured image is supplied to the storage unit 130, which stores the captured image. Note that camera parameters (imaging parameters) used for generating the captured image are sequentially set by the camera control unit 200.

Under the control of the system control unit 120, the camera control unit 200 controls the image pickup unit 112 using the captured image supplied from the image pickup unit 112 via the memory unit 130. The camera control unit 200 is described in more detail below with reference to FIG. 2.

The system control unit 120 performs overall control of the image pickup apparatus 100. For example, the system control unit 120 performs control in accordance with an operation input from a user through the operation input unit 160. In addition, the system control unit 120 controls display of screens, such as a menu screen, on the display unit 170, reading and writing of the captured image from and to the recording unit 150, and communications with a network and an external computer via the external I/F unit 140. Furthermore, when an image capturing operation is monitored, the system control unit 120 controls displaying of the captured image generated by the image pickup unit 112 on the display unit 170.

The memory unit 130 of the image pickup apparatus 100 is a main memory unit for temporarily storing, for example, the captured image. For example, the memory unit 130 is formed from a dynamic random access memory (DRAM). That is, in general, the captured image is exchanged among various units of the image pickup apparatus 100 via the memory unit 130.

The external I/F unit 140 is an external interface including input and output terminals, such as a universal serial bus ports. The external I/F unit 140 provides an interface for connecting the image pickup apparatus 100 to an external computer and a network.

Under the control of the system control unit 120, the recording unit 150 records the captured image generated by the image pickup unit 112. In addition, under the control of the system control unit 120, the recording unit 150 reads the recorded captured image and supplies the captured image to the system control unit 120. A recording medium, such as a flash memory, can be used for the recording unit 150. The recording unit 150 may be incorporated in the image pickup apparatus 100 or removably mounted in the image pickup apparatus 100.

The operation input unit 160 receives an input operation performed by a user and inputs a signal generated in accordance with the received user operation to the system control unit 120. For example, when a shutter button used for instructing recording of a captured image is pressed, a signal generated in accordance with the press of the shutter button is output to the system control unit 120.

Under the control of the system control unit 120, the display unit 170 displays a variety of images. For example, the display unit 170 displays a captured image generated by the image pickup unit 112, a captured image read from the recording unit 150, and a menu screen provided to the user.

Under the control of the system control unit 120, the audio output unit 180 outputs various audio information. For example, a speaker is used as the audio output unit 180.

Figure 2:
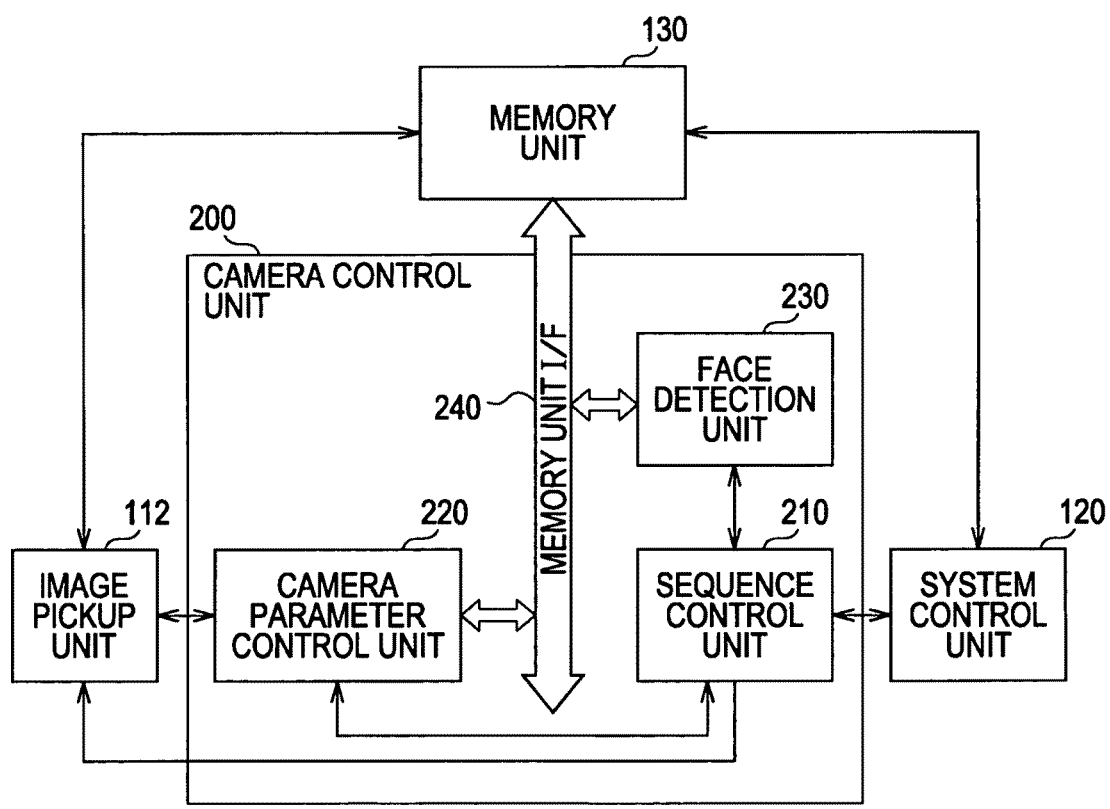
FIG. 2 is a functional block diagram of a camera control unit according to the first embodiment of the present invention.

FIG. 2 is a functional block diagram of the camera control unit 200 according to the first embodiment of the present invention. In addition to the functional configuration of the camera control unit 200, FIG. 2 illustrates the configurations of the image pickup unit 112, the system control unit 120, and the memory unit 130 shown in FIG. 1. The camera control unit 200 includes a sequence control unit 210, a camera parameter control unit 220, a face detection unit 230, and a memory unit I/F 240. The captured image is exchanged between the memory unit 130 and the camera parameter control unit 220 and between the memory unit 130 and the face detection unit 230 via the memory unit I/F 240.

Upon receiving a captured-image-recording standby command from the system control unit 120, the sequence control unit 210 starts and sustains a captured-image-recording standby mode in which a captured image generated by the image pickup unit 112 can be recorded. In the captured-image-recording standby mode, captured images generated by the image pickup unit 112 are sequentially recorded in the memory unit 130. For example, at ⅟₆₀-second intervals, the capture image to be stored in the memory unit 130 is updated. In addition, the sequence control unit 210 performs control so that the camera parameter control unit 220 sets camera parameters on the basis of the current captured image stored in the memory unit 130 (the latest captured image generated by the image pickup unit 112). Furthermore, the sequence control unit 210 performs control so that the face detection unit 230 performs a face detection process on the current captured image stored in the memory unit 130. At that time, if the face detection unit 230 outputs face detection information indicating that a face is detected, the sequence control unit 210 outputs the information indicating that a face is detected to the system control unit 120 and the camera parameter control unit 220.

The camera parameter control unit 220 sets camera parameters regarding the captured image. The camera parameter control unit 220 then controls an image capturing operation performed by the image pickup unit 112 using the set camera parameters. More specifically, when triggered by the sequence control unit 210, the camera parameter control unit 220 acquires the current captured image stored in the memory unit 130 via the memory unit I/F 240. The camera parameter control unit 220 then evaluates the current captured image and determines camera parameters, such as a shutter speed, exposure, and white balance. When the face is detected from the current captured image, the camera parameter control unit 220 determines camera parameters, such as a shutter speed, exposure, and white balance on the basis of the detected face and the evaluation of the current captured image. For example, when a face is detected, the camera parameters that are optimal for the detected face are determined on the basis of the position and size of the detected face in the captured image.

The face detection unit 230 detects a face from the current captured image stored in the memory unit 130. When a face is detected, the face detection unit 230 outputs face detection information to the sequence control unit 210. More specifically, upon receiving a trigger from the sequence control unit 210, the face detection unit 230 acquires the current captured image stored in the memory unit 130 via the memory unit I/F 240 and performs a face detection process on the current captured image. In the present embodiment, the face detection information refers to information regarding a detected face. For example, the face detection information includes the position and the size of the detected face in the captured image, the type of the face (e.g., the orientation of the face), and a score indicating the likelihood that the face is one among a plurality of faces. The face detection unit 230 is described in more detail below with reference to FIG. 3.

Figure 3:
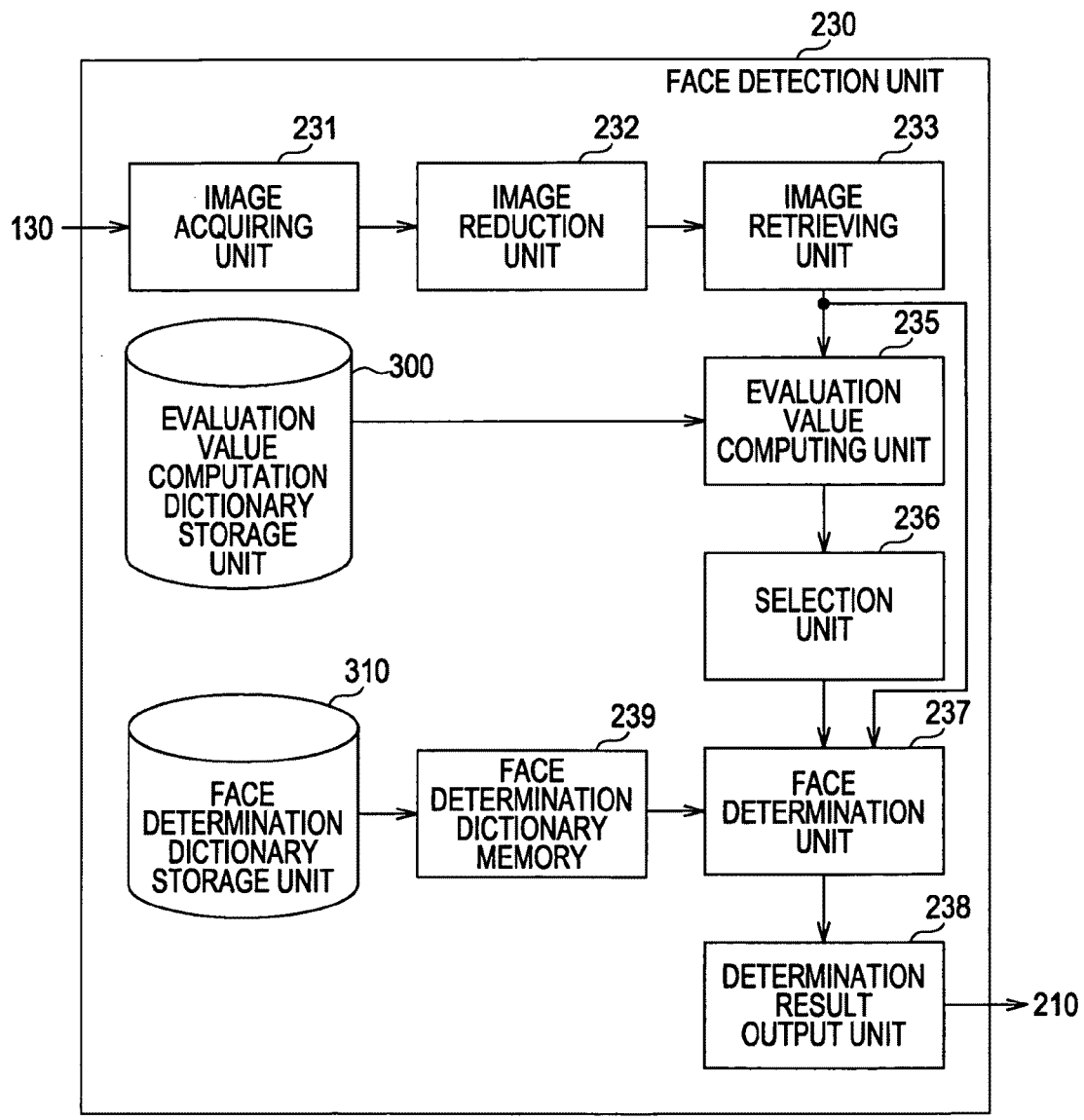
FIG. 3 is a functional block diagram of a face detection unit according to the first embodiment of the present invention.

FIG. 3 is a block diagram illustrating an exemplary functional structure of the face detection unit 230 according to the first embodiment of the present invention. The face detection unit 230 includes an image acquiring unit 231, an image reduction unit 232, an image retrieving unit 233, an evaluation value computing unit 235, a selection unit 236, a face determination unit 237, a determination result output unit 238, an evaluation value computation dictionary storage unit 300, and a face determination dictionary storage unit 310.

The image acquiring unit 231 acquires a captured image stored in the memory unit 130 via the memory unit I/F 240. The image acquiring unit 231 outputs the acquired captured image to the image reduction unit 232.

The image reduction unit 232 sequentially reduces the size of the captured image output from the image acquiring unit 231 by a predetermined percentage and generates a plurality of images having different sizes. The image reduction unit 232 sequentially outputs the generated images to the image retrieving unit 233. The process of reduction of a captured image is described in more detail below with reference to FIGS. 22A to 22D.

The image retrieving unit 233 retrieves an image contained in a predetermined area from each of the images output from the image reduction unit 232. The image retrieving unit 233 then outputs the retrieved image (the image to be determined) to the evaluation value computing unit 235 and the face determination unit 237. The process of retrieving the image is described in more detail below with reference to FIGS. 22A to 22D.

The evaluation value computation dictionary storage unit 300 stores an evaluation value computation dictionary used for computing an evaluation value that evaluates which one of a plurality of objects is contained in the image output from the image retrieving unit 233 for each of the objects. The evaluation value computation dictionary storage unit 300 supplies the stored evaluation value computation dictionary to the evaluation value computing unit 235. The first embodiment of the present invention is described with reference to a plurality of faces turned in different directions as the plurality of objects. The method for generating the evaluation value computation dictionary is described in more detail below with reference to FIGS. 5A to 17C. In addition, the information stored in the evaluation value computation dictionary is described in more detail below with reference to FIGS. 20A and 20B. Note that the evaluation value computation dictionary storage unit 300 is an example of an evaluation information storage unit defined in the attached claims.

The face determination dictionary storage unit 310 stores a face determination dictionary in association with each of the objects. The face determination dictionary is used for determining whether a particular object is contained in the image output from the image retrieving unit 233. The face determination dictionary storage unit 310 supplies the stored face determination dictionary to a face determination dictionary memory 239. In the present embodiment, the face determination dictionary storage unit 310 stores a face determination dictionary for each of a plurality of objects corresponding to the evaluation value that is computed using the evaluation value computation dictionary stored in the evaluation value computation dictionary storage unit 300. The method for generating the face determination dictionary is described in more detail below with reference to FIGS. 5 to 17. In addition, the information stored in the face determination dictionary is described in more detail below with reference to FIG. 21. Note that the face determination dictionary storage unit 310 is an example of a determination information storage unit and an example of a second determination information storage unit defined in the attached claims.

The face determination dictionary memory 239 is a working memory that stores one or more face determination dictionaries selected from among a plurality of face determination dictionaries stored in the face determination dictionary storage unit 310. The face determination dictionary memory 239 supplies the information contained in the stored face determination dictionary to the face determination unit 237.

The evaluation value computing unit 235 extracts features from a plurality of areas of the image to be determined output from the image retrieving unit 233. Thereafter, the evaluation value computing unit 235 compares two of the extracted features and computes the evaluation values of a plurality of object at the same time. The evaluation value computing unit 235 then outputs the computed evaluation values for each of the objects to the selection unit 236. When the evaluation values are computed, the evaluation value computation dictionary stored in the evaluation value computation dictionary storage unit 300 is used. The computation of the evaluation value performed by the evaluation value computing unit 235 is described in more detail below with reference to FIGS. 23A to 25C. Note that the evaluation value computing unit 235 is an example of a computing unit defined in the attached claims.

The selection unit 236 selects, from among the evaluation values of the objects output from the evaluation value computing unit 235, the evaluation values that satisfies a predetermined condition. Thereafter, the selection unit 236 outputs information regarding the objects relating to the selected evaluation values (i.e., selected object information) to the face determination unit 237. For example, the condition may be determined so that a predetermined number of high evaluation values from the top are selected from among the evaluation values of the objects. In addition, from among such selected values, the evaluation values higher than a predetermined value may be selected as final evaluation values. A method for selecting an evaluation value performed by the selection unit 236 is described in more detail below with reference to FIGS. 23A to 25C.

The face determination unit 237 performs a face determination process in which it is determined whether a face is contained in the determination target image output from the image retrieving unit 233. Thereafter, the face determination unit 237 outputs the determination result to a determination result output unit 238. For example, the output determination result includes the position and size of the detected face in the captured image, the type of the face (e.g., the orientation of the face), and a score indicating the likelihood that the face is one among a plurality of faces. More specifically, the face determination unit 237 instructs the face determination dictionary memory 239 to retain the face determination dictionary stored in the face determination dictionary storage unit 310 in association with the object relating to the evaluation value selected by the selection unit 236. Thereafter, the face determination unit 237 extracts the features from a plurality of areas of the image to be determined output from the image retrieving unit 233 using the face determination dictionary retained in the face determination dictionary memory 239. By comparing two of the extracted features, the face determination unit 237 computes an evaluation value for each of the face determination dictionaries. Subsequently, using the evaluation value, the face determination unit 237 determines whether a face is contained in the image to be determined output from the image retrieving unit 233. The face determination process performed by the face determination unit 237 is described in more detail below with reference to FIGS. 23A to 25C. Note that the face determination unit 237 is an example of a determination unit defined in the attached claims.

When the face determination unit 237 outputs a determination result indicating that a face is contained in the image to be determined output from the image retrieving unit 233, the determination result output unit 238 outputs, to the sequence control unit 210, face detection information indicating that a face is detected in the captured image. The face detection information includes the position and size of the face detected from the captured image, the type of the face (e.g., the orientation of the face), and a score indicating the likelihood that the face is one among a plurality of faces.

Exemplary Configuration of Learning Apparatus

A learning apparatus according to the first embodiment of the present invention is described in detail next with reference to the accompanying drawings. The learning apparatus generates the evaluation value computation dictionary and the face determination dictionary used in a face detection process. As used herein, the term "learning" refers to searching for, using a plurality of data items, a pattern in the data.

FIG. 4 is a functional block diagram of a learning apparatus 800 according to the first embodiment of the present invention. The learning apparatus 800 includes a training image input unit 801, a luminance difference value computing unit 802, a weight distribution information generating unit 803, an optimal threshold determination unit 804, a weak learner determination unit 805, and a weight computing unit 806. In addition, the learning apparatus 800 includes a weight update unit 807, a recording control unit 808, a weight retaining unit 810, and a face detection dictionary storage unit 820. In the present embodiment, an example in which a face detection dictionary used for detecting the face of a person is generated is described. The face detection dictionary corresponds to the evaluation value computation dictionary stored in the evaluation value computation dictionary storage unit 300 shown in FIG. 3 and the face determination dictionary stored in the face determination dictionary storage unit 310. Note that the learning apparatus 800 is realized by using a learning algorithm, such as Real AdaBoost.

The training image input unit 801 is used for inputting training images serving as training samples. The training image input unit 801 directly outputs the input training image to the luminance difference value computing unit 802 and the weight update unit 807 for each of the types of training image. According to the first embodiment of the present invention, as a training image input to the training image input unit 801, an image normalized to a 24×24 pixel image is used. In addition, when the face detection dictionary used for detecting the face of a person is generated, sample images that contain the face of a person (training front face images) and sample images that do not contain the face of a person (training non-face images) are input to the training image input unit 801 as the training images. In such a case, for example, images that are normalized so that the eyes in the face are aligned at the same position in the images can be used as the training front face images. In addition, for example, about ten thousand images are input as the training front face images, and about hundred thousand images are input as the training non-face images. Examples of these images are described in more detail below with reference to FIGS. 5A and 12C.

The luminance difference value computing unit 802 computes a luminance difference value between two points in a training image output from the training image input unit 801. The luminance difference value computing unit 802 then outputs the computed difference value to the weight distribution information generating unit 803 in association with the training image and the two points used for the computation. In this example, two difference computation methods for the same two points (i.e., when the luminance values of the two points are represented by "A" and "B", computations "A−B" and "B−A") result in the same absolute value. Accordingly, for the two computation methods, computation using either one of the methods can be performed, and computation using the other method can be eliminated. That is, the luminance difference value computing unit 802 computes the luminance difference value for each of the combinations of two pixels of the training image ($_{576}C_2 = 165600$).

The weight distribution information generating unit 803 generates weight distribution information indicating the distribution of weights assigned to the current training image for which the luminance difference values between two points are output from the luminance difference value computing unit 802. The weight distribution information is generated for each of the training front face image and the training non-face image. Subsequently, the weight distribution information generating unit 803 outputs the obtained weight distribution information to the optimal threshold determination unit 804 and the weight update unit 807 in association with the current combination of two points. Note that the weight assigned to the training image is stored in the weight retaining unit 810. The process of generating the distribution of weights is described in more detail below with reference to FIGS. 7A, 7B, 8A and 8B, FIGS. 14A to 14C, and FIGS. 15A and 15B.

The optimal threshold determination unit 804 determines an optimal threshold value for each of combinations of two points using the weight distribution information output from the weight distribution information generating unit 803. Thereafter, the optimal threshold determination unit 804 outputs, to the weak learner determination unit 805, the determined optimal threshold value in association with the weight distribution information used for determination and the combination of two points. The process of determining the optimal threshold value is described in more detail below with reference to FIGS. 8A and 8B and FIGS. 15A and 15B.

The weak learner determination unit 805 determines an optimal weak learner using the weight distribution information generated by the weight distribution information generating unit 803. More specifically, the weak learner determination unit 805 selects one of optimal threshold values output from the optimal threshold determination unit 804 and determines the weak learner of the weight distribution information corresponding to the threshold value as the best weak learner. Thereafter, the weak learner determination unit 805 outputs, to the weight computing unit 806, the weight update unit 807, and the recording control unit 808, the selected threshold value in association with the best weak learner and the weight distribution information corresponding to the weak learner. The process of determining a weak learner is described in more detail below with reference to FIGS. 9A to 9C and FIGS. 16A and 16B.

The weight computing unit 806 computes the weight (a value obtained from weighted majority decision) using the weight distribution information corresponding to the best weak learner output from the weak learner determination unit 805. The weight computing unit 806 then outputs the computed weight value to the recording control unit 808. The weight computing process is described in more detail below with reference to FIGS. 10A to 10C and FIGS. 17A to 17C.

The weight update unit 807 updates the weight corresponding to each of the training images stored in the weight retaining unit 810. More specifically, the weight update unit 807 updates each of the weights using the weight distribution information output from the weight distribution information generating unit 803, the optimal threshold value corresponding to the best weak learner output from the weak learner determination unit 805, and the weight value output from the weight computing unit 806. The updating of a weight is described in more detail below with reference to FIGS. 10A to 10C and FIGS. 17A to 17C.

The recording control unit 808 associates the weight value output from the weight computing unit 806 with the threshold value and the best weak learner output from the weak learner determination unit 805. The recording control unit 808 then stores the weight value, the threshold value, and the best weak learner in the face detection dictionary storage unit 820. The face detection dictionary is described in more detail below with reference to FIGS. 10A to 10C and FIGS. 17A to 17C.

The weight retaining unit 810 retains the weights assigned to the training images output from the training image input unit 801. In addition, the weight retaining unit 810 supplies the retained weight to the weight distribution information generating unit 803. The weights retained in the weight retaining unit 810 are updated by the weight update unit 807. The information retained in the weight retaining unit 810 is described in more detail below with reference to FIGS. 6A and 6B and FIGS. 13A and 13B.

Figure 5A:
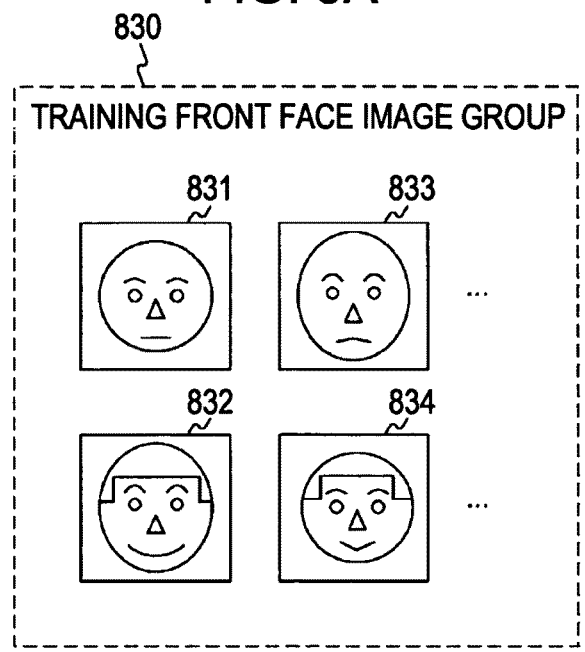
FIGS. 5A and 5B illustrate an example of training images used for a learning process performed by the learning apparatus according to the first embodiment of the present invention.
Figure 5B:
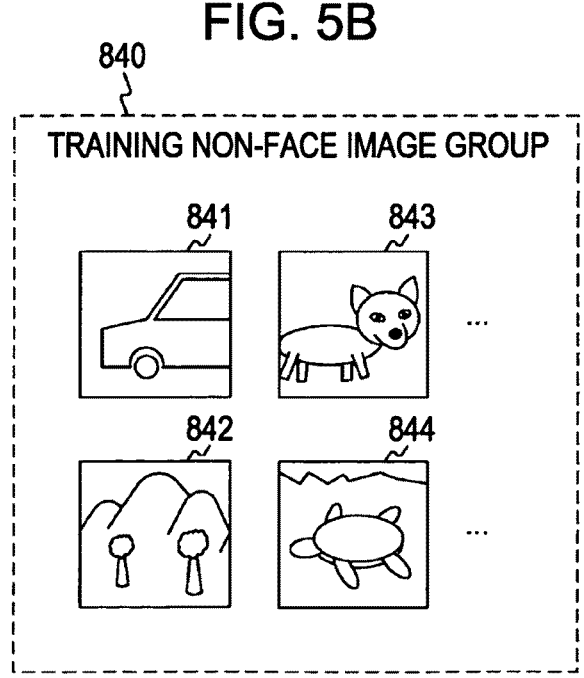

FIGS. 5A and 5B illustrate an example of training images used for a learning process performed by the learning apparatus 800 according to the first embodiment of the present invention. FIG. 5A illustrates a training front face image group 830 including a plurality of training front face images. FIG. 5B illustrates a training non-face image group 840 including a plurality of training non-face images. For simplicity, in the example shown in FIGS. 5A and 5B, simplified images are shown as the training images.

For example, as indicated by training front face images 831 to 834 shown in FIG. 5A, a plurality of sample images including human face (the front face) images are used as the training front face images. In addition, as indicated by training non-face images 841 to 844 shown in FIG. 5B, a plurality of sample images each including no faces are used as the training non-face images. In this example, the face detection dictionary is generated using about ten thousand training front face images and about hundred thousand training non-face images. These training images are sequentially input to the training image input unit 801 for each of these types.

Figures 6A, 6B:
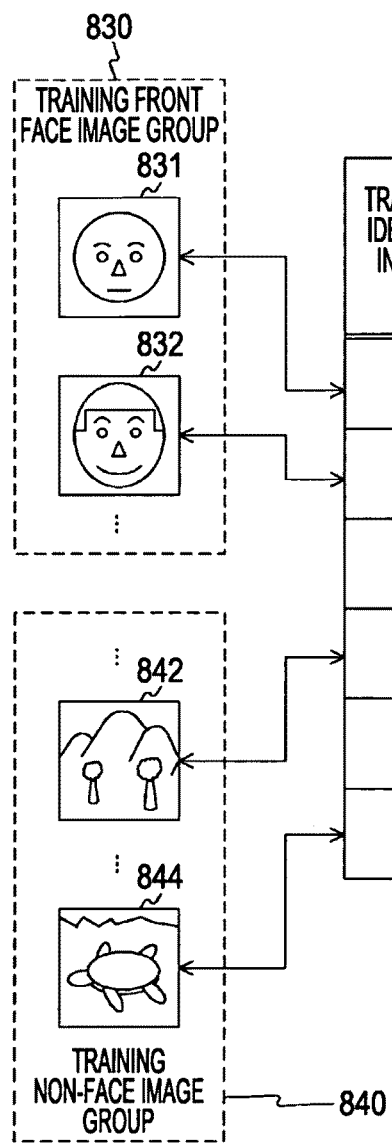
FIGS. 6A and 6B are schematic illustrations of the information retained in a weight retaining unit according to the first embodiment of the present invention.

FIGS. 6A and 6B are schematic illustrations of the information retained in the weight retaining unit 810 according to the first embodiment of the present invention. FIG. 6A illustrates training images for which the weights are retained in the weight retaining unit 810. FIG. 6B illustrates the information that corresponds to the training image and that is retained in the weight retaining unit 810. In addition, the correspondences between information items shown in FIG. 6A and information items shown in FIG. 6B are shown by the arrows connecting the information items. Note that the training images contained in the training front face image group 830 and the training non-face image group 840 shown in FIGS. 6A and 6B represent some of the training images shown in FIGS. 5A and 5B. The same numbering will be used in describing FIGS. 6A and 6B as are utilized in describing FIGS. 5A and 5B.

The weight retaining unit 810 retains training image identification information $(x_i)$ 811 and a weight $(W_i^t)$ 812, and face-image/non-face image indicative information $(y_i)$ 813. Such information is stored and updated by the weight update unit 807 for each of the training images output from the training image input unit 801.

The training image identification information $(x_i)$ 811 is identification information used for identifying the training image input to the training image input unit 801. For example, $x_i$ is stored in association with a training image, where i is an integer $(1 \le i \le K)$. FIG. 6B illustrates an example of information contained when K training images are input to the training image input unit 801. For example, K can be set to 110000.

The weight $(W_i^t)$ 812 represents a weight assigned to each of the training images input to the training image input unit 801. The weight $(W_i^t)$ 812 is sequentially updated by the weight update unit 807. In this example, the weight $(W_i^t)$ is a value normalized so as to satisfy the following expression:

$$\sum_{i=1}^{K} w_i^t = 1 \qquad (1)$$

Note that, as a weight $(W_i^t)$, the same value $(1/K)$ is assigned to each of the training images immediately after the training image is input to the training image input unit 801. Here, the index i corresponds to i of the training image identification information $(x_i)$ 811, and t represents a loop counter when boosting is performed. For example, t may range from 2000 to 3000.

The face-image/non-face image indicative information $(y_i)$ 813 is used for indicating the type of the training image input to the training image input unit 801. For example, "1" is retained for a training front face image, and "−1" is retained for a training non-face image. The face-image/non-face image indicative information is stored by the weight update unit 807 in accordance with the type of the training image output from the training image input unit 801.

Example of Generation of Face Detection Dictionary

Figure 7A:
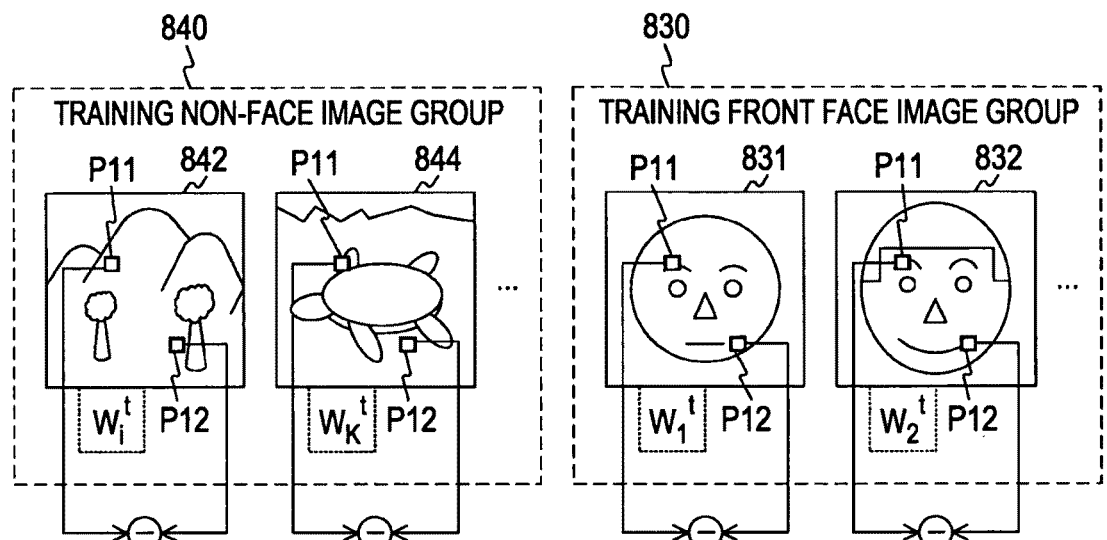
FIGS. 7A and 7B are schematic illustrations of a method for generating weight distribution information in a weight distribution information generating unit according to the first embodiment of the present invention.
Figure 7B:
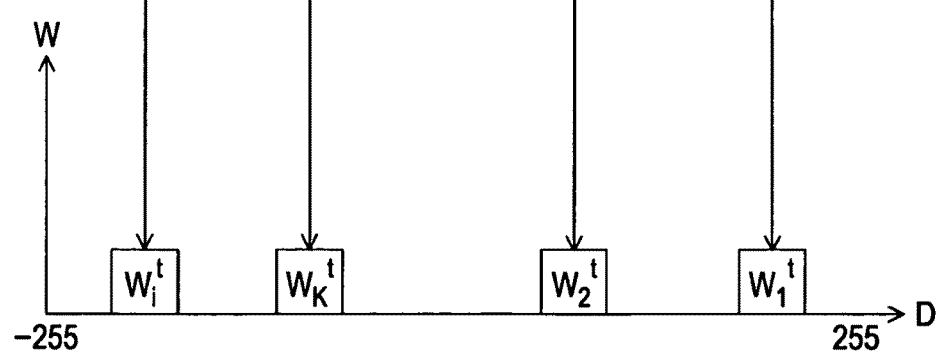

FIGS. 7A and 7B are schematic illustrations of a method for generating the weight distribution information in the weight distribution information generating unit 803 according to the first embodiment of the present invention. FIG. 7A illustrates an example of computation of a luminance difference value using the training front face images 831 and 832 and the training non-face images 842 and 844 of the training images contained in the training front face image group 830 and the training non-face image group 840, respectively. Similarly, the computation can be applied to the other training images. In addition, in the square indicated by a dotted line and located in the lower section of each of the training images, a weight ($W_i^t$) assigned to the training image is shown. The weight ($W_i^t$) is stored in the weight retaining unit 810 in association with the training image.

First, the luminance difference value computing unit 802 extracts the luminance of the same two points in each of the training images and computes a luminance difference value between the two points for the training image. For example, as shown in FIG. 7A, the luminance values of two points (pixel positions P11 and P12) in the training front face images 831 and 832 and the training non-face images 842 and 844 are extracted, and the difference between the two luminance values is computed.

FIG. 7B schematically illustrates a method for generating the weight distribution information using the luminance difference value between two points in each of the training images. FIG. 7B is a weight distribution graph serving as weight distribution information, in which the abscissa represents the luminance difference value (ranging from −255 to 255), and the ordinate represents an accumulation value of weight.

The weight distribution information generating unit 803 adds, to the class of the difference value computed by the luminance difference value computing unit 802, the weight ($W_i^t$) stored in the weight retaining unit 810 in association with the training image from which the difference value is computed. For example, as shown in FIG. 7B, the weight ($W_1^t, W_2^t, W_i^t, W_k^t$) are added to the classes of the difference values computed for the training front face images 831 and 832 and the training non-face images 842 and 844, respectively. In a similar manner, for each of the other training images, the weight ($W_i^t$) corresponding to the training image is sequentially added to the class of the computed difference value. In this way, weight distribution information is generated. Note that since the same value (1/K) is assigned to each of the training images immediately after the training image is input to the training image input unit 801 as a weight ($W_i^t$), the same weight ($W_i^1$) is sequentially added when t=1. Similarly, for the other combinations of two points (the other pairs of points), a weight ($W_i^t$) assigned to each of the training images is sequentially added. In this way, the weight distribution information is generated. An example of the weight distribution information generated in the above-described manner for the combination of the two points (the pixel positions P11 and P12) in each of the training images is shown in FIGS. 8A and 8B.

Figure 8A:
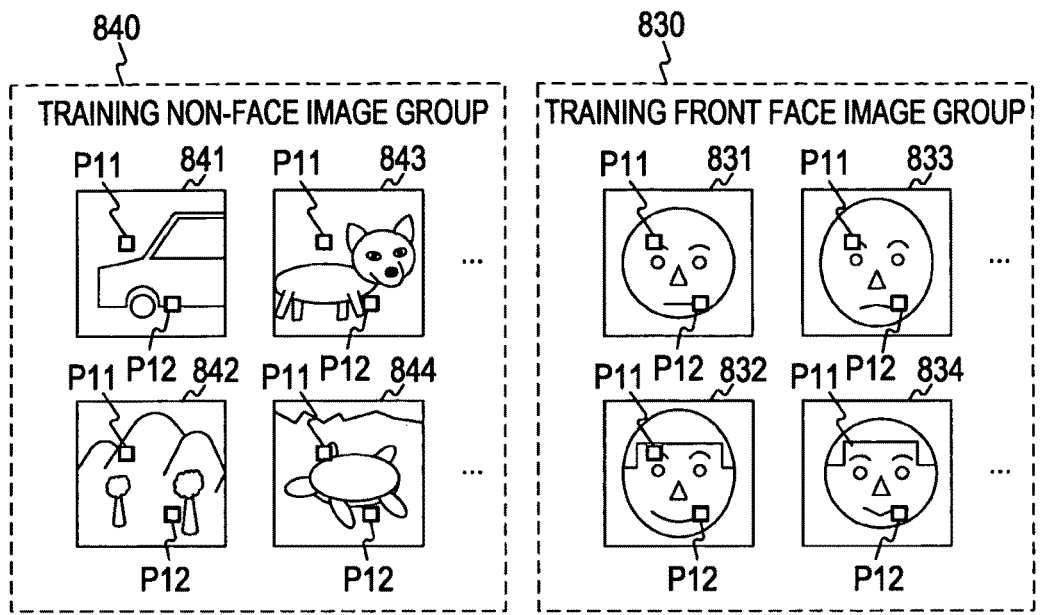
FIGS. 8A and 8B schematically illustrate a relationship between the weight distribution information generated by the weight distribution information generating unit according to the first embodiment of the present invention and training images.
Figure 8B:
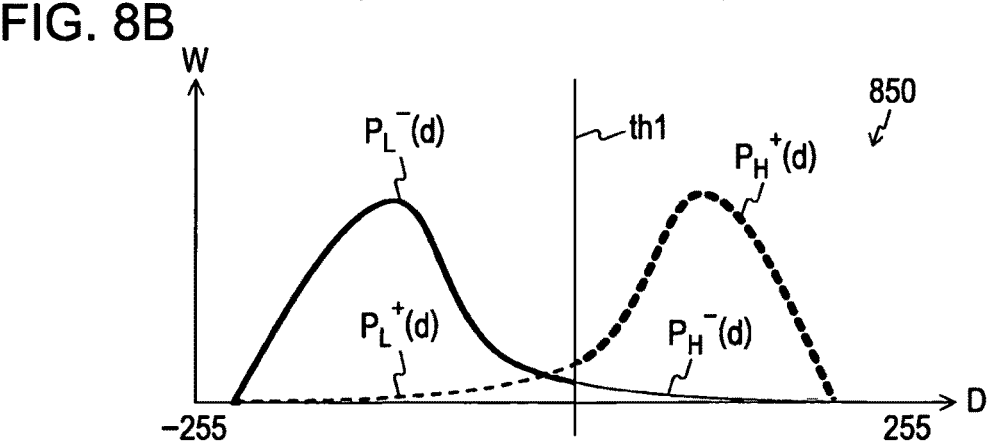

FIGS. 8A and 8B schematically illustrate a relationship between the weight distribution information generated by the weight distribution information generating unit 803 according to the first embodiment of the present invention and training images. FIG. 8A illustrates training images contained in the training front face image group 830 and the training non-face image group 840. These training images are similar to those shown in FIGS. 5A and 5B.

FIG. 8B illustrates a weight distribution curve (weight distribution information) 850 generated for a combination of two points (the pixel positions P11 and P12). The weight distribution curve 850 is formed by using the method for generating weight information illustrated in FIGS. 7A and 7B and by connecting an accumulation value of a weight ($W_i^t$) sequentially added for each of the classes with each other using a curved line for each of the types of training image. By using the weight distribution curve, a particular weight distribution state occurring in accordance with the type of training image can be obtained. In addition, by using the weight distribution curve, the weight distribution independently generated for the face image and the non-face image can be obtained. For example, in the weight distribution curve 850 shown in FIG. 8B, a concave curve on the right side corresponds to the face images, and a concave curve on the left side corresponds to the non-face images. In general, the characteristic of the weight curve differs in accordance with a combination of two points used for computing the luminance difference value.

A method for determining a threshold value used for distinguishing a face from a non-face is described next. For example, let d denote an integer value in the abscissa of the weight distribution curve 850 shown in FIG. 8B (−255≤d≤255), and let th1 denote a constant integer value in the abscissa (−255≤th1≤255). Then, let $P_L^+(d)$ denote a value in the weight distribution curve of the training front face image in the range of d less than the constant value th1, and let $P_H^+(d)$ denote a value in the weight distribution curve of the training front face image in the range of d greater than or equal to the constant value th1. In addition, let $P_L^-(d)$ denote a value in the weight distribution curve of the training non-face image in the range of d less than the constant value th1, and let $P_H^-(d)$ denote a value in the weight distribution curve of the training non-face image in the range of d greater than or equal to the constant value th1. In FIG. 8B, the weight distribution curve of the face image in the range of d less than the constant th1 ($P_L^+(d)$) is indicated by a thin dashed line, and the weight distribution curve of the face image in the range of d greater than or equal to the constant th1 ($P_H^+(d)$) is indicated by a thick dashed line. In addition, the weight distribution curve of the non-face image in the range of d less than the constant th1 ($P_L^-(d)$) is indicated by a thick solid line, and the weight distribution curve of the non-face image in the range of d greater than or equal to the constant th1 ($P_H^-(d)$) is indicated by a thin solid line.

In this case, the optimal threshold determination unit 804 computes the sum of the weight distribution on either side of the constant value th1. For example, the sums $P_H^+, P_L^+, P_H^-$, and $P_L^-$ on either side of the constant th1 are computed as follows:

$$P_H^+ = \sum_{d=th1}^{255} P_H^+(d) \quad (2)$$

$$P_L^+ = \sum_{d=-255}^{th1} P_L^+(d) \quad (3)$$

$$P_H^- = \sum_{d=th1}^{255} P_H^-(d) \quad (4)$$

$$P_L^- = \sum_{d=-255}^{th1} P_L^-(d) \quad (5)$$

Subsequently, the optimal threshold determination unit 804 computes a value T1 for the computed sums of weight distribution $P_H^+, P_L^+, P_H^-$, and $P_L^-$ as follows:

$$T1 = \sqrt{(P_L^+ \times P_L^-)} + \sqrt{(P_H^+ \times P_H^-)} \quad (6)$$

Thereafter, the optimal threshold determination unit 804 determines the constant value th1 that minimizes the computed value T1. The constant value th1 serves as a threshold value th1 for the combination of two points (the pixel positions P11 and P12) corresponding to the weight distribution curve 850 shown in FIG. 8B. Similarly, for the other combinations (pairs) of two points in the training image, the threshold values can be determined using the weight distribution information. An example of weight distribution information generated for a combination of two points in each of the training images in this manner and the threshold value determined using the weight distribution information are shown in FIGS. 9A to 9C.

Figure 9A:
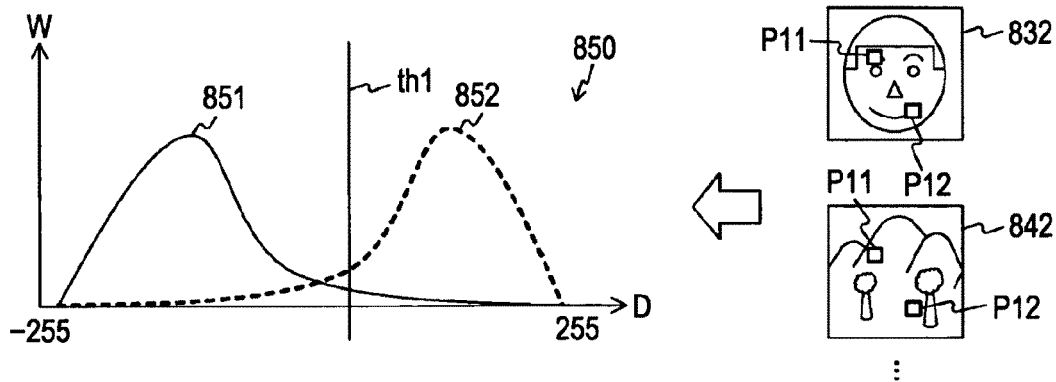
FIGS. 9A to 9C schematically illustrate a relationship between the weight distribution information generated by the weight distribution information generating unit according to the first embodiment of the present invention and a threshold value determined by an optimal threshold determination unit.
Figure 9B:
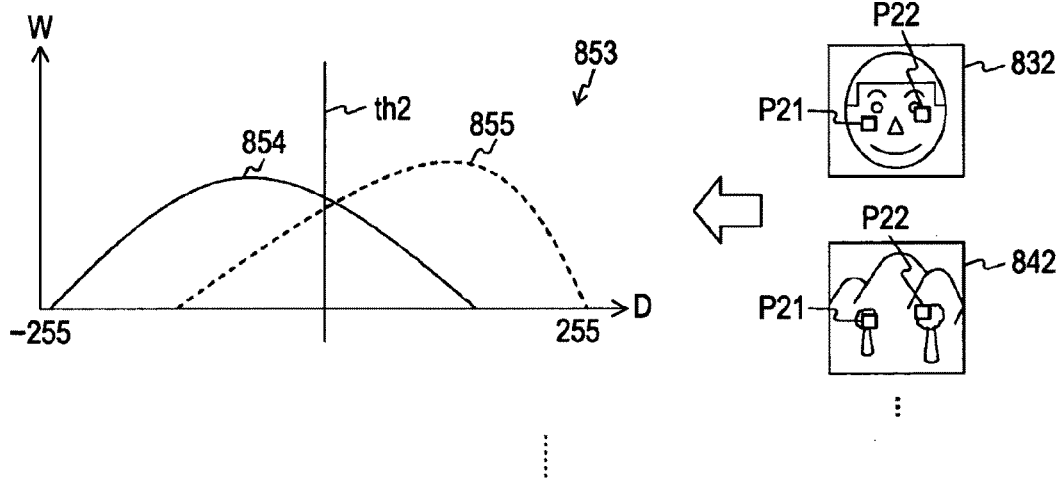
Figure 9C:
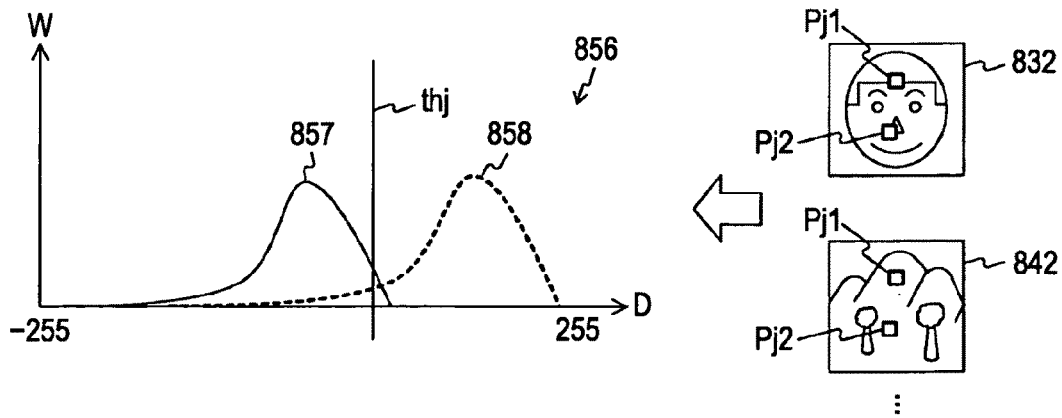

FIGS. 9A to 9C schematically illustrate a relationship between the weight distribution information generated by the weight distribution information generating unit 803 according to the first embodiment of the present invention and the threshold value determined by the optimal threshold determination unit 804. In addition to the weight distribution information and the threshold value, FIGS. 9A to 9C illustrate the combination of two points in the training image corresponding to the weight distribution information and the threshold value. Note that, in FIGS. 9A to 9C, only the training front face image 832 and the training non-face image 842 are shown among the training images contained in the training front face image group 830 and the training non-face image group 840. In addition, a relationship among the combination of two points in the training image, the weight distribution information, and the threshold value is the same as that in FIGS. 8A and 8B. As the weight distribution curve 850 shown in FIG. 9A, a weight distribution curve corresponding to a training non-face image is represented by a curve 851, and a weight distribution curve corresponding to a training front face image is represented by a curve 852.

FIG. 9B illustrates a relationship between a weight distribution curve 853 generated for the combination of two points (the pixel positions P21 and P22) in the training image and a threshold value th2 determined on the basis of the weight distribution curve 853. In addition, as the weight distribution curve 853, a weight distribution curve corresponding to a training non-face image is represented by a curve 854, and a weight distribution curve corresponding to a training front face image is represented by a curve 855.

FIG. 9C illustrates a relationship between a weight distribution curve 856 generated for a combination of two points (the pixel positions Pj1 and Pj2) in the training image and a threshold value thj determined on the basis of the weight distribution curve 856. In addition, as the weight distribution curve 856, a weight distribution curve corresponding to a training non-face image is represented by a curve 857, and a weight distribution curve corresponding to a training front face image is represented by a curve 858.

In this way, the optimal threshold determination unit 804 determines the threshold values th1 to thj for the pairs of two points in the training image using the weight distribution curves (the weight distribution information). Thereafter, the weak learner determination unit 805 selects the threshold value that minimizes the value T1 computed using equation (6) from among the determined threshold values th1 to thj. Thus, the weak learner for the weight distribution information corresponding to the selected threshold value is selected as the best weak learner.

FIGS. 10A to 10C schematically illustrate a method for recording, in the face detection dictionary, various values corresponding to the weak learner determined by the weak learner determination unit 805 according to the first embodiment of the present invention. FIG. 10A illustrates a weight distribution curve 860 and a combination of two points (pixel positions Pr1 and Pr2) in the training image corresponding to a threshold value thr determined by the weak learner determination unit 805. Note that, in FIG. 10A, a line indicating the position of the threshold value thr is represented by a thick line. In addition, as the weight distribution curve 860, a weight distribution curve corresponding to a training non-face image is represented by a curve 861, and a weight distribution curve corresponding to a training front face image is represented by a curve 862.

FIG. 10B illustrates the weight computing unit 806 that computes two weights for the threshold value thr determined by the weak learner determination unit 805. That is, the weight computing unit 806 computes a weight h(x) (two weights $h_H(x)$ and $h_L(x)$) using the sums $P_H^+$, $P_L^+$, $P_H^-$, and $P_L^-$ of weight distribution on either side of the threshold value thr in the weight distribution curve 860 as follows:

$$h(x) \begin{cases} h_H(x) = \ln\sqrt{\dfrac{P_H^+}{P_H^-}} & (7) \\ h_L(x) = -\ln\sqrt{\dfrac{P_L^+}{P_L^-}} & (8) \end{cases}$$

where x represents an identifier for identifying an image to be detected.

FIG. 10C schematically illustrates an example in which various values corresponding to the weak learner determined by the weak learner determination unit 805 are recorded in a face detection dictionary 821. The face detection dictionary 821 is stored in the face detection dictionary storage unit 820. More specifically, the threshold value thr determined by the weak learner determination unit 805 is recorded in a threshold value (θ) 824 of the face detection dictionary 821. In addition, one of the two points (the pixel position Pr1) of the combination (the combination of the pixel position Pr1 and Pr2) corresponding to the threshold value thr is stored in a position 1 (u1, v1) 822 of the face detection dictionary 821, and the other point (the pixel position Pr2) is stored in a position 2 (u2, v2) 823 of the face detection dictionary 821. Here, for example, when the upper left corner of the training image is defined as a point of origin, two positions in the training image in the horizontal direction are denoted by "u1" and "u2", and the positions in the training image in the vertical direction are denoted by "v1" and "v2". The weight h(x) (two weights $h_H(x)$ and $h_L(x)$) computed for the threshold value thr is stored in a weight (α) 825 of the face detection dictionary 821. For example, the weight $h_H(x)$ is stored in an entry (H) of weight (α) 825, and the weight $h_L(x)$ is stored in an entry (L) of the weight (α) 825. These values are stored in the face detection dictionary 821 by the recording control unit 808.

Subsequently, the weight update unit 807 computes a weight $W_i^{t+1}$ assigned to each of the training images using the following equation:

$$W_i^{t+1} = \frac{W_i^t \exp(-y_i h_t(x_i))}{\sum_{i=1}^{K} W_i^t \exp(-y_i h_t(x_i))} \quad (9)$$

The weight update unit 807 then updates the weight retained in the weight retaining unit 810. This updating is referred to as "Boosting". Here, $W_i^t$ and $y_i$ represent values retained in the weight retaining unit 810 in association with the current training image $x_i$ (refer to FIGS. 6A and 6B), $h_t(x_i)$ represents a value determined in accordance with the luminance difference value of the training image computed for the combination of two points (the pixel positions Pr1 and Pr2) corresponding to the threshold value thr determined by the weak learner determination unit 805. More specifically, when a luminance difference value Pd computed for the current training image $x_i \leq$ thr, the weight $h_H(x_i)$ computed using equation (7) is used as $h_t(x_i)$. In contrast, when Pd<thr, the weight $h_L(x_i)$ computed using equation (8) is used as $h_t(x_i)$. Accordingly, for example, for the training image that is erroneously determined on the basis of a threshold value determined by the weak learner determination unit 805, the weight can be increased. Thus, the impact of the training image on the next loop of the weak learner determination process can be increased. As described above, although the same value (1/K) is assigned to each of the training images immediately after the training image is input to the training image input unit 801, the weight ($W_i^t$) determined after t=2 is updated in accordance with each of the training images.

Subsequently, until a predetermined number of loops is reached or a predetermined accuracy is reached, the above-described process is repeated.

In this way, according to the first embodiment of the present invention, different weight values are computed for a range of the luminance different value lower than a threshold value determined by the weak learner determination unit 805 and a range greater than or equal to the threshold value. As a result, images that were difficult to distinguish in the face detection process can be easily distinguished and, therefore, the accuracy of face detection can be increased.

Figure 11A:
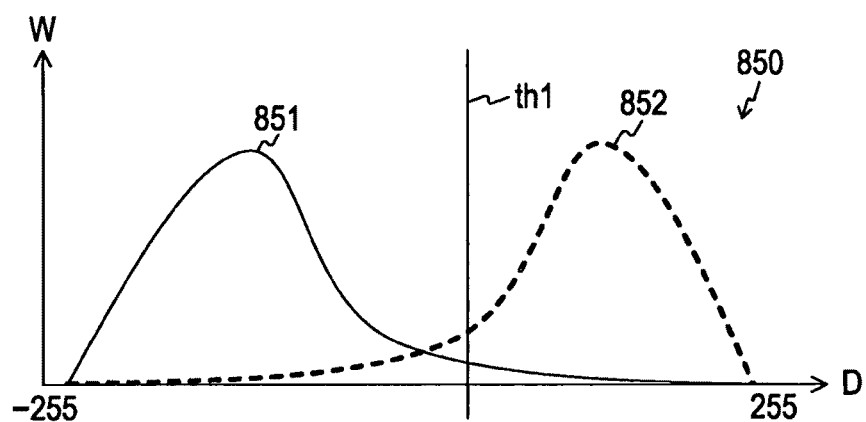
FIGS. 11A and 11B illustrate two weight distribution curves generated for a combination of two points in a training image.
Figure 11B:
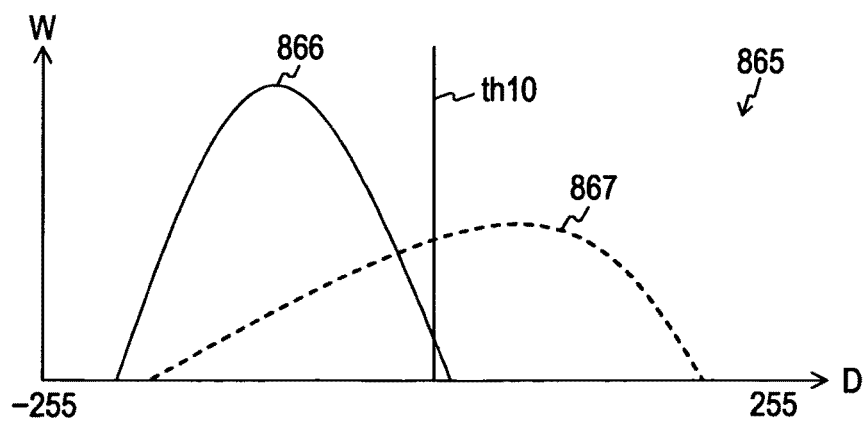

FIGS. 11A and 11B illustrate two weight distribution curves generated for a combination of two points in a training image. A weight distribution curve 850 shown in FIG. 11A is similar to the weight distribution curve 850 shown in FIG. 9A. In this case, since the characteristic of a curve corresponding to a training non-face image and the characteristic of a curve corresponding to a training front face image are noticeable for a range lower than a threshold value and a range greater than or equal to the threshold value, it is supposed that discrimination can be easily made.

FIG. 11B illustrates an example of a weight distribution curve 865 with which it is difficult to distinguish a face from a non-face in the range lower than a threshold value th10, but it is relatively easy to distinguish a face from a non-face in the range greater than or equal to the threshold value th10. As a weight distribution curve 865, a weight distribution curve corresponding to a training non-face image is represented by a curve 866, and a weight distribution curve corresponding to a training front face image is represented by a curve 867. That is, since the weight distribution states of a non-face and a face coexist in the range less than the threshold value th10, it is supposed that discrimination is difficult. However, little weight distribution of a non-face exists in the range greater than or equal to the threshold value th10, but large weight distribution of a face exists. Accordingly, it is supposed that discrimination can be relatively easily made. Even in such a case, by using different weights in the range lower than a threshold value and in the range greater than or equal to the threshold value th10, the face can be significantly effectively detected. Accordingly, since the number of weak learners can be reduced, the face detection process can be performed at high speed. In addition, even when the number of weak learners is reduced, the accuracy of face detection can be increased.

When a face detection process is performed using the face detection dictionary 821 generated in the above-described manner, a final hypothesis H(x) is computed for a detection target image x (24×24 pixels) using the information items at t=1 to T contained in the face detection dictionary 821 as follows:

$$H(x) = \sum_{t=1}^{T} h(x) \tag{10}$$

The process flow of when the final hypothesis H(x) indicated by equation (10) is computed by using equations (7) and (8) and face determination is made is illustrated as follows:

$$h(x) \begin{cases} h_H(x) = \ln\sqrt{\frac{P_H^+}{P_H^-}} & (7) \\ h_L(x) = -\ln\sqrt{\frac{P_L^+}{P_L^-}} & (8) \end{cases}$$

$$\Downarrow$$

$$H(x) = \sum_{t=1}^{T} h(x) \tag{10}$$

For example, when a face detection process is performed on an image x, the luminance values of two points in the image x corresponding to a position 1 (u1, v1) 822 and a position 2 (u2, v2) 823 in a tth row of the face detection dictionary 821 are extracted. Thereafter, the difference value between the luminance values of the two points is computed. This difference value is compared with a value contained in the threshold value (θ) 824 of the face detection dictionary 821. For example, let Dt denote a difference value between the luminance values of two points, and let tht denote a value contained in the threshold value (θ) 824. Then, if Dt≥tht, a value contained in (H) of weight (α) 825 (i.e., the weight $h_H(x)$ indicated by equation (7)) is selected. However, if Dt<tht, a value contained in (L) of weight (α) 825 (i.e., the weight $h_L(x)$ indicated by equation (8)) is selected. Subsequently, by sequentially summing the value contained in the selected weight (α) 825 (H or L), a final hypothesis H(x) is obtained. If H(x)<0, it is determined that the face is not contained in the current image x. However, if H(x)≤0, it is determined that the face is contained in the current image x. This face determination process is described in more detail below with reference to FIGS. 22A to 25C.

Example of Generation of Dictionary for Detecting Plural Different Objects

In the above description, an example of generation of a face detection dictionary using training front face images containing the face of a person serving as objects and training non-face images containing no face of a person is illustrated. However, by applying the above-described computation method, a dictionary for detecting a plurality of different objects at the same time can be generated. More specifically, in order to detect a plurality of different objects, a dictionary for computing an evaluation value used for determining whether each of the objects is contained in the image at the same time can be generated. That is, a dictionary for performing a determination process on a plurality of classes at the same time can be generated. An example of generation of a face detection dictionary used for detecting a front face and detecting a side face turned to the left at the same time is described below. The functional structure is the same as that of FIG. 4. Accordingly, the same numbering will be used in describing the following drawings as was utilized in describing FIG. 4. Different functions are mainly described below, and the descriptions of the same functions are not repeated.

Figure 12A:
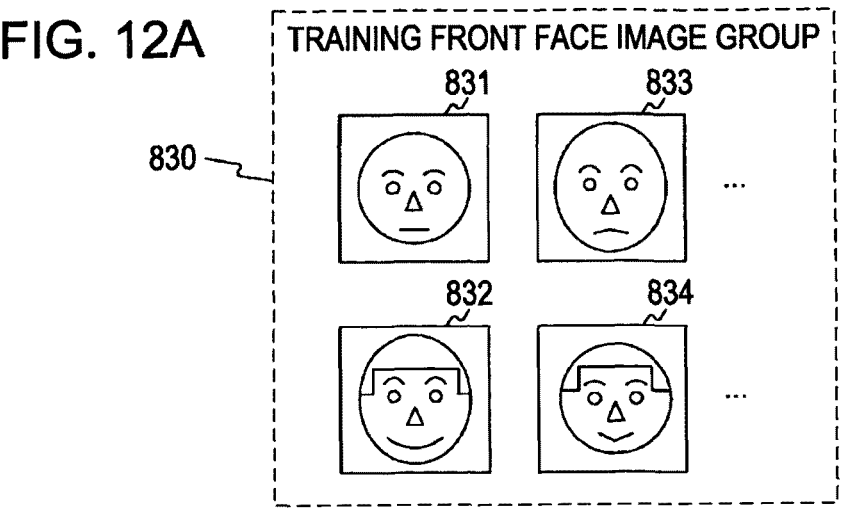
FIGS. 12A to 12C illustrate an example of training images used for a learning process performed by the learning apparatus according to the first embodiment of the present invention.
Figure 12B:
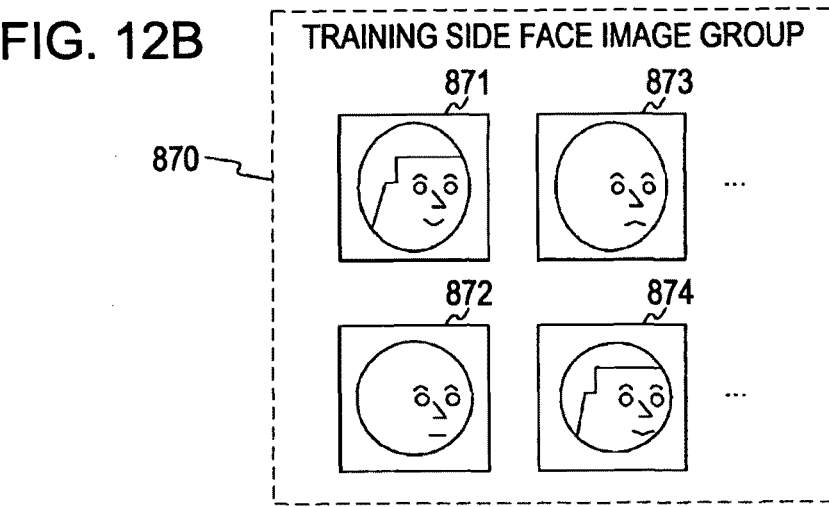
Figure 12C:
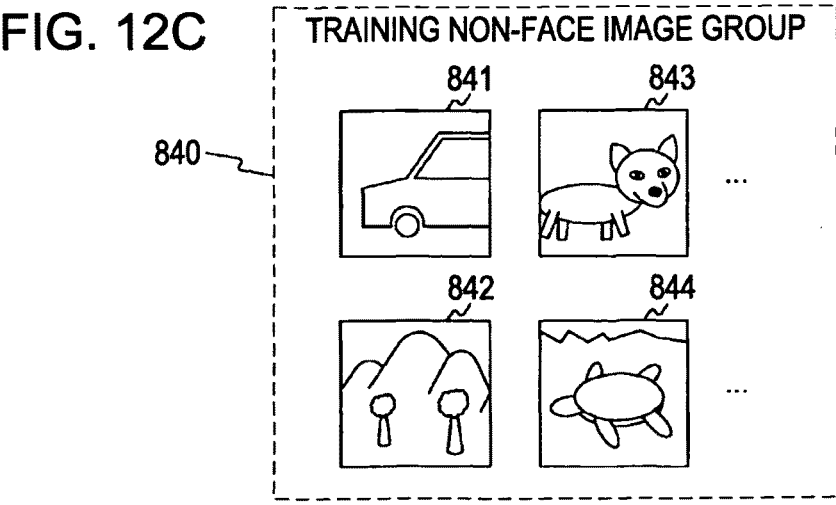

FIGS. 12A to 12C illustrate an example of training images used for a learning process performed by the learning apparatus 800 according to the first embodiment of the present invention. FIG. 12A illustrates a training front face image group 830 including a plurality of training front face images. FIG. 12B illustrates a training side face image group 870 including a plurality of training side face images. FIG. 12C illustrates a training non-face image group 840 including a plurality of training non-face images. Note that the training front face image group 830 and the training non-face image group 840 shown in FIGS. 12A and 12C are the same as the training front face image group 830 and the training non-face image group 840 shown in FIGS. 5A and 5B, respectively. Accordingly, the same numbering will be used in describing FIGS. 12A and 12C as was utilized in describing FIGS. 5A and 5B, and the descriptions thereof are not repeated. For simplicity, in the example shown in FIGS. 12A to 12C, simplified images are shown as the training images.

For example, as indicated by training side face images 871 to 874 shown in FIG. 12B, a plurality of sample images each including a side face (a face turned to the left) of a person are used as the training side face images. In addition, in this example, the face detection dictionary is generated using about ten thousand training front face images, about ten thousand training side face images, and about hundred thousand training non-face images. These training images are sequentially input to the training image input unit 801 for each of these types.

Figures 13A, 13B:
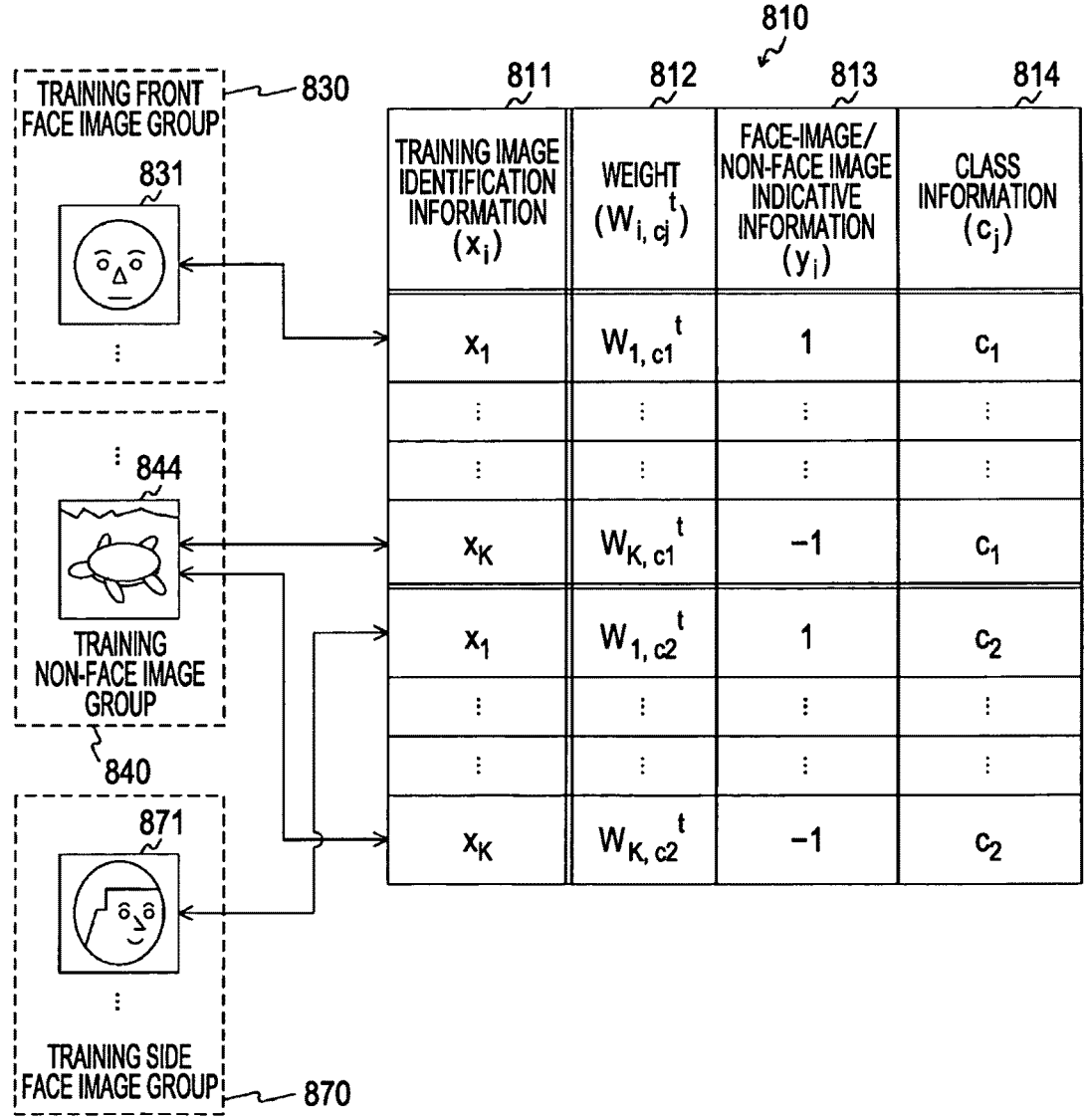
FIGS. 13A and 13B are schematic illustrations of information retained in the weight retaining unit according to the first embodiment of the present invention.

FIGS. 13A and 13B are schematic illustrations of the information retained in the weight retaining unit 810 according to the first embodiment of the present invention. As shown in FIGS. 13A and 13B, class information 814 is additionally provided as an information item retained in the weight retaining unit 810, and a weight is retained for each of the classes. The other information items are the same as those in the weight retaining unit 810 shown in FIGS. 6A and 6B. Accordingly, the same numbering will be used in describing FIGS. 13A and 13B as was utilized in describing FIGS. 6A and 6B, and the descriptions thereof are not repeated. Different information is mainly described below. FIG. 13A illustrates a training image for which the weight is retained in the weight retaining unit 810. FIG. 13B illustrates the information that corresponds to the training image and that is retained in the weight retaining unit 810. In addition, the correspondences between the information items shown in FIG. 13A and the information items shown in FIG. 13B are shown by the arrows connecting the information items. Note that the training images contained in the training side face image group 870 shown in FIG. 13A represent some of the training images shown in FIGS. 12A and 12B. The same numbering will be used in describing the same training images. In addition, in this example, the number of images contained in the training front face image group 830 is the same as the number of images contained in the training side face image group 870.

The training image identification information ($x_i$) 811 contains $x_i$ used for identifying a training image ($1 \le i \le K$). In the example shown in FIG. 13B, the sum of the number of images contained in the training front face image group 830 and the number of images contained in the training non-face image group 840 is K. In addition, the sum of the number of images contained in the training side face image group 870 and the number of images contained in the training non-face image group 840 is K. For example, K can be set to 110000. Furthermore, for example, the training image identification information ($x_i$) 811 contains $x_1$ in association with the training side face image 871.

As described above, a weight ($W_{i,cj}^r$) 812 contains a weight for each of the classes. That is, as shown in FIG. 13B, a weight is retained for each of the class of the training images contained in the training front face image group 830 and the training non-face image group 840 and the class of the training images contained in the training side face image group 870 and the training non-face image group 840. Here, for the training images contained in the training non-face image group 840, the same image is used for all of the classes. However, the weight values sequentially updated by the weight update unit 807 are different. In addition, as a weight ($W_{i,cj}^1$), the same value (1/K) is assigned to each of the training images immediately after the training image is input to the training image input unit 801. In addition, for example, the weight ($W_{i,cj}^r$) 812 contains $W_{1,c2}^r$ in association with the training side face image 871. Here, $c_j$ corresponds to $c_j$ contained in class information ($c_j$) 814 and represents the class to which the weight belongs.

As in the case of a training front face image, the face-image/non-face image indicative information ($y_i$) 813 contains "1" for a training side face image. For example, the face-image/non-face image indicative information ($y_i$) 813 contains "1" in association with the training side face image 871.

The class information ($c_j$) 814 contains information used for identifying a class. For example, "$c_1$" is retained for a training front face image, and "$c_2$" is retained for a training side face image. In addition, "$c_1$" is retained for the weight of a training non-face image belonging to the class of the training front face image, and "$c_2$" is retained for the weight of a training non-face image belonging to the class of the training side face image. For example, the class information ($c_j$) 814 contains "$c_1$" for the weight of the training non-face image 844 belonging to the class of a training front face image, and the class information ($c_j$) 814 contains "$c_2$" for the weight of the training non-face image 844 belonging to the class of a training side face image.

Figure 14A:
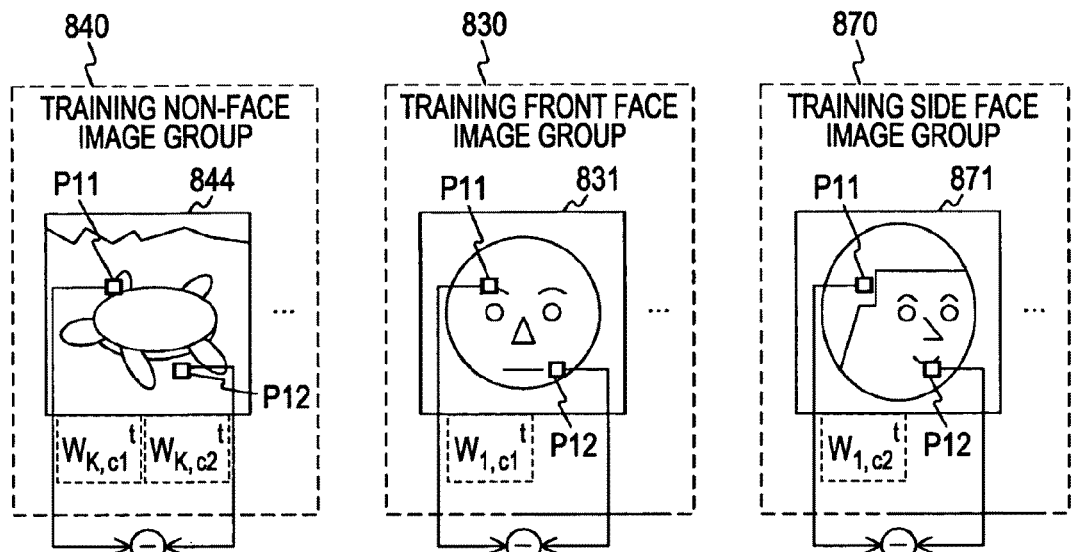
FIGS. 14A to 14C schematically illustrate a method for generating weight distribution information in the weight distribution information generating unit according to the first embodiment of the present invention.
Figure 14B:
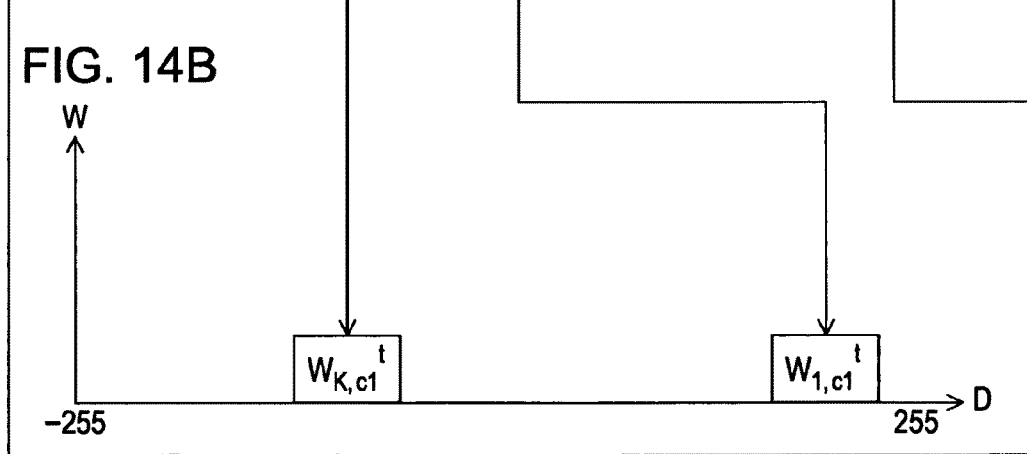
Figure 14C:
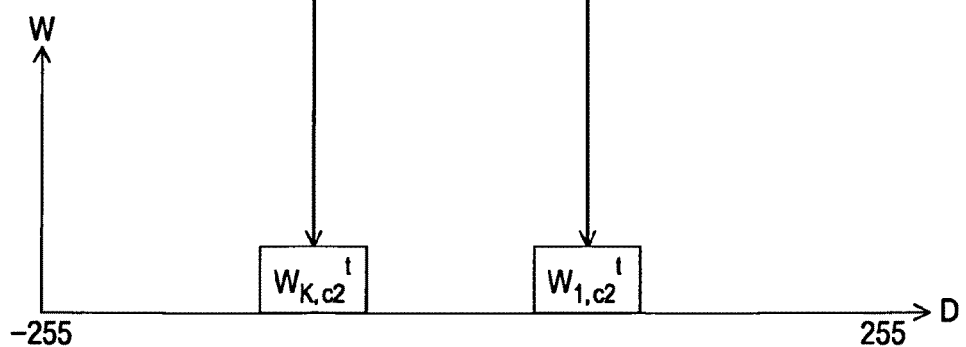

FIGS. 14A to 14C schematically illustrate a method for generating the weight distribution information using the weight distribution information generating unit 803 according to the first embodiment of the present invention. An example of a method shown in FIGS. 14A to 14C is a modification of the method shown in FIGS. 7A and 7B. In the method shown in FIGS. 14A to 14C, weight distribution information for a training side face image and a training non-face image is generated in addition to the weight distribution information for a training front face image and a training non-face image. Accordingly, the same numbering will be used in describing FIGS. 14A to 14C as was utilized in describing FIGS. 7A and 7B. Different functions are mainly described below, and the descriptions of the same functions are not repeated.

As shown in FIG. 14A, a method for computing a luminance difference value between two points in each of the training images is similar to that illustrated in FIG. 7A. In addition, as shown in FIG. 14B, a method for generating weight distribution information on the basis of the luminance difference value between two points in each of the training side face image and the training non-face image is similar to that illustrated in FIG. 7B.

Note that, unlike the weight distribution information shown in FIG. 7B, the weight distribution information shown in FIG. 14C is weight distribution information regarding the training side face image and a training non-face image. However, the method for generating weight distribution information on the basis of the luminance difference value between two points in each of a training side face image and a training non-face image is similar to that illustrated in FIG. 7B.

More specifically, the weight distribution information generating unit 803 adds, to the class of a difference value computed by the luminance difference value computing unit 802, a weight ($W_{i,cj}^t$) retained in the weight retaining unit 810 in association with the training image from which the difference value is computed. This addition process is performed for each of the classes. That is, this addition process is performed for each of the weight distribution graph associated with the training front face image and the training non-face image shown in FIG. 14B and the weight distribution graph associated with the training side face image and the training non-face image shown in FIG. 14C. For example, as shown in FIG. 14B, a weight ($W_{1,c1}^t$, $W_{K,c1}^t$) corresponding to each of the training images is added to the class of a difference value computed for the training front face image 831 and the training non-face image 844. In addition, as shown in FIG. 14C, a weight ($W_{1,c2}^t$, $W_{K,c2}^t$) corresponding to each of the training images is added to the class of a difference value computed for the training side face image 871 and the training non-face image 844. In this way, for a training non-face image, the addition process is performed for each of the weight distribution graph shown in FIG. 14B and the weight distribution graph shown in FIG. 14C at the same time. Similarly, for the other training images, a weight ($W_{i,cj}^t$) corresponding to the training image is sequentially added, and weight distribution information is generated. In addition, for another combination (pair) of two points in the training image, a weight ($W_i^t$) associated with the training image is sequentially added in a similar manner, and weight distribution information is generated. An example of the weight distribution information generated for a combination of two points (the pixel positions P11 and P12) in each of the training images in this manner is shown in FIGS. 15A and 15B.

Figure 15A:
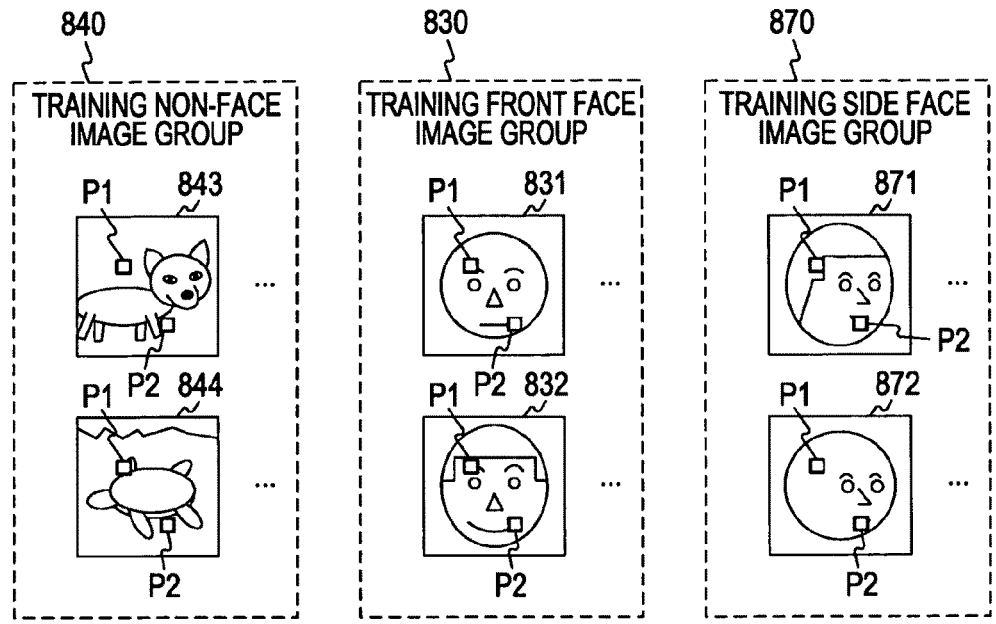
FIGS. 15A and 15B schematically illustrate a relationship between the weight distribution information generated by the weight distribution information generating unit according to the first embodiment of the present invention and training images.
Figure 15B:
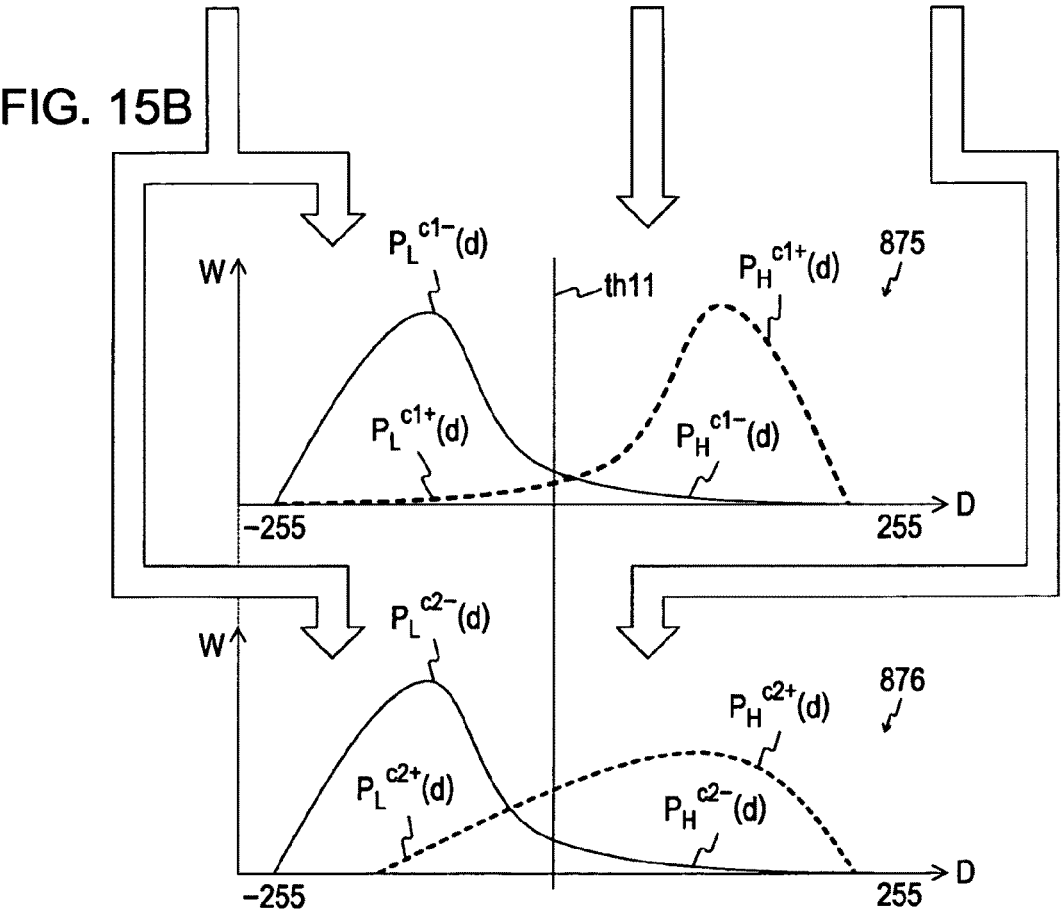

FIGS. 15A and 15B schematically illustrate a relationship between the weight distribution information generated by the weight distribution information generating unit 803 according to the first embodiment of the present invention and training images. FIG. 15A illustrates training images contained in the training front face image group 830, the training side face image group 870, and the training non-face image group 840. These training images are similar to some of the training images shown in FIGS. 12A to 12C.

FIG. 15B illustrates weight distribution curves (weight distribution information) 875 and 876 generated for a combination of two points (the pixel positions P11 and P12). As shown in FIG. 14B, the weight distribution curve 875 is formed by connecting an accumulation value of a weight ($W_{i,c1}^t$) sequentially added for each of the types of training image contained in the training front face image group and the training non-face image group. As shown in FIG. 14C, the weight distribution curve 876 is formed by connecting an accumulation value of a weight ($W_{i,c2}^t$) sequentially added for each of the types of training image contained in the training side face image group and the training non-face image group. By using these weight distribution curves, a particular weight distribution state occurring in accordance with the type of training image can be obtained. In addition, by using the weight distribution curves, the weight distribution independently generated for the front face image and the non-face image and for the left-turned side face image and the non-face image can be obtained. For example, in the weight distribution curve 875, a concave curve on the right side corresponds to the front face images, and a concave curve on the left side corresponds to the non-face images. In addition, in the weight distribution curve 876, a concave curve on the right side corresponds to the left-turned side face images, and a concave curve on the left side corresponds to the non-face images. For example, in the weight distribution curves 875 and 876, when t=1, the training images subjected to the addition process are the same. Accordingly, the curves are the same. In addition, in the weight distribution curves 875 and 876, the curve corresponding to the front face image and the curve corresponding to the left-turned side face image have different training images subjected to the addition process. Thus, the two curves are different.

A method for determining a threshold value used for distinguishing among a front face, a left-turned side face, and a non-face is described next. For example, let d denote an integer value in the abscissa of the weight distribution curves 875 and 876 shown in FIG. 15B (−255≤d≤255), and let th11 denote a constant integer value in the abscissa (−255≤th11≤255). Then, let $P_L^{c1+}(d)$ denote a value in the weight distribution curve of the training front face image in the range of d less than the constant value th11, and let $P_H^{c1+}(d)$ denote a value in the weight distribution curve of the training front face image in the range of d greater than or equal to the constant value th11. In addition, let $P_L^{c2+}(d)$ denote a value in the weight distribution curve of the training side face image in the range of d less than the constant value th11, and let $P_H^{c2+}(d)$ denote a value in the weight distribution curve of the training side face image in the range of d greater than or equal to the constant value th11. Furthermore, for a class ($c_1$), let $P_L^{c1-}(d)$ denote a value in the weight distribution curve of the training non-face image in the range of d less than the constant value th11, and let $P_H^{c1-}(d)$ denote a value in the weight distribution curve of the training non-face image in the range of d greater than or equal to the constant value th11. Still furthermore, for a class ($c_2$), let $P_L^{c2-}(d)$ denote a value in the weight distribution curve of the training non-face image in the range of d less than the constant value th11, and let $P_H^{c2-}(d)$ denote a value in the weight distribution curve of the training non-face image in the range of d greater than or equal to the constant value th11.

In this case, the optimal threshold determination unit 804 computes the sum of the weight distribution on either side of the constant th11 for each of the weight distribution curves 875 and 876. For example, for the weight distribution curve 875, the sums $P_H^{c1+}$, $P_L^{c1+}$, $P_H^{c1-}$, and $P_L^{c1-}$ on either side of the constant th11 are computed as follows:

$$P_H^{c1+} = \sum_{d=th11}^{255} P_H^{c1+}(d) \qquad (11)$$

$$P_L^{c1+} = \sum_{d=-255}^{th11} P_L^{c1+}(d) \qquad (12)$$

$$P_H^{c1-} = \sum_{d=th11}^{255} P_H^{c1-}(d) \qquad (13)$$

$$P_L^{c1-} = \sum_{d=-255}^{th11} P_L^{c1-}(d) \qquad (14)$$

In addition, for example, for the weight distribution curve 876, the sums $P_H^{c2+}$, $P_L^{c2+}$, $P_H^{c2-}$, and $P_L^{c2-}$ on either side of the constant th11 are computed as follows:

$$P_H^{c2+} = \sum_{d=th11}^{255} P_H^{c2+}(d) \quad (15)$$

$$P_L^{c2+} = \sum_{d=-255}^{th11} P_L^{c2+}(d) \quad (16)$$

$$P_H^{c2-} = \sum_{d=th11}^{255} P_H^{c2-}(d) \quad (17)$$

$$P_L^{c2-} = \sum_{d=-25}^{th11} P_L^{c2-}(d) \quad (18)$$

Note that, as described above, in the weight distribution curves 875 and 876, the curves corresponding to the non-face image are the same when t=1. Accordingly, $P_H^{c1-}$ indicated by equation (13) and $P_H^{c2-}$ indicated by equation (17) have the same value. Similarly, when t=1, $P_L^{c1-}$ indicated by equation (14) and $P_L^{c2-}$ indicated by equation (18) have the same value.

Subsequently, the optimal threshold determination unit 804 computes a value T11 for the computed sums of weight distribution $P_H^{c1+}$, $P_L^{c1+}$, $P_H^{c1-}$, $P_L^{c1-}$, $P_H^{c2+}$, $P_L^{c2+}$, $P_H^{c2-}$, and $P_L^{c2-}$ as follows:

$$T11 = \sqrt{(P_L^{c1+} \times P_L^{c1-})} + \sqrt{(P_H^{c1+} \times P_H^{c1-})} + \sqrt{(P_L^{c2+} \times P_L^{c2-})} + \sqrt{(P_H^{c2+} \times P_H^{c2-})} \quad (19)$$

Thereafter, the optimal threshold determination unit 804 determines the constant value th11 that minimizes the computed value T11. The constant value th11 serves as a threshold value th11 for the combination of two points (the pixel positions P11 and P12) corresponding to the weight distribution curves 875 and 876 shown in FIG. 15B. Similarly, for the other combinations (pairs) of two points in the training image, the threshold values can be determined using the weight distribution curves (the weight distribution information). An example of weight distribution information generated for a combination of two points in each of the training images in this manner and the threshold value determined using the weight distribution information are shown in FIGS. 16A and 16B.

Figure 16A:
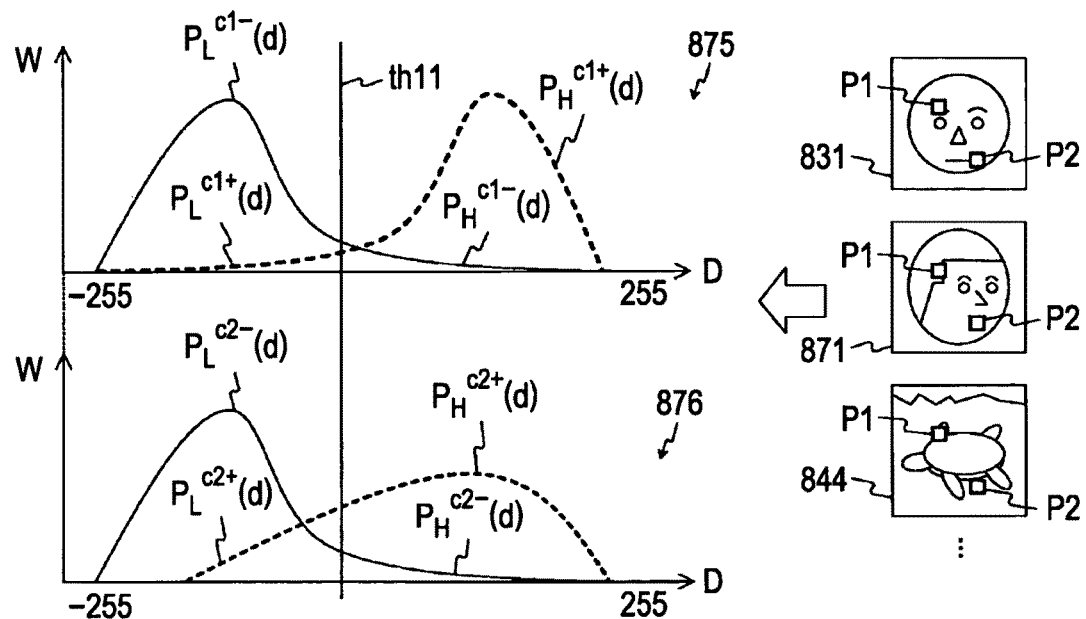
FIGS. 16A and 16B schematically illustrate a relationship between the weight distribution information generated by the weight distribution information generating unit according to the first embodiment of the present invention and the threshold value determined by the optimal threshold determination unit.
Figure 16B:
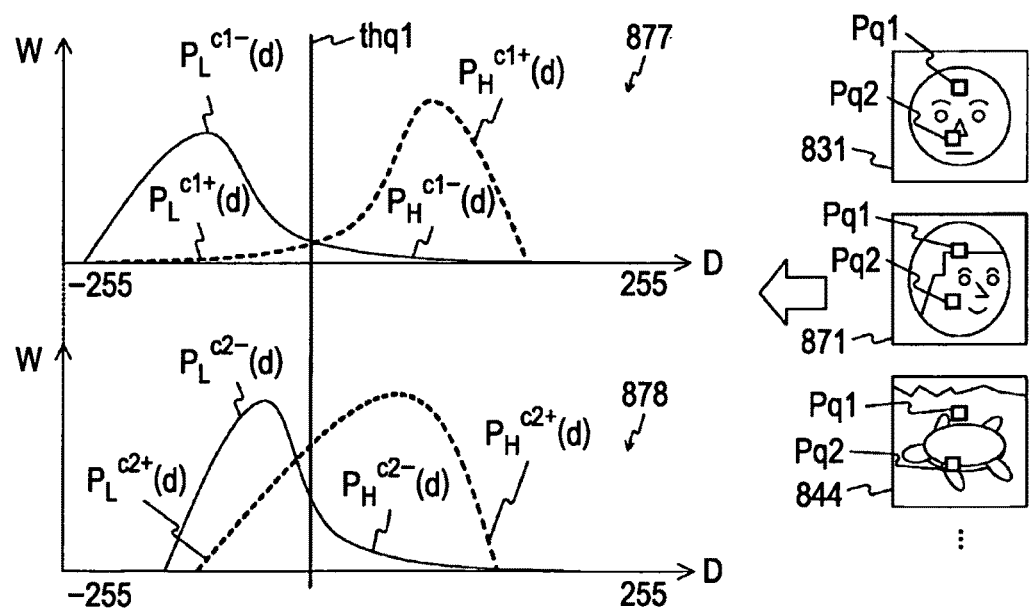

FIGS. 16A and 16B schematically illustrate a relationship between the weight distribution information generated by the weight distribution information generating unit 803 according to the first embodiment of the present invention and the threshold value determined by the optimal threshold determination unit 804. In addition to the weight distribution information and the threshold value, FIGS. 16A and 16B illustrate the combination of two points in the training image corresponding to the weight distribution information and the threshold value. Note that, in FIGS. 16A and 16B, only the training front face image 831, the training side face image 871, and the training non-face image 844 are shown among the training images contained in the training front face image group 830, the training side face image group 870, and the training non-face image group 840. In addition, a relationship among the combination of two points in the training image, the weight distribution information, and the threshold value is the same as that shown in FIGS. 15A and 15B.

FIG. 16B illustrates a relationship between weight distribution curves 877 and 878 generated for a combination of two points (pixel positions Pq1 and Pq2) in the training image and a threshold value thq1 determined on the basis of the weight distribution curves 877 and 878.

In this way, the optimal threshold determination unit 804 determines the threshold values th11 to thq1 for the pairs of two points in the training image using the weight distribution information. Thereafter, the weak learner determination unit 805 selects, from among the determined threshold values th11 to thq1, the threshold value that minimizes the value T11 computed using equation (19). Thus, the weak learner for the weight distribution information corresponding to the selected threshold value is selected as the best weak learner.

FIGS. 17A to 17C schematically illustrate a method for recording, in the face detection dictionary, various values corresponding to the weak learner determined by the weak learner determination unit 805 according to the first embodiment of the present invention. FIG. 17A illustrates weight distribution curves 880 and 881 and a combination of two points (pixel positions Pr11 and Pr12) in the training image corresponding to a threshold value thr11 determined by the weak learner determination unit 805. Note that, in FIG. 17A, a line indicating the position of the threshold value thr11 is represented by a thick line. In addition, as the weight distribution curve 880 (class: $c_1$), a weight distribution curve corresponding to a training non-face image is represented by a curve 882, and a weight distribution curve corresponding to a training front face image is represented by a curve 883. Furthermore, as the weight distribution curve 881 (class: $c_2$), a weight distribution curve corresponding to a training non-face image is represented by a curve 884, and a weight distribution curve corresponding to a training side face image is represented by a curve 885.

FIG. 17B illustrates the weight computing unit 806 that computes four weights for the threshold value thr11 determined by the weak learner determination unit 805. That is, the weight computing unit 806 computes a weight $h(x, c_1)$ relating to a front face and a weight $h(x, c_2)$ relating to a left-turned side face on the basis of the sums of the weight distribution on either side of the threshold value thr11 of the weight distribution curves 880 and 881. Here, the sums of the weight distribution on either side of the threshold value thr11 are $P_H^{c1+}$, $P_L^{c1+}$, $P_H^{c1-}$, $P_L^{c1-}$, $P_H^{c2+}$, $P_L^{c2+}$, $P_H^{c2-}$, and $P_L^{c2-}$. In addition, the weight $h(x, c_1)$ relating to a front face includes two weights $h_H(x, c_1)$ and $h_L(x, c_1)$, and the weight $h(x, c_2)$ relating to a left-turned side face includes two weights $h_H(x, c_2)$ and $h_L(x, c_2)$. More specifically, the weight $h(x, c_1)$ is computed on the basis of the sums of the weight distribution on either side of the threshold value thr11 of the weight distribution curve 880 using the following equations (20) and (21). In addition, the weight $h(x, c_2)$ is computed on the basis of the sums of the weight distribution on either side of the threshold value thr11 of the weight distribution curve 881 using the following equations (22) and (23):

$$h(x, c_1) \begin{cases} h_H(x, c_1) = \ln\sqrt{\dfrac{P_H^{c1+}}{P_H^{c1-}}} & (20) \\ h_L(x, c_1) = -\ln\sqrt{\dfrac{P_L^{c1+}}{P_L^{c1-}}} & (21) \end{cases}$$

$$h(x, c_2) \begin{cases} h_H(x, c_2) = \ln\sqrt{\dfrac{P_H^{c2+}}{P_H^{c2-}}} & (22) \\ h_L(x, c_2) = -\ln\sqrt{\dfrac{P_L^{c2+}}{P_L^{c2-}}} & (23) \end{cases}$$

where x represents an identifier for identifying an image to be detected.

FIG. 17C schematically illustrates an example in which various values corresponding to the weak learner determined by the weak learner determination unit 805 are recorded in a face detection dictionary 826. The face detection dictionary 826 is stored in the face detection dictionary storage unit 820. More specifically, the threshold value thr11 determined by the weak learner determination unit 805 is recorded in a threshold value (θ) 824 of the face detection dictionary 826. In addition, one of the two points (the pixel position Pr11) of the combination of two points (the pixel position Pr11 and Pr12) corresponding to the threshold value thr11 is stored in a position 1 (u1, v1) 822 of the face detection dictionary 826, and the other point (the pixel position Pr12) is stored in a position 2 (u2, v2) 823 of the face detection dictionary 826. Furthermore, the weights h(x, $c_1$) and h(x, $c_2$) computed for the threshold value thr11 are stored in weights (α1 and α2) 827 of the face detection dictionary 826. For example, the weight $h_H$(x, $c_1$) of h(x, $c_1$) is stored in an entry (H) of weight (α1) 827, and the weight $h_L$(x, $c_1$) of h(x, $c_1$) is stored in an entry (L) of weight (α1) 827. The weight $h_H$(x, $c_2$) of h(x, $c_2$) is stored in an entry (H) of weight (α2) 827, and the weight $h_L$(x, $c_2$) of h(x, $c_2$) is stored in an entry (L) of weight (α2) 827. These values are stored in the face detection dictionary 826 by the recording control unit 808.

Subsequently, the weight update unit 807 computes a weight $W_{i,c_j}^{t+1}$ assigned to each of the training images using the following equation:

$$W_{i,c_j}^{t+1} = \frac{W_{i,c_j}^t \exp(-y_i h_t(x_i, c_j))}{\sum_{i=1}^{K} W_{i,c_j}^t \exp(-y_i h_t(x_i, c_j))} \quad (24)$$

The weight update unit 807 then updates the weight retained in the weight retaining unit 810. Here, $W_{i,c_j}^t$ and $y_i$ represent values retained in the weight retaining unit 810 in association with the current training image $x_i$ (refer to FIGS. 13A and 13B). $h_t(x_i, c_j)$ represents a value determined in accordance with the luminance difference value of a training image computed for the combination of two points (the pixel positions Pr11 and Pr12) corresponding to the threshold value thr11 determined by the weak learner determination unit 805. Here, $c_j$ represents a class (refer to FIGS. 13A and 13B) retained in the weight retaining unit 810 in association with the training image $x_i$. More specifically, when "$c_1$" is contained in the class information ($c_j$) 814 retained in the weight retaining unit 810 in association with the training image $x_i$, the weight h(x, $c_1$) computed using one of equations (20) and (21) is used. In contrast, when "$c_2$" is contained in the class information ($c_j$) 814 retained in the weight retaining unit 810 in association with the training image $x_i$, the weight h(x, $c_2$) computed using one of equations (22) and (23) is used. Let Pd denote a luminance difference value computed for a combination of two points (the pixel positions Pr11 and Pr12) in the training image $x_i$. For example, when "$c_1$" is contained in the class information ($c_j$) 814 retained in the weight retaining unit 810 in association with the training image $x_i$ and if Pd≥thr11, the weight $h_H$(x, $c_1$) computed using equation (20) is used. However, if Pd<thr11, the weight $h_L$(x, $c_1$) computed using equation (21) is used. When "$c_2$" is contained in the class information ($c_j$) 814 and if Pd thr11, the weight $h_H$(x, $c_2$) computed using equation (22) is used. However, if Pd<thr11, the weight $h_L$(x, $c_2$) computed using equation (23) is used. In this way, $h_t(x_i, c_i)$ is selected in accordance with the luminance difference value and is used. Accordingly, for example, for the training image that is erroneously determined on the basis of a threshold value determined by the weak learner determination unit 805, the weight can be increased. Thus, the impact of the training image on the next loop of the weak learner determination process can be increased. As described above, although the same value (1/K) serving as the weight ($W_{i,c_j}^t$) is assigned to each of the training images immediately after the training image is input to the training image input unit 801, the weight ($W_{i,c_j}^t$) determined after t=2 is updated in accordance with each of the training images.

Subsequently, until a predetermined number of loops is reached or a predetermined accuracy is reached, the above-described process is repeated.

In this way, according to the first embodiment of the present invention, even when two or more objects are present, different weight values are computed for a range lower than a threshold value determined by the weak learner determination unit 805 and a range greater than or equal to the threshold value. As a result, in the face detection process for detecting a plurality of objects at the same time, images that were difficult to distinguish can be easily distinguished and, therefore, the accuracy of face detection can be increased.

In the above description, an example of generation of an object detection dictionary used for detecting two objects (i.e., a front face and a left-turned side face) is illustrated. However, an object detection dictionary for detecting three or more objects can be generated by applying the above-described example. In such a case, a weight h(x, $c_j$) for a class ($c_j$) can be computed as follows:

$$h(x, c_j) \begin{cases} h_H(x, c_j) = \ln \sqrt{\frac{P_H^{c_j+}}{P_H^{c_j-}}} & (25) \\ h_L(x, c_j) = -\ln \sqrt{\frac{P_L^{c_j+}}{P_L^{c_j-}}} & (26) \end{cases}$$

In addition, in the above-described example, the description is made with reference to the human face turned in different directions. However, for example, even when an object detection dictionary relating to a plurality of objects of different types (e.g., dogs and cats) is generated, this example can be applied. Furthermore, when an attribute detection dictionary used for attribute determination (e.g., men/women determination or age determination) is generated, this example can be applied.

When a face detection process is performed using the face detection dictionary 826 generated in the above-described manner, a final hypothesis H(x) in terms of each of the two objects is computed for a detection target image x (24×24 pixels) using the information items at t=1 to T contained in the face detection dictionary 826. That is, a final hypothesis H(x, $c_1$) in terms of a front face and a final hypothesis H(x, $c_2$) in terms of a left-turned side face can be computed by using the following equations:

$$H(x, c_1) = \sum_{t=1}^{T} h(x, c_1) \quad (27)$$

$$H(x, c_2) = \sum_{t=1}^{T} h(x, c_2) \quad (28)$$

Subsequently, it is determined whether a front face is contained in the detection target image x on the basis of whether $H(x, c_1) \geq 0$ or $H(x, c_1) < 0$. In addition, it is determined whether a left-turned side face is contained in the detection target image x on the basis of whether $H(x, c_2) \geq 0$ or $H(x, c_2) < 0$. Such face determination is described in more detail below with reference to FIGS. 22A to 25C.

As described above, according to the first embodiment of the present invention, by using the same luminance difference value, the discrimination processes for two different objects can be performed at the same time. Thus, a face detection process can be performed at high speed.

Exemplary Operation Performed by Learning Apparatus

An exemplary operation performed by the learning apparatus 800 according to the first embodiment of the present invention is described below with reference to the accompanying drawings.

Figure 18:
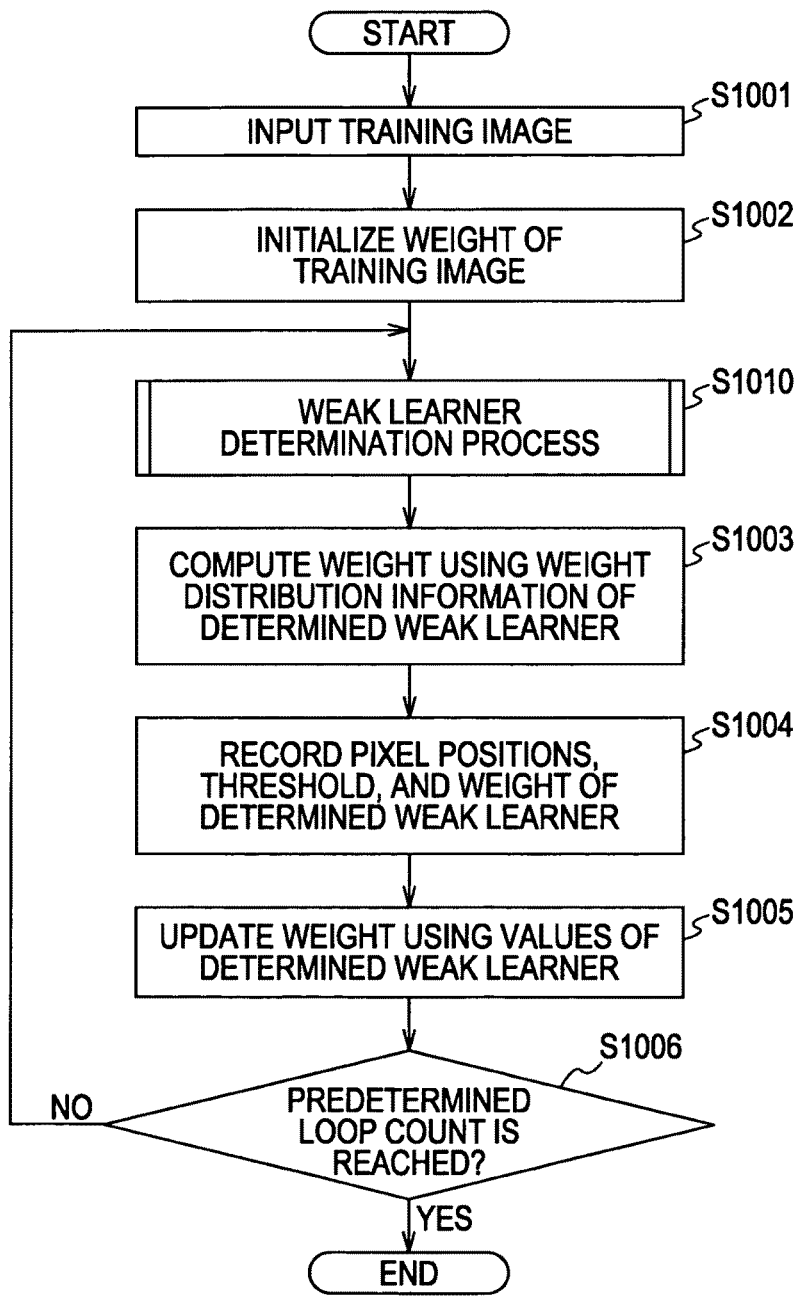
FIG. 18 is a flowchart illustrating a processing procedure of an object detection dictionary generation process performed by the learning apparatus according to the first embodiment of the present invention.

FIG. 18 is a flowchart illustrating a processing procedure of an object detection dictionary generation process performed by the learning apparatus 800 according to the first embodiment of the present invention. In this example, a face detection dictionary used for detecting a front face serving as an object is generated. In addition, in this example, an object detection dictionary generation process is repeatedly performed until the object detection dictionary generation process is performed a predetermined number of times.

First, a plurality of training front face images and training non-face images are input to the training image input unit 801 (step S1001). Thereafter, the weight update unit 807 initializes a weight ($W_i^t$) assigned to each of the training images (step S1002). That is, the weight ($W_i^t$) of the same value is assigned to each of the training images. Subsequently, a weak learner determination sub-process is performed (step S1010). The weak learner determination sub-process is described in more detail below with reference to FIG. 19.

Subsequently, the weight computing unit 806 computes a weight on the basis of weight distribution information corresponding to the determined best weak learner (step S1003). Thereafter, the recording control unit 808 records a combination of two points (two pixel positions) corresponding to the determined best weak learner, a threshold value, and the weight value in the face detection dictionary (step S1004). The weight update unit 807 then computes a weight $W_i^{t+1}$ to be assigned to each of the training images on the basis of the determined weak learner and updates the weight retained in the weight retaining unit 810 (step S1005). Subsequently, it is determined whether a predetermined count number is reached (step S1006). If the predetermined count number has not been reached (step S1006), the processing returns to step S1010. However, if the predetermined count number has been reached (step S1006), the object detection dictionary generation process is completed.

FIG. 19 is a flowchart illustrating a processing procedure of the weak learner determination sub-process (the processing in step S1010 shown in FIG. 18) of the object detection dictionary generation process performed by the learning apparatus 800 according to the first embodiment of the present invention.

First, the luminance difference value computing unit 802 selects one of combinations (pairs) of two pixel points in each of the training images (step S1011) and selects one of the training images for which weight addition is to be performed (step S1012). Thereafter, the luminance difference value computing unit 802 extracts the luminance values of the two points in the selected training image (step S1013) and computes a luminance difference value between the two extracted points (step S1014). Subsequently, the weight distribution information generating unit 803 adds, to the class of the computed difference value, a weight retained in the weight retaining unit 810 in association with the training image from which the difference value is computed (step S1015). In this weight addition process, a weight is added for each of the types of training image, and weight distribution information is generated for each of the types of training image.

Subsequently, it is determined whether a weight addition process has been performed for the same pair of points in all of the training front face images and the training non-face images input to the training image input unit 801 (step S1016). If a weight addition process for the same pair of points in all of the training front face images and the training non-face images has not been performed (step S1016), the processing returns to S1012. However, if a weight addition process for the same pair of points in all of the training front face images and the training non-face images has been performed (step S1016), the optimal threshold determination unit 804 determines the optimal threshold value for the generated weight distribution information using the above-described equation (6) (step S1017).

Subsequently, it is determined whether weight distribution information has been generated for all combinations of two pixel points in each of the training images (step S1018). If weight distribution information has not been generated for all combinations of two pixel points (step S1018), the processing returns to step S1011. However, if weight distribution information has been generated for all combinations of two pixel points (step S1018), the weak learner determination unit 805 determines the best weak learner on the basis of the determined optimal threshold value (step S1019).

An exemplary process for including various dictionaries that can be generated by the learning apparatus 800 in the image pickup apparatus 100 is described below with reference to the accompanying drawings.

Exemplary Structure of Evaluation Value Computation Dictionary

Figure 20A:
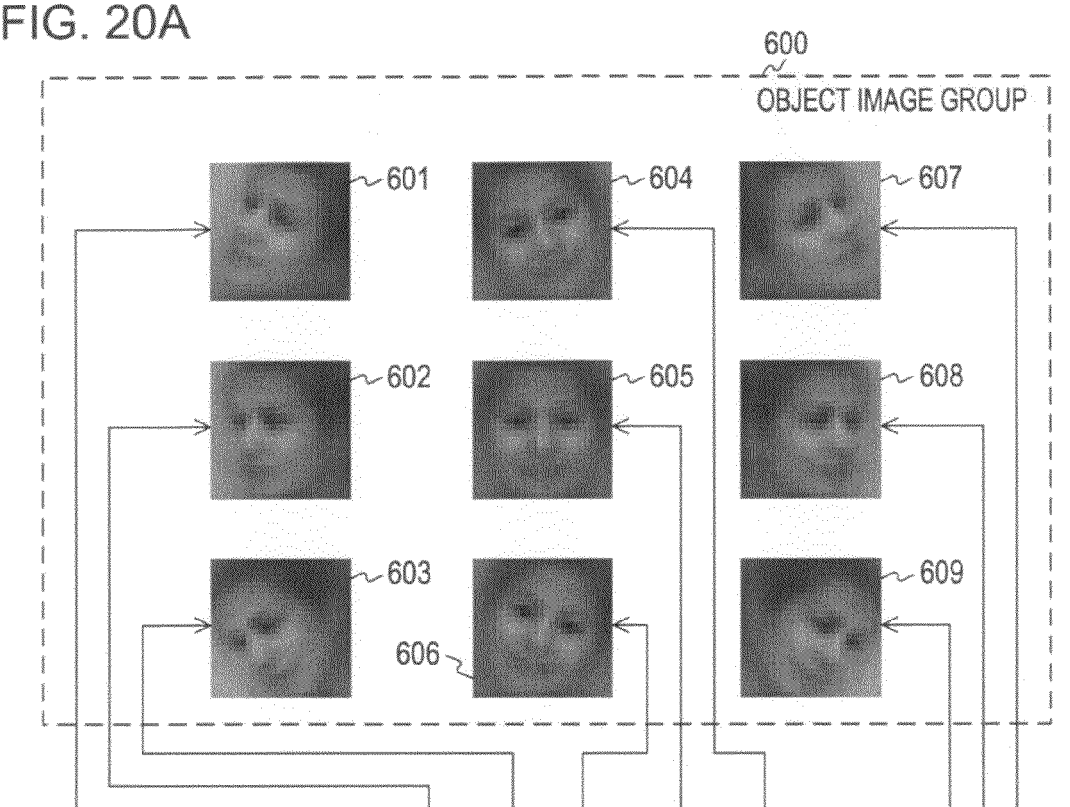
FIGS. 20A and 20B illustrate an exemplary evaluation value computation dictionary used for computing a plurality of evaluation values for an image to be determined according to the first embodiment of the present invention.
Figure 20B:
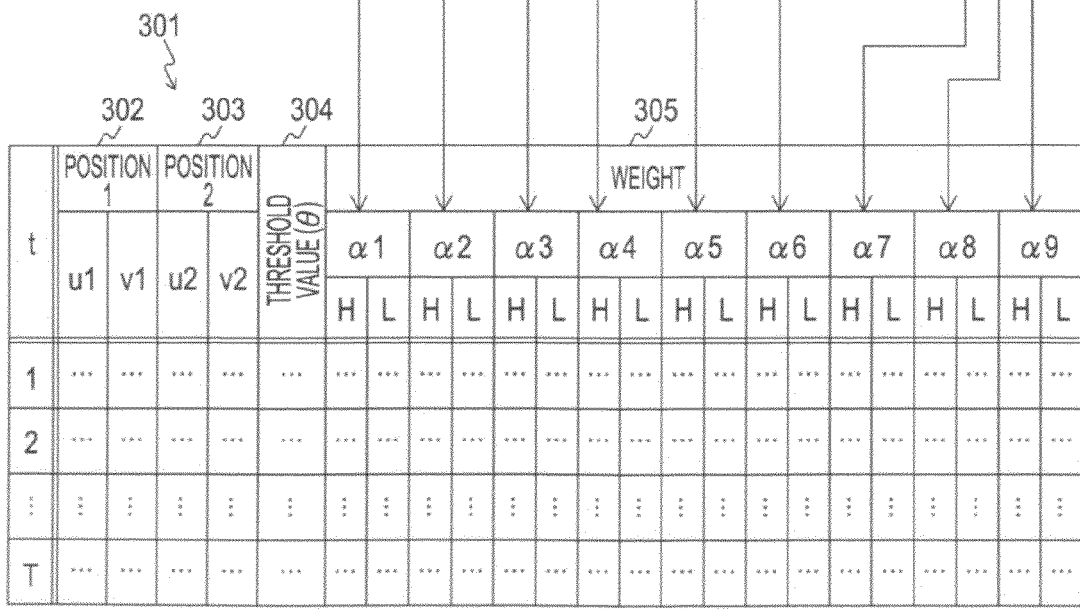

FIGS. 20A and 20B illustrate an exemplary evaluation value computation dictionary used for computing a plurality of evaluation values for an image to be determined according to the first embodiment of the present invention. FIG. 20A illustrates an object image group 600 including images 601 to 609 representing a plurality of objects for which evaluation values are computed. Description of the first embodiment of the present invention is made with reference to the faces of a person turned in different directions and serving as the plurality of objects. That is, the images 601 to 609 represent the faces of a person turned in different directions. For example, the image 605 is an image including the front face. The images 601 to 604 and the images 606 to 609 include the faces turned in directions other than the front direction.

FIG. 20B illustrates an evaluation value computation dictionary 301 used for computing the evaluation values corresponding to the images 601 to 609 shown in FIG. 20A at the same time. The evaluation value computation dictionary 301 provides information for determination (e.g., a vector-valued weak learner) used when the evaluation value computing unit 235 performs an evaluation value computing process for an image to be determined retrieved by the image retrieving unit 233. The evaluation value computation dictionary 301 is stored in the evaluation value computation dictionary storage unit 300. The various values recorded in the evaluation value computation dictionary 301 are generated by, for example, the learning apparatus 800. In addition, the various values recorded in the evaluation value computation dictionary 301 serve as information for determination including data relating to only determination criteria. That is, the evaluation value computation dictionary 301 does not include the images. Accordingly, the storage capacity can be decreased. In addition, the determination process can be performed at high speed.

The evaluation value computation dictionary 301 contains T combinations of a position 1 (u1, v1) 302, a position 2 (u2, v2) 303, a threshold value (θ) 304, and a weight (α1 to α9) 305.

The position 1 (u1, v1) 302 and the position 2 (u2, v2) 303 represent the positions of two points. Here, for example, when the upper left corner of the image to be determined is defined as a point of origin, two positions in the horizontal direction of the image are denoted by "u1" and "u2", and the positions in the vertical direction of the image are denoted by "v1" and "v2".

The threshold value (θ) 304 represents a threshold value regarding a difference value between the luminance values at the position 1 (u1, v1) 302 and the luminance at the position 2 (u2, v2) 303.

The weight (α1 to α9) 305 represents weights α1 to α9 added on the basis of the comparison result of the threshold value (θ) 304 and the difference value between the luminance values at the position 1 (u1, v1) 302 and the luminance at the position 2 (u2, v2) 303. The weights α1 to α9 are used for computing the evaluation values corresponding to the images 601 to 609 shown in FIG. 20A, respectively. In FIG. 20A, the images 601 to 609 are linked to the corresponding weights α1 to α9 by arrows, respectively. In addition, each of the weights α1 to α9 includes two different values (H and L).

The evaluation value computation dictionary 301 computes evaluation values used for narrowing down the objects subjected to a face determination process using face determination dictionaries 311 to 319. That is, the evaluation value computation dictionary 301 alone is not used for detecting the face. Accordingly, the accuracy requirement of the evaluation value using the evaluation value computation dictionary 301 is less strict than that using the face determination dictionaries 311 to 319. For example, the evaluation value computation dictionary 301 can be generated using several thousand to several ten thousand sample images and T=about 100. While the first embodiment of the present invention is described with reference to the case in which the same value is used for the threshold values of all records (objects), threshold values updated in accordance with each of the objects (the classes) may be used. In addition, for example, when an evaluation value computation dictionary used for computing the evaluation values regarding a plurality of objects at the same time is generated, the numbers of sample images used for the objects may be significantly different. In such a case, during an evaluation value computing process, normalization or an adjustment operation may be performed in accordance with the number of sample images. The computation of an evaluation value using these values is described in more detail below with reference to FIGS. 23A and 23B.

Exemplary Structure of Face Determination Dictionary

Figure 21A:
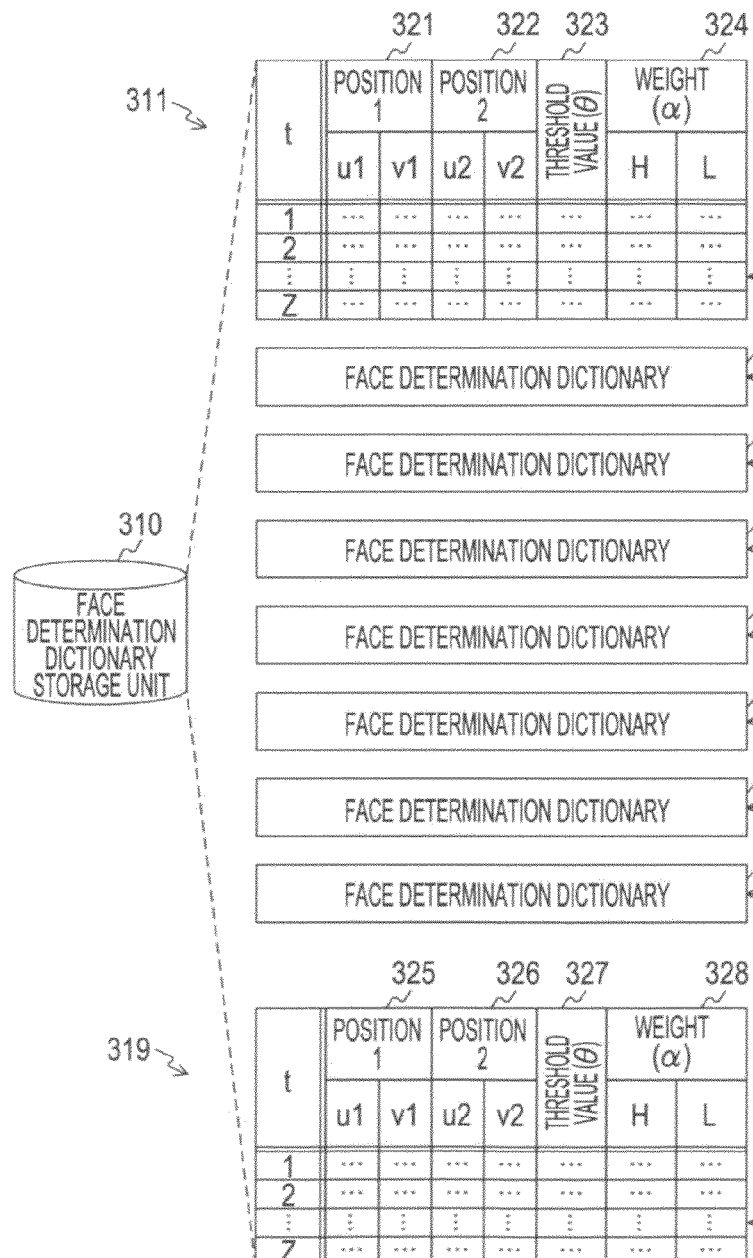
FIGS. 21A and 21B illustrate an example of the face determination dictionary used for determining whether a face is contained in the image to be determined according to the first embodiment of the present invention.
Figure 21B:
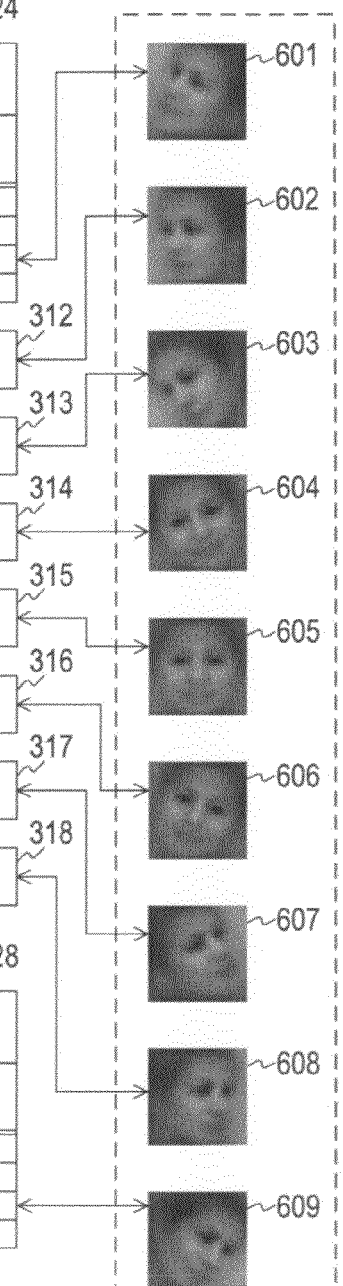

FIGS. 21A and 21B illustrate an example of the face determination dictionary used for determining whether the face is contained in the image to be determined according to the first embodiment of the present invention. FIG. 21A illustrates the face determination dictionaries 311 to 319 used in a face determination process performed by computing the evaluation values corresponding to the images 601 to 609 shown in FIGS. 20A and 21B. The face determination dictionaries 311 to 319 serve as information for determination (e.g., a vector-valued weak learner) used when the face determination unit 237 performs a face determination process for an image to be determined retrieved by the image retrieving unit 233. The face determination dictionaries 311 to 319 are stored in the face determination dictionary storage unit 310. The various values recorded in the face determination dictionaries 311 to 319 are generated by, for example, the learning apparatus 800. Note that the face determination dictionaries 311 to 319 supply information for determination including data relating to only determination criteria. That is, the face determination dictionaries 311 to 319 do not include the images. Accordingly, the storage capacity can be decreased. In addition, the determination process can be performed at high speed. Here, although the values of the items in the face determination dictionaries 311 to 319 are different, the formats of the items are the same. Accordingly, in FIG. 21A, only information stored in the face determination dictionaries 311 and 319 is illustrated, and other information is not shown. In addition, the images 601 to 609 shown in FIG. 21B are the same as the images 601 to 609 shown in FIG. 20A, respectively, and serve as a plurality of objects to be determined. Furthermore, in FIGS. 21A and 21B, the images 601 to 609 shown in FIG. 21B are linked to the corresponding face determination dictionaries 311 to 319 using arrows, respectively.

The face determination dictionary 311 contains Z combinations of a position 1 (u1, v1) 321, a position 2 (u2, v2) 322, a threshold value (θ) 323, and a weight (α) 324.

The position 1 (u1, v1) 321 and the position 2 (u2, v2) 322 represent the positions of two points in an image to be determined.

The threshold value (θ) 323 represents a threshold value of a difference value between the luminance value at the position 1 (u1, v1) 321 and the luminance value at the position 2 (u2, v2) 322.

The weight (α) 324 indicates a weight a added on the basis of the comparison result of the threshold value (θ) 323 and the difference value between the luminance at the position (u1, v1) 321 and the luminance at the position 2 (u2, v2) 322. In addition, the weight (α) 324 includes two different values (H and L).

As described above, the accuracy requirement of the evaluation value of the face determination dictionaries 311 to 319 is strict as compared with that using the evaluation value computation dictionary 301. For example, the face determination dictionaries 311 to 319 can be generated using several ten thousand sample images and Z=2000 to 3000. In this case, for example, when a face determination dictionary used for computing the evaluation values regarding a plurality of objects is generated, the numbers of sample images used for the objects may be significantly different. In such a case, during an evaluation value computing process, normalization or an adjustment operation may be performed in accordance with the number of sample images. The computation of an evaluation value using these values is described in more detail below with reference to FIGS. 24A to 24D.

Example of Detection of Face Contained in Image

Figure 22A:
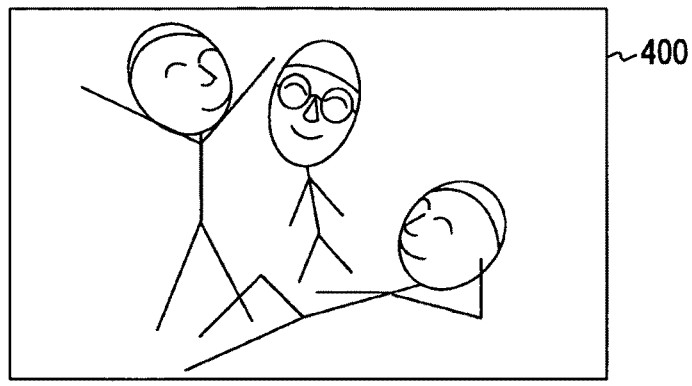
FIGS. 22A and 22D are schematic illustrations of a method for retrieving an image to be subjected to a face detection process performed by the face detection unit according to the first embodiment of the present invention.
Figure 22B:
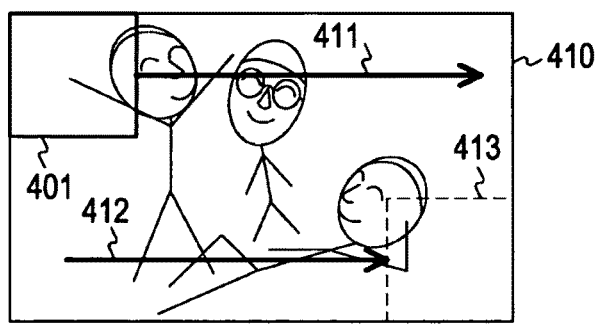
Figure 22C:
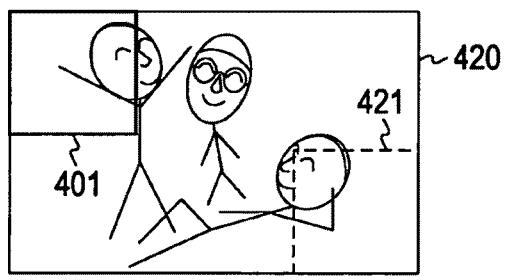
Figure 22D:
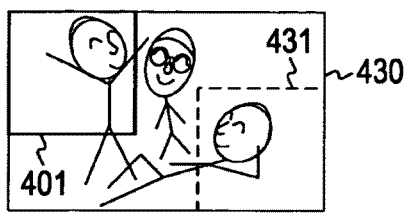

FIGS. 22A and 22D are schematic illustrations of a method for retrieving an image to be subjected to a face detection process performed by the face detection unit 230 according to the first embodiment of the present invention. FIG. 22A illustrates a captured image 400 retrieved by the image acquiring unit 231. FIGS. 22B to 22D illustrate images 410, 420, and 430 obtained by reducing the size of the captured image 400 using the image reduction unit 232. Note that retrieval of an image to be determined is performed by the image retrieving unit 233.

As shown in FIG. 22A, the captured image 400 includes the images of three persons turned in different directions serving as objects. As shown in FIGS. 22B to 22D, when the image to be determined is retrieved from the captured image 400, the images 410, 420, and 430 are generated by the image reduction unit 232 that sequentially reduces the captured image 400. For example, a retrieval window 401 is placed at the upper left corner of the captured image 400, and an image contained in the retrieval window 401 is retrieved. Subsequently, the retrieval window 401 is shifted to the right (in a direction indicated by arrows 411 and 412) by one pixel, and an image contained in the retrieval window 401 is retrieved. Similarly, the retrieval window 401 is sequentially shifted to the right by one pixel, and an image contained in the retrieval window 401 is sequentially retrieved. When the retrieval window 401 is shifted to the right end of the image 410 and an image contained in the retrieval window 401 is retrieved, the retrieval window 401 is downwardly shifted by one pixel and is moved to the left end of the image 410. Immediately after the retrieval window 401 is moved to the left end of the image 410, an image contained in the retrieval window 401 is retrieved. Thereafter, the retrieval window 401 is sequentially shifted to the right by one pixel, and an image contained in the retrieval window 401 is sequentially retrieved. Subsequently, an image contained in the retrieval window 401 is sequentially retrieved in a similar manner. When the retrieval window 401 is shifted to a position 413 representing the lower right end of the image 410 and an image contained in the retrieval window 401 is retrieved, the process of retrieving the image to be determined from the image 410 is completed.

FIGS. 22C and 22D illustrate the images 420 and 430, respectively, in which the retrieval window 401 is placed at an initial position, and the final position of the retrieval window 401 is indicated as positions 421 and 431. Note that the retrieval window 401 is moved from the first position to the final position in a manner similar to the movement illustrated in FIG. 22B. In addition, the size of the retrieval window 401 is constant regardless of the size of an image to be retrieved. The image retrieval process is performed until the size of the image subjected to a reduction process performed by the image reduction unit 232 is smaller than the size of the retrieval window 401. Note that the size of an original image to be subjected to the reduction process is, for example, 320×240 pixels. In addition, for example, the image reduction unit 232 may reduce the size of an image to a size 0.83 times the previous image.

An exemplary evaluation value computing process performed on an image to be determined using the evaluation value computation dictionary is described next with reference to the accompanying drawings.

Figure 23A:
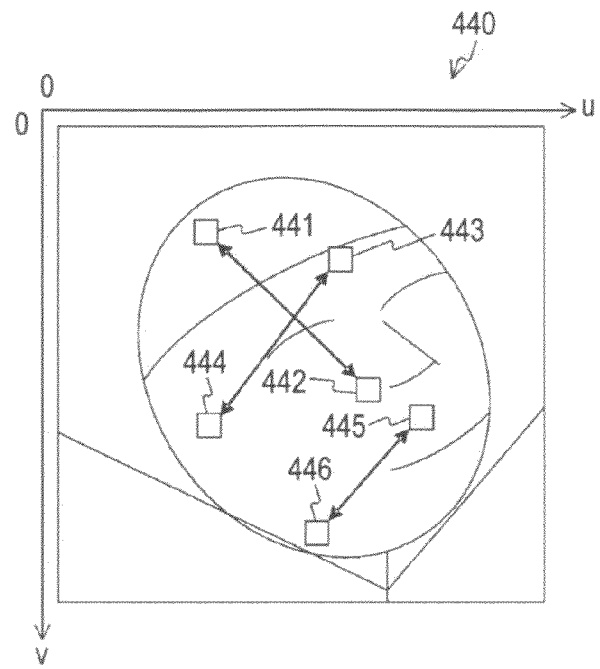
FIGS. 23A and 23B illustrate an example of an image to be determined retrieved by an image retrieving unit according to the first embodiment of the present invention and an evaluation value computed for the image to be determined by an evaluation value computing unit.
Figure 23B:
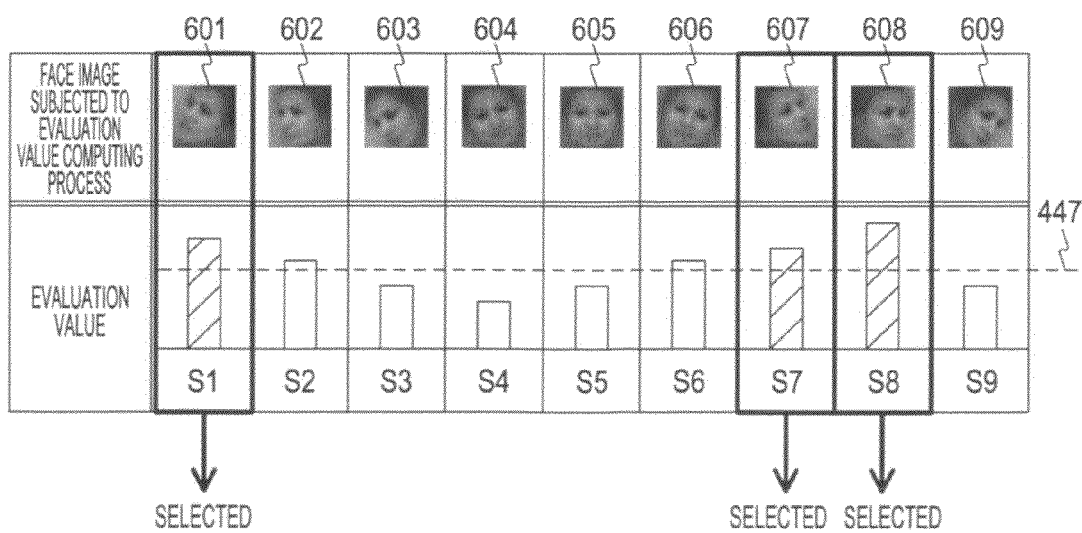

FIGS. 23A and 23B illustrate an example of an image to be determined retrieved by the image retrieving unit 233 according to the first embodiment of the present invention and the evaluation value computed for the image to be determined by the evaluation value computing unit 235. FIG. 23A illustrates an example image to be determined 440. In FIG. 23A, the upper left corner of the image to be determined 440 is defined as a point of origin. The horizontal axis is defined as a "u axis", and the vertical axis is defined as a "v axis". Then, the evaluation value computing process is performed on the image to be determined 440.

For example, Let a position 441 represent the position of the image to be determined 440 corresponding to the position 1 (u1, v1) 302 contained in the first row of the evaluation value computation dictionary 301 shown in FIG. 20B. Let a position 442 represent the position of the image to be determined 440 corresponding to the position 2 (u2, v2) 303 contained in the first row. In addition, let a position 443 represent the position of the image to be determined 440 corresponding to the position 1 (u1, v1) 302 contained in the second row of the evaluation value computation dictionary 301. Let a position 444 represent the position of the image to be determined 440 corresponding to the position 2 (u2, v2) 303 contained in the second row. Furthermore, let a position 445 represent the position of the image to be determined 440 corresponding to the position 1 (u1, v1) 302 contained in the third row of the evaluation value computation dictionary 301. Let a position 446 represent the position of the image to be determined 440 corresponding to the position 2 (u2, v2) 303 contained in the third row.

First, a value "0" is set in each of scores S1 to S9 representing an evaluation value, and computation is performed using the values stored in the first row of the evaluation value computation dictionary 301. More specifically, a luminance value A(1) at the position 441 corresponding to the value stored in the position 1 (u1, v1) 302 in the first row of the evaluation value computation dictionary 301 and a luminance value B(1) at the position 442 corresponding to the value stored in the position 2 (u2, v2) 303 are extracted. Thereafter, a difference value C(1) between the extracted luminance values is computed as follows:

$$C(1)=A(1)-B(1)$$

Subsequently, the computed luminance difference value C(1) is compared with a threshold value θ(1) in the threshold value (θ) 304 stored in the first row of the evaluation value computation dictionary 301. Thus, it is determined whether the computed difference value C(1) is less than the threshold value θ(1). If the computed difference value C(1) is less than the threshold value θ(1), the values L in the weight (α1 to α9) 305 stored in the first row of the evaluation value computation dictionary 301 are sequentially added to the scores S1 to S9, respectively. More specifically, the value in the weight α1(L) is added to the score S1. The value in the weight α2(L) is added to the score S2. The value in the weight α3(L) is added to the score S3. The value in the weight α4(L) is added to the score S4. The value in the weight α5(L) is added to the score S5. The value in the weight α6(L) is added to the score S6. The value in the weight α7(L) is added to the score S7. The value in the weight α8(L) is added to the score S8. The value in the weight α9(L) is added to the score S9.

However, if the computed difference value C(1) is greater than or equal to the threshold value θ(1), the values H in the weight (α1 to α9) 305 stored in the first row of the evaluation value computation dictionary 301 are sequentially added to the scores S1 to S9, respectively. More specifically, the value in the weight α1(H) is added to the score S1. The value in the weight α2(H) is added to the score S2. The value in the weight α3(H) is added to the score S3. The value in the weight α4(H) is added to the score S4. The value in the weight α5(H) is added to the score S5. The value in the weight α6(H) is added to the score S6. The value in the weight α7(H) is added to the score S7. The value in the weight α8(H) is added to the score S8. The value in the weight α9(H) is added to the score S9.

Subsequently, the above-described computation is repeated by using the values stored in the second row of the evaluation value computation dictionary 301. More specifically, a luminance value A(2) at the position 443 corresponding to the value in the position 1 (u1, v1) 302 stored in the second row of the evaluation value computation dictionary 301 and a luminance value B(2) at the position 444 corresponding to the value in the position 2 (u2, v2) 303 stored in the second row are extracted. Subsequently, a difference value C(2) between the extracted luminance values is computed as follows:

$$C(2)=A(2)-B(2)$$

Subsequently, the computed luminance difference value C(2) is compared with a threshold value θ(2) in the threshold value (θ) 304 stored in the second row of the evaluation value computation dictionary 301. Thus, it is determined whether the computed difference value C(2) is less than the threshold value θ(2). If the computed difference value C(2) is less than the threshold value θ(2), the values L in the weight (α1 to α9) 305 stored in the second row of the evaluation value computation dictionary 301 are added to the scores S1 to S9, respectively. However, if the computed difference value C(2) is greater than or equal to the threshold value θ(2), the values H in the weight (α1 to α9) 305 stored in the second row of the evaluation value computation dictionary 301 are sequentially added to the scores S1 to S9, respectively. Thereafter, the above-described computation is repeated by sequentially using the values stored in a third row to a Tth row of the evaluation value computation dictionary 301.

That is, when the evaluation value computing unit 235 performs an evaluation value computing process for the image to be determined 440 using the evaluation value computation dictionary 301, the evaluation value computing unit 235 computes C(i) using the values stored in the first row to the Tth row of the evaluation value computation dictionary 301 as follows:

$$C(i) = A(i) - B(i) \tag{29}$$

Thereafter, the evaluation value computing unit 235 determines whether the computed C(i) satisfies the following conditional expression:

$$C(i) < \theta(i) \tag{30}$$

where the variable i is an integer ranging from 1 to T.

If the computed c(i) satisfies conditional expression (30), the evaluation value computing unit 235 adds the values in α1L(i) to α9L(i) to the scores S1 to S9, respectively. However, if the computed c(i) does not satisfy conditional expression (30), the evaluation value computing unit 235 adds the values in α1H(i) to α9H(i) to the scores S1 to S9, respectively. Here, A(i) represents the luminance value corresponding to the position 1 (u1, v1) 302 stored in the first row, and B(i) represents the luminance value corresponding to the position 2 (u2, v2) 303 stored in the first row. θ(i) represents the value stored in the threshold value (θ) 304 in the ith row. α1H(i) to α9H(i) represent the values stored in Hs of the weight (α1 to α9) 305 in the ith row. α1L(i) to α9L(i) represent the values stored in Ls of the weight (α1 to α9) 305 in the ith row.

The scores (the evaluation values) S1 to S9 obtained after the computation using the values stored in the first to Tth rows of the evaluation value computation dictionary 301 is completed are expressed as follows:

$$S_j = \sum_{i=1}^{T} h(x_i, c_j) \tag{31}$$

where $h(x_i, c_j)$ represents αjH(i) computed using equation (25) when C(i)≥θ(i), $h(x_i, c_j)$ represents αjL(i) computed using equation (26) when C(i)<θ(i), and j=1 to 9.

FIG. 23B illustrates a relationship between the images 601 to 609 representing the faces for which the evaluation values are computed and the scores S1 to S9 computed by the evaluation value computing unit 235 for the image to be determined 440. As shown in FIG. 23B, when the computation using the values stored in the Tth row of the evaluation value computation dictionary 301 is completed, the nine evaluation values S1 to S9 can be obtained. FIG. 23B schematically illustrates the levels of the evaluation values S1 to S9 using a bar graph.

In this way, the evaluation values S1 to S9 computed by the evaluation value computing unit 235 are output to the selection unit 236. The selection unit 236 then extracts the evaluation values greater than or equal to a threshold value 447. For example, from among the evaluation values S1 to S9 shown in FIG. 23B, the evaluation values S1 and S2 and the evaluation values S6 to S8 corresponding to the images 601 and 602 and the images 606 to 608, respectively, are extracted. Thereafter, from among the extracted evaluation values, the selection unit 236 selects three high evaluation values from the top and outputs, to the face determination unit 237, the information (the selected object information) regarding the objects corresponding to the selected evaluation values. For example, from among the extracted evaluation values S1 and S2 and the evaluation values S6 to S8, the top three evaluation values S1, S7, and S8 are selected. FIG. 23B illustrates the selected evaluation values S1, S7, and S8 using bars with diagonal lines in a bar graph. Subsequently, the selected object information corresponding to the selected evaluation values S1, S7, and S8 is output to the face determination unit 237.

If an evaluation value greater than or equal to the threshold value 447 is not present among the evaluation values S1 to S9, the selection unit 236 outputs a message indicating that information to the face determination unit 237. However, if one or two evaluation values greater than or equal to the threshold value 447 are present among the evaluation values S1 to S9, the selection unit 236 outputs the one or two evaluation values to the face determination unit 237. In this case, for example, the value "0" can be used as the threshold value 447. Alternatively, in order to obtain a relatively low reliability, a value other than "0" may be used.

An example of a face determination process performed for an image to be determined using a face determination dictionary is described in detail next with reference to the accompanying drawings.

FIGS. 24A to 24D illustrate an example of an image to be determined retrieved by the image retrieving unit 233 according to the first embodiment of the present invention and the evaluation values computed for the image to be determined by the face determination unit 237. FIG. 24A illustrates the image to be determined 440 serving as an example of the image to be determined. Note that the image to be determined 440 is the same as the image to be determined 440 shown in FIG. 23A. In addition, like the example shown in FIG. 23A, in this example, two-dimensional coordinates are set for the image to be determined 440, and a face determination process is performed.

First, the face determination unit 237 acquires, from the face determination dictionary storage unit 310, the face determination dictionary used for determining an object corresponding to the evaluation value selected by the selection unit 236 and stores the face determination dictionary in the face determination dictionary memory 239. For example, as shown in FIG. 23B, when the evaluation values S1, S7, and S8 are selected by the selection unit 236, the face determination dictionaries 311, 317, and 318 corresponding to the evaluation values S1, S7, and S8, respectively, are acquired and stored in the face determination dictionary memory 239. Thereafter, using the face determination dictionaries stored in the face determination dictionary memory 239, the face determination unit 237 sequentially computes evaluation values relating to the face determination dictionaries. Note that computation of the evaluation values using the face determination dictionaries performed by the face determination unit 237 is the same as that performed by the evaluation value computing unit 235 using the evaluation value computation dictionaries except that the numbers of the weights (α) are different.

For example, A(i) represents the luminance value corresponding to the position 1 (u1, v1) 321 stored in an ith row of the face determination dictionary 311, and B(i) represents the luminance value corresponding to the position 2 (u2, v2) 322 stored in the ith row. C(i) represents a difference value between the luminance value A(i) and the luminance value B(i). θ(i) represents the value stored in the threshold value (θ) 323 in the ith row of the face determination dictionary 311. αH(i) represents the value stored in H of the weight (α) 324 in the ith row. αL(i) represents the value stored in L of the weight (α) 324 in the ith row.

For example, when an evaluation value computing process is performed on the image to be determined 440 using the face determination dictionary 311, the value "0" is set as a score S representing an evaluation value. The face determination unit 237 then computes C(i) by sequentially using the values stored in the first row to the Zth row of the face determination dictionary 311 as follows:

$$C(i) = A(i) - B(i) \quad (32)$$

Thereafter, the face determination unit 237 determines whether the computed C(i) satisfies the following conditional expression:

$$C(i) < \theta(i) \quad (33)$$

where the variable i is an integer ranging from 1 to Z.

If the computed C(i) satisfies conditional expression (33), the face determination unit 237 adds the value in αL(i) to the score S. However, if the computed c(i) does not satisfy conditional expression (33), the face determination unit 237 adds the values in αH(i) to the score S.

The score (the evaluation value) S obtained after the computation using the values stored in the first to Zth rows of the face detection dictionary 311 is completed is expressed as follows:

$$S = \sum_{i=1}^{T} h(x_i) \quad (34)$$

where $h(x_i)$ represents αH(i) computed using equation (7) when C(i)≥θ(i), and $h(x_i)$ represents αL(i) computed using equation (θ) when C(i)<θ(i).

In a similar manner, the scores (the evaluation values) S can be computed for the other face determination dictionaries 312 to 319. Note that, in FIGS. 24A to 24D and FIGS. 25A to 25C, the evaluation values computed using the face determination dictionaries 311 to 319 are denoted by evaluation values SS1 to SS9.

FIG. 24B illustrates a relationship between the images 601, 607, and 608 representing the faces for which the evaluation values are computed and the evaluation values SS1, SS7, and SS8 computed by the face determination unit 237 for the image to be determined 440. As shown in FIG. 24B, when the computation using the values stored in the Zth row of the face determination dictionary 311 is completed, the evaluation value SS1 can be obtained. Similarly, when the computation using the values stored in the Zth row of the face determination dictionary 317 is completed, the evaluation value SS7 can be obtained. When the computation using the values stored in the Zth row of the face determination dictionary 318 is completed, the evaluation value SS8 can be obtained. FIG. 24B schematically illustrates the levels of the evaluation values SS1, SS7, and SS8 using a bar graph.

In this way, the face determination unit 237 determines whether the face is contained in the image to be determined 440 on the basis of the computed evaluation values SS1, SS7, and SS8. That is, the face determination unit 237 selects, from among the computed evaluation values, an evaluation value that is the highest and that is greater than or equal to a threshold value and determines that the face corresponding to the selected evaluation value is contained in the image to be determined 440. For example, among the evaluation values SS1, SS7, and SS8 shown in FIG. 24B, the evaluation values SS7 and SS8 are greater than or equal to a threshold value 448. Accordingly, the evaluation value SS7 that has the highest value is selected from the evaluation values SS7 and SS8. Thus, it is determined that the face contained in the image 607 corresponding to the evaluation value SS7 is contained in the image to be determined 440. This determination result is output to the determination result output unit 238.

If an evaluation value greater than or equal to the threshold value 448 is not present among the computed evaluation values, the face determination unit 237 determines that the target face is not contained in the image to be determined 440 and outputs a message indicating that information to the determination result output unit 238. In this case, for example, the value "0" can be used as the threshold value 448. Alternatively, in order to obtain a relatively high reliability, a value other than "0" may be used.

As described above, by changing the resolution of the images to be determined to the same resolution and using the luminance values of two points as the features used for computing an evaluation value, a plurality of face determination dictionaries can be switchably used. Thus, a plurality of evaluation values can be generated using the same algorithm.

FIGS. 25A to 25C are schematic illustrations of the processing flow of a face detection process performed by the face detection unit 230 according to the first embodiment of the present invention. FIG. 25A illustrates the image to be determined 440 retrieved by the image retrieving unit 233. This image to be determined 440 is the same as the image to be determined 440 shown in FIGS. 23A and 24A.

FIG. 25B illustrates a relationship between the images 601 to 609 representing the faces to be determined and the evaluation values S1 to S9 computed by the evaluation value computing unit 235 for the image to be determined 440. Note that the relationship shown in FIG. 25B is the same as that shown in FIG. 23B. In FIG. 25B, a region corresponding to the evaluation value selected by the selection unit 236 is surrounded by a bold frame.

FIG. 25C illustrates a relationship between the images 601 to 609 representing the faces to be determined and the evaluation values SS1, SS7, and SS8 computed by the face determination unit 237 for the image to be determined 440. In FIG. 25C, a region for which the evaluation value is computed by the face determination unit 237 is surrounded by a bold frame.

The evaluation values S1 to S9 shown in FIG. 25B are used for narrowing down the objects for which the evaluation values SS1 to SS9 shown in FIG. 25C are computed. Accordingly, for example, the reliability of the evaluation values S1 to S9 can be relatively decreased. As a result, the amount of computation for obtaining the evaluation value can be reduced and, therefore, the evaluation value computing process can be performed at high speed. Note that, as shown in FIG. 25B, since the reliability of the evaluation values S1 to S9 is relatively decreased, the evaluation value S1 corresponding to the image 601 that is not similar to the face contained in the image to be determined 440 may be increased. However, even in such a case, since the reliability of the evaluation values computed using the face determination dictionaries 311 to 319 is increased, the image 607 having a high similarity to the face contained in the image to be determined 440 can be finally determined, as shown in FIG. 25C. By narrowing down the objects to be determined using first-stage evaluation values having relatively low reliability in this manner, the number of objects to be subjected to the second-stage evaluation value computing process having a high reliability can be reduced. Accordingly, the face detection process can be performed at high speed. In addition, for example, even when one or two evaluation values are wrongly computed in the first stage, correct determination can be made on the basis of the second-stage evaluation value having a high reliability. As a result, high accuracy object detection can be performed.

The following detection method for detecting the faces turned in different directions is discussed below. The method employs a tree structure and a plurality of discriminators generated so as to correspond to the face orientations. The face is detected by using the discriminators and sequentially determining the orientation of the face in accordance with the branches indicated by the tree. In such a method, since the face is detected by sequentially determining the orientation of the face, the number of average weak learners before the final decision is reached may be increased, for example. Thus, the efficiency may be decreased. In addition, if a wrong decision is made before a leaf is reached and, therefore, a wrong node branch is taken, backtracking is difficult. Thus, proper face detection may not be performed.

However, according to the first embodiment of the present invention, since a node branch logic is not used, the number of average weak learners before a final decision is reached can be decreased and, therefore, the efficiency can be increased. In addition, in terms of the evaluation values computed in the first stage, the candidates for face detection are selected from among all of the objects regardless of the orientation of the face. Accordingly, for example, even a face for which it is difficult to find a corresponding object can be almost certainly detected. In addition, since evaluation is simultaneously performed in the first stage of the face detection process without using a tree structure, the first embodiment can be easily implemented. Thus, an affect of wrong branching can be eliminated. Furthermore, since the evaluation values relating to a plurality of objects can be computed using the same feature at the same time, the efficiency of the evaluation value computation process can be increased. Still furthermore, when a dictionary that allows simultaneous computation of evaluation values relating to a plurality of objects used in the first stage is generated, the dictionaries relating to the objects can be generated at the same time. Thus, the convergence of learning can be accelerated.

Furthermore, when the evaluation values are computed, the weights that are multiplied by the scores are changed in accordance with whether a luminance difference value is less than a threshold value or not, and the computation is performed. In this way, even when the distribution of physical quantity in an image to be determined is complicated, determination can be efficiently made using the distribution.

Figure 26:
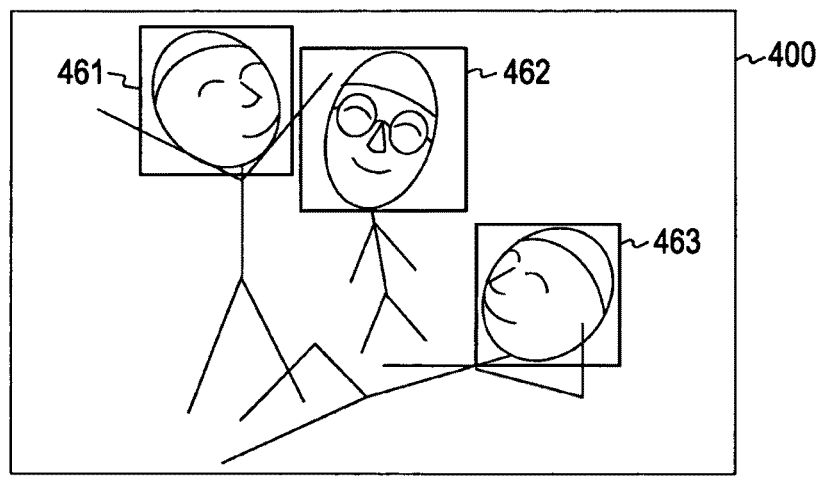
FIG. 26 illustrates a captured image subjected to the face detection process performed by the face detection unit according to the first embodiment of the present invention and a detection result of the face detection process performed by the face detection unit.

FIG. 26 illustrates the captured image 400 subjected to the face detection process performed by the face detection unit 230 according to the first embodiment of the present invention and a detection result of the face detection process performed by the face detection unit 230. The captured image 400 is the same as the captured image 400 shown in FIG. 22A. The captured image 400 includes three persons. In addition, when the faces of the three persons are detected in the captured image 400, the detection result is schematically shown by frames 461 to 463. The frames 461 to 463 indicate the detection result of the face detection process performed by the face detection unit 230, and each of the frames 461 to 463 indicates the position and the size. For example, the camera parameter control unit 220 can set optimal parameters for a detected face on the basis of the detection result. In addition, for example, when the captured image 400 is displayed on the display unit 170, the frames 461 to 463 are overlaid on the captured image 400. For example, as shown in FIG. 26, even the tilted face or the face of a lying person can be properly detected.

Exemplary Operation of Image Pickup Apparatus

An exemplary operation performed by the image pickup apparatus 100 according to the first embodiment of the present invention is described next with reference to the accompanying drawings.

Figure 27:
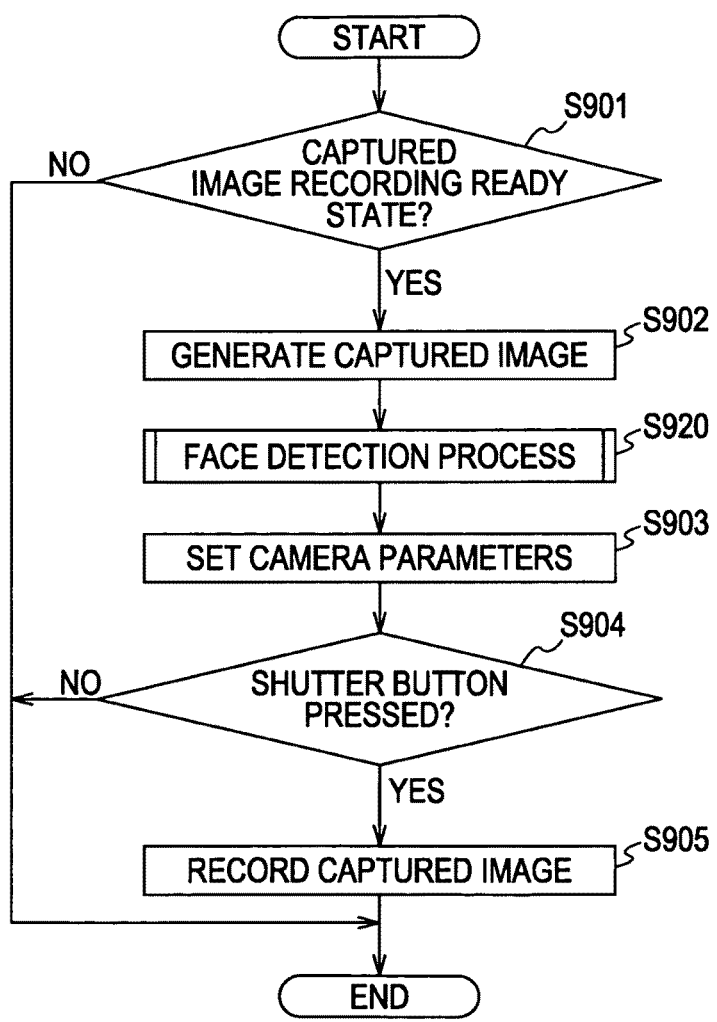
FIG. 27 is a flowchart illustrating the processing flow of a captured image recording process performed by an image pickup apparatus according to the first embodiment of the present invention.

FIG. 27 is a flowchart illustrating the processing flow of a captured image recording process performed by the image pickup apparatus 100 according to the first embodiment of the present invention. In this example, when the image pickup apparatus 100 stays in a capture image recording ready state, the image pickup apparatus 100 generates a captured image and performs a face detection process on the captured image.

First, it is determined whether the image pickup apparatus 100 stays in a capture image recording ready state (step S901). If the image pickup apparatus 100 stays in a capture image recording ready state (step S901), the image pickup unit 112 generates a captured image (step S902). Thereafter, the face detection unit 230 performs a face detection process on the generated captured image (step S920). The face detection process is described in more detail below with reference to FIG. 28. Note that the face detection process may be performed on each of frames or each of the frames obtained at predetermined intervals. However, if the image pickup apparatus 100 does not stay in a capture image recording ready state (step S901), the captured image recording process is completed.

Subsequently, the camera parameter control unit 220 sets camera parameters (step S903). For example, when face detection information is output from the face detection unit 230, the camera parameter control unit 220 sets the camera parameters optimal for the detected face on the basis of the position and the size of the detected face in the captured image. Thereafter, it is determined whether a shutter button is pressed (step S904). If the shutter button has been pressed, the generated captured image is recorded in the recording unit 150 (step S905). However, if the shutter button has not been pressed (step S904), the captured image recording process is completed.

Figure 28:
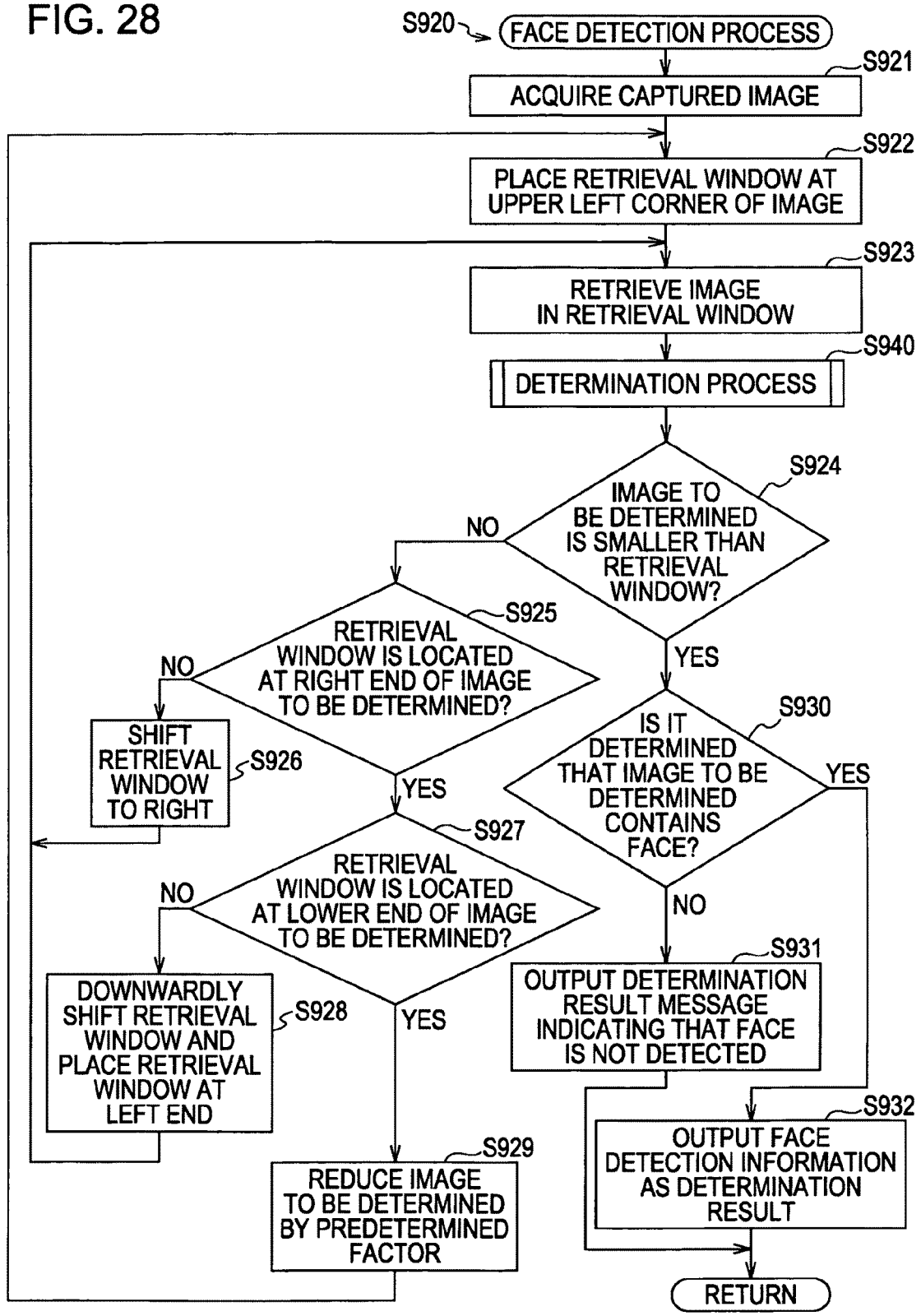
FIG. 28 is a flowchart illustrating the processing flow of a face detection process of the captured image recording process performed by the image pickup apparatus according to the first embodiment of the present invention.

FIG. 28 is a flowchart illustrating the processing flow of a face detection process (the processing performed in step S920 shown in FIG. 27) of the captured image recording process performed by the image pickup apparatus 100 according to the first embodiment of the present invention.

First, the current captured image stored in the memory unit 130 is acquired (step S921). Thereafter, a retrieval window is placed at the upper left corner of the acquired captured image (step S922), and an image in the retrieval window is retrieved (step S923). Subsequently, a determination process is performed on the image retrieved from the retrieval window (an image to be determined) (step S940). The determination process is described in more detail below with reference to FIG. 29.

Subsequently, it is determined whether the image to be determined is smaller than the retrieval window (step S924). If the image to be determined is not smaller than the retrieval window (step S924), it is determined whether the retrieval window is located at the right end of the image to be determined (step S925). If the retrieval window is not located at the right end of the image to be determined (step S925), the retrieval window is shifted to the right by one pixel in the image to be determined (step S926). Thereafter, the processing returns to step S923. However, if the retrieval window is located at the right end of the image to be determined (step S925), it is determined whether the retrieval window is located at the lower end of the image to be determined (step S927). If the retrieval window is not located at the lower end of the image to be determined (step S927), the retrieval window is downwardly shifted by one pixel in the image to be determined and is moved to the left end of the image to be determined (step S928). However, if the retrieval window is located at the lower end of the image to be determined (step S927), the image to be determined is reduced by a predetermined factor (step S929), and the retrieval window is placed at the upper left corner of the reduced image (step S922).

However, if the image to be determined is smaller than the retrieval window (step S924), it is determined whether a face is contained in the image to be determined (step S930). If it is determined that a face is contained in the image to be determined (step S930), face detection information serving as the determination result and indicating that a face is detected is output (step S932). At that time, if it is determined that a plurality of faces are contained in the image to be determined, the face detection information relating to the plurality of faces is output. In addition, for an overlapping area, if it is determined a plurality of times that a face is contained, face detection information is output on the basis of the position and size of the retrieval window in which the score (the evaluation value) computed using the face determination dictionary in the determination process performed in step S940 is maximized. However, if it is not determined that a face is contained in the image to be determined (step S930), face-not-detected information indicating that the face is not detected is output as the detection result (step S931).

Note that, in this example, even when it is determined that the face is contained in the image to be determined, the determination process is repeated until the image to be determined becomes smaller than the retrieval window. Thereafter, on the basis of the determination result, it is determined whether the face is detected in the current captured image. However, when it is once determined that the face is contained in the image to be determined, the face detection information indicating that the face is detected in the current captured image may be output without performing the determination process on the other images to be determined.

Figure 29:
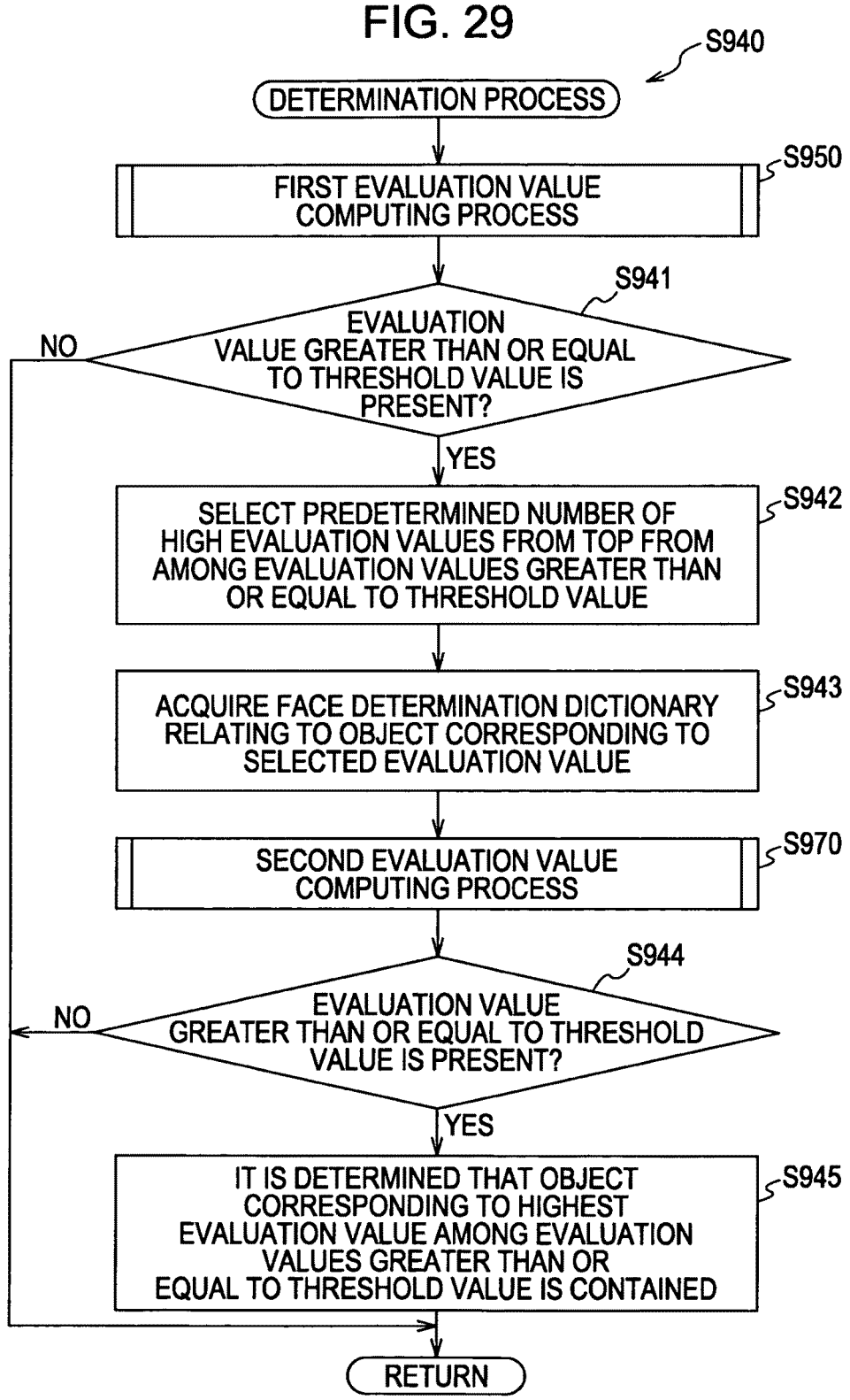
FIG. 29 is a flowchart illustrating the processing flow of a determination process of the face detection process performed by the image pickup apparatus according to the first embodiment of the present invention.

FIG. 29 is a flowchart illustrating the processing flow of a determination process (the processing performed in step S940 shown in FIG. 28) of the face detection process performed by the image pickup apparatus 100 according to the first embodiment of the present invention.

First, the evaluation value computing unit 235 performs a first evaluation value computing sub-process (step S950). The first evaluation value computing sub-process is described in more detail below with reference to FIG. 30. Note that step S950 is an example of a computing step defined in the attached claims. Subsequently, the selection unit 236 determines whether, among a plurality of evaluation values computed by the evaluation value computing unit 235, the evaluation value greater than or equal to a threshold value is present (step S941). If, among a plurality of evaluation values computed by the evaluation value computing unit 235, the evaluation value greater than or equal to a threshold value is present (step S941), the selection unit 236 selects, from among the evaluation values greater than or equal to the threshold value, a predetermined number of high evaluation values from the top (step S942). For example, when the evaluation value computed by the evaluation value computing unit 235 is 9, at most the top three evaluation values are selected.

Subsequently, the face determination unit 237 acquires, from the face determination dictionary storage unit 310, a face determination dictionary relating to an object corresponding to the selected evaluation value and stores the acquired face determination dictionary in the face determination dictionary memory 239 (step S943). Thereafter, the face determination unit 237 performs a second evaluation value computing sub-process using the face determination dictionary stored in the face determination dictionary memory 239 (step S970). The second evaluation value computing sub-process is described in more detail below with reference to FIG. 31.

Subsequently, the face determination unit 237 determines whether, among one or a plurality of computed evaluation values, the evaluation value greater than or equal to a threshold value is present (step S944). If, among one or a plurality of computed evaluation values, the evaluation value greater than or equal to a threshold value is present (step S944), the face determination unit 237 selects the highest evaluation value from among the evaluation value greater than or equal to a threshold value. Thus, the face determination unit 237 determines that the object corresponding to the evaluation value is contained in the image to be determined (step S945). Note that steps S970, S944, and S945 are an example of a determination step defined in the attached claims.

Note that, if, among a plurality of evaluation values computed by the evaluation value computing unit 235, the evaluation value greater than or equal to a threshold value is not present (step S941) or if, among the evaluation values computed by the face determination unit 237, the evaluation value greater than or equal to a threshold value is not present (step S944), the determination process is completed.

Figure 30:
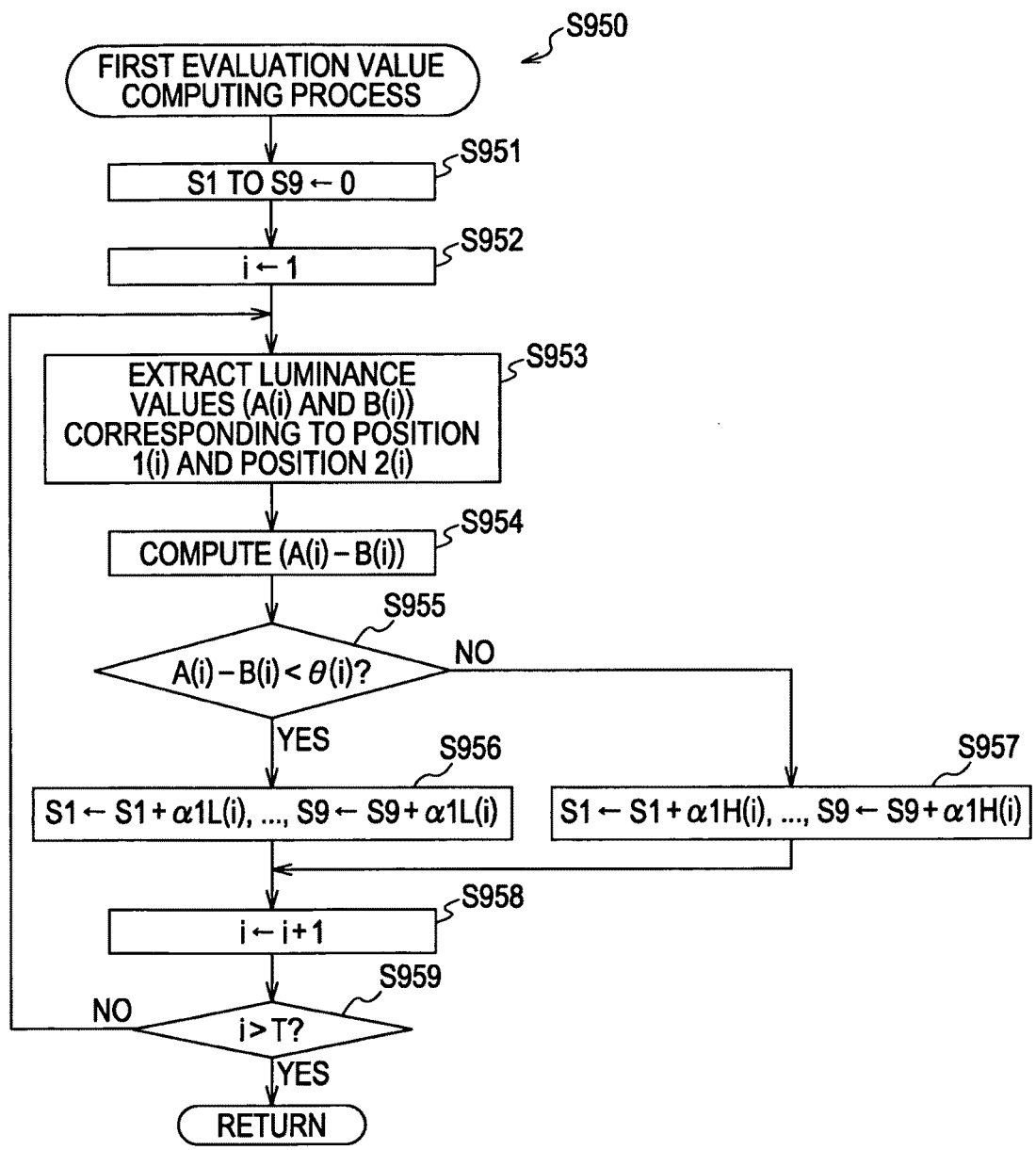
FIG. 30 is a flowchart illustrating the processing flow of a first evaluation value computing sub-process of the face detection process performed by the image pickup apparatus according to the first embodiment of the present invention.

FIG. 30 is a flowchart illustrating the processing flow of the first evaluation value computing sub-process (the processing performed in step S950 shown in FIG. 29) in the face detection process performed by the image pickup apparatus 100 according to the first embodiment of the present invention.

First, the scores S1 to S9 are initialized to "0" (step S951), and a variable i is initialized to "1" (step S952). Subsequently, the evaluation value computing unit 235 extracts the luminance values corresponding to the positions contained in the position 1 (u1, v1) and the position 2 (u2, v2) of the ith row of the evaluation value computation dictionary 301 (step S953). In this example, let A(i) denote the luminance value corresponding to the position 1 (u1, v1), and let B(i) denote the luminance value corresponding to the position 2 (u2, v2). Then, the evaluation value computing unit 235 computes the difference value between the two luminance values (A(i)-B(i)) (step S954).

Subsequently, the evaluation value computing unit 235 determines whether the computed difference value (A(i)-B(i)) is less than the threshold value θ(i) stored in the ith row of the evaluation value computation dictionary 301 (step S955). If the computed difference value (A(i)-B(i)) is less than the threshold value θ(i) (step S955), the evaluation value computing unit 235 sequentially adds αL(i) to α9L(i) to the scores S1 to S9, respectively (step S956). However, if the computed difference value (A(i)-B(i)) is not less than the threshold value θ(i) (step S955), the evaluation value computing unit 235 sequentially adds α1H(i) to α9H(i) to the scores S1 to S9, respectively (step S957).

Subsequently, the variable i is incremented by one (step S958), and it is determined whether the variable i is greater than T (step S959). If the variable i is not greater than T (step S959), the processing returns to step S953. Thereafter, the evaluation value computing process (steps S953 to S958) is repeated. However, if the variable i is greater than T (step S959), the first evaluation value computing sub-process is completed.

Figure 31:
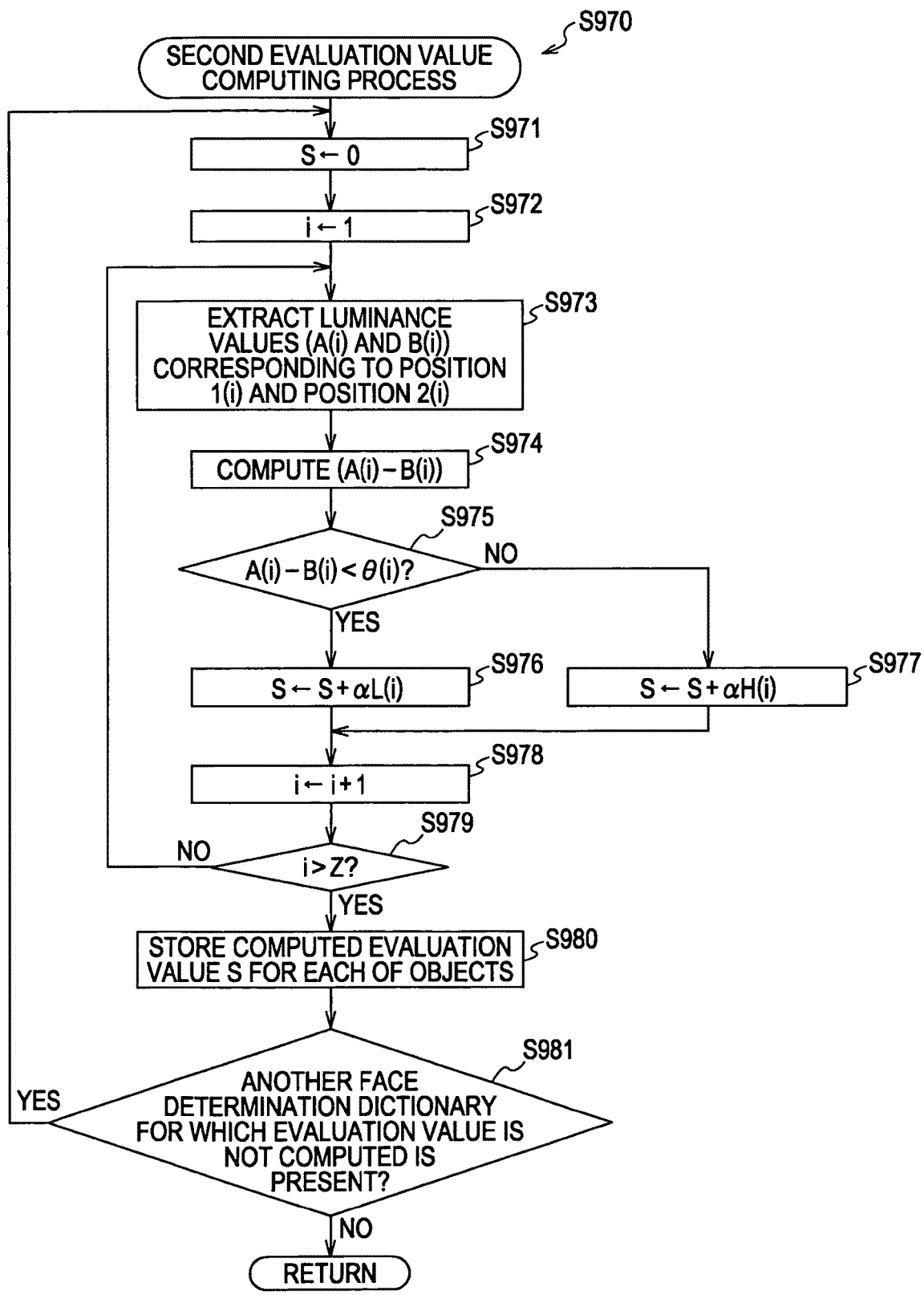
FIG. 31 is a flowchart illustrating the processing flow of a second evaluation value computing sub-process of the face detection process performed by the image pickup apparatus according to the first embodiment of the present invention.

FIG. 31 is a flowchart illustrating the processing flow of the second evaluation value computing sub-process (the processing performed in step S970 shown in FIG. 29) of the face detection process performed by the image pickup apparatus 100 according to the first embodiment of the present invention.

First, the score S is initialized to "0" (step S971), and a variable i is initialized to "1" (step S972). Subsequently, the face determination unit 237 extracts, from the image to be determined, the luminance values corresponding to the position 1 (u1, v1) and the position 2 (u2, v2) stored in the ith row of one of the face determination dictionaries stored in the face determination dictionary memory 239 (step S973). In this example, let A(i) denote the luminance value corresponding to the position 1 (u1, v1), and let B(i) denote the luminance value corresponding to the position 2 (u2, v2). Thereafter, the face determination unit 237 computes the difference value between the two luminance values (A(i)-B(i)) (step S974).

Subsequently, the face determination unit 237 determines whether the computed difference value (A(i)-B(i)) is less than the threshold value θ(i) stored in the ith row of the current face determination dictionary (step S975). If the computed difference value (A(i)-B(i)) is less than the threshold value θ(i) (step S975), the face determination unit 237 adds αL(i) to the score S (step S976). However, if the computed difference value (A(i)-B(i)) is not less than the threshold value θ(i) (step S975), the face determination unit 237 adds αH(i) to the score S (step S977).

Subsequently, the variable i is incremented by one (step S978), and it is determined whether the variable i is greater than Z (step S979). If the variable i is not greater than T (step S979), the processing returns to step S973. Thereafter, the evaluation value computing process using the current face determination dictionary (steps S973 to S978) is repeated. However, if the variable i is greater than Z (step S979), the face determination unit 237 stores the computed evaluation value S in association with the object corresponding to the current face determination dictionary (step S980).

Subsequently, the face determination unit 237 determines whether another face determination dictionary for which the evaluation value is not computed is present among the face determination dictionaries stored in the face determination dictionary memory 239 (step S981). If another face determination dictionary for which the evaluation value is not computed is present (step S981), the processing returns to step S971. Thereafter, the evaluation value computing process is repeated until computation of an evaluation value is performed for all of the face determination dictionaries stored in the face determination dictionary memory 239. However, if another face determination dictionary for which the evaluation value is not computed is not present (step S981), the second evaluation value computing sub-process is completed.

In this example, the score S is computed using the values stored in the first to Zth rows of each of the face determination dictionary. However, for example, a stopping threshold value may be stored in the face determination dictionary storage unit for each of the records of each of the face determination dictionary. If the score S computed in step S976 or S977 is lower than the stopping threshold value of the current record, the evaluation value computing process using the current face determination dictionary may be stopped. In this way, the speed of the face detection process can be further increased.

As described above, according to the first embodiment of the present invention, the face detection process includes a two-stage evaluation value computing process. Accordingly, the number of weak learners can be reduced and, therefore, the face detection process can be performed at high speed. In addition, the detection accuracy can be increased. Furthermore, when the face detection process is performed, the weight that is multiplied by the score is changed in accordance with whether the value is less than a threshold value of each of the dictionaries or not, and the computation is performed. In this way, the detection accuracy can be further increased.

2. Second Embodiment

Exemplary Configuration of Image Pickup Apparatus

In the first embodiment of the present invention, an example in which the evaluation values relating to a plurality of objects are computed at the same time using a single evaluation value computation dictionary is described. A second embodiment of the present invention is described with reference to the following example. That is, by converting two points for which the luminance difference value stored in an evaluation value computation dictionary is computed, evaluation values can be computed for a number of objects four times the maximum number of objects for which the evaluation values can be computed using the evaluation value computation dictionary. Unlike the image pickup apparatus 100 according to the first embodiment of the present invention, an image pickup apparatus according to a second embodiment of the present invention includes a face detection unit 250 in place of the face detection unit 230. Accordingly, descriptions of components the same as those of the first embodiment are not repeated. Different components are mainly described below.

Figure 32:
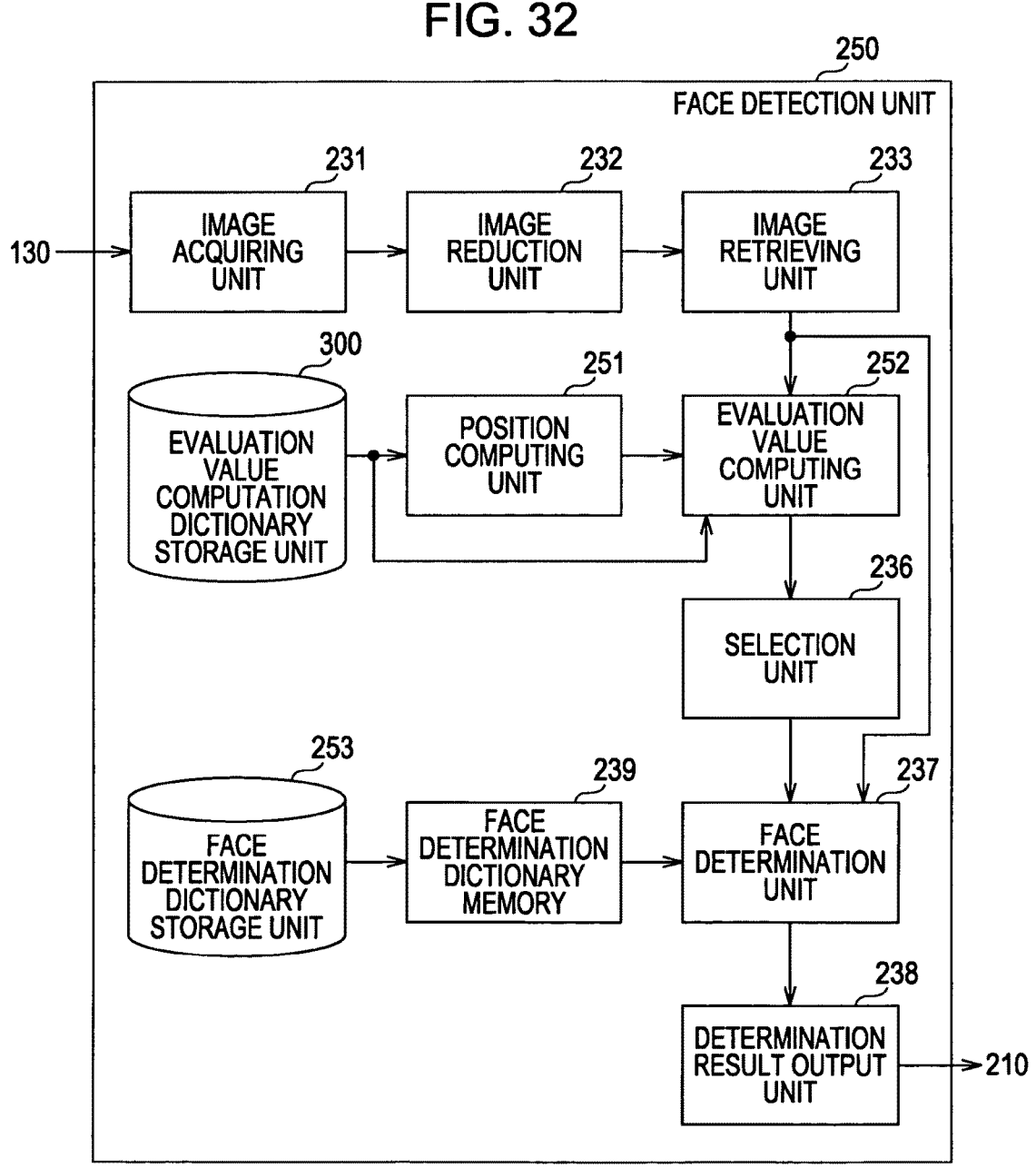
FIG. 32 is a functional block diagram of a face detection unit according to a second embodiment of the present invention.

FIG. 32 is a functional block diagram of the face detection unit 250 according to a second embodiment of the present invention. The face detection unit 250 is a modification of the face detection unit 230 shown in FIG. 3. The face detection unit 250 includes a position computing unit 251, an evaluation value computing unit 252, and a face determination dictionary storage unit 253. The same numbering will be used in describing the same components of the face detection unit 230 of FIG. 32 as are utilized in describing FIG. 3, and the descriptions thereof are not repeated.

The position computing unit 251 converts the values in the position 1 (u1, v1) 302 and the position 2 (u2, v2) 303 of the evaluation value computation dictionary 301 stored in the evaluation value computation dictionary storage unit 300 and obtains two new points. The position computing unit 251 then outputs, to the evaluation value computing unit 252, the two converted points and the values in the threshold value (θ) 304 and the weight (α1 to α9) 305 of the evaluation value computation dictionary 301 in association with the two original points. For example, the position computing unit 251 applies affine transformation to the values in the position 1 (u1, v1) 302 and the position 2 (u2, v2) 303 using the center point of the image to be determined as a reference and computes two new points. For example, in this affine transformation, a 90-degree clockwise rotation transformation, a 90-degree counterclockwise rotation transformation, and a 180-degree rotation transformation are performed. The method for computing a position is described in more detail below with reference to FIGS. 33A to 33D and FIGS. 34A to 34D.

The evaluation value computing unit 252 computes an evaluation value for each of the objects using the values in the evaluation value computation dictionary 301 stored in the evaluation value computation dictionary storage unit 300, the positions of the two points computed by the position computing unit 251, and the values corresponding to the two points. The cases in which the position computing unit 251 performs a 90-degree clockwise rotation, a 90-degree counterclockwise rotation transformation, and a 180-degree rotation are discussed below. In such cases, the number of evaluation values computed by the evaluation value computing unit 252 is increased to four times the number of evaluation values computed using only the evaluation value computation dictionary 301. The evaluation value for each of the objects computed in this manner is output to the selection unit 236. Since the method for computing the evaluation value for each of the objects is similar to that of the first embodiment of the present invention, the description thereof is not repeated.

The face determination dictionary storage unit 253 stores a face determination dictionary used for determining whether a particular object is contained in an image output from the image retrieving unit 233 in association with the object. In addition, the face determination dictionary storage unit 253 supplies the stored face determination dictionary to the face determination dictionary memory 239. The face determination dictionary storage unit 253 stores a face determination dictionary for each of a plurality of objects corresponding to objects for which the evaluation values are computed by the evaluation value computing unit 252. Note that the objects for which face detection dictionaries are stored in the face determination dictionary storage unit 253 are described in more detail below with reference to FIGS. 33A to 33D.

Figure 33A:
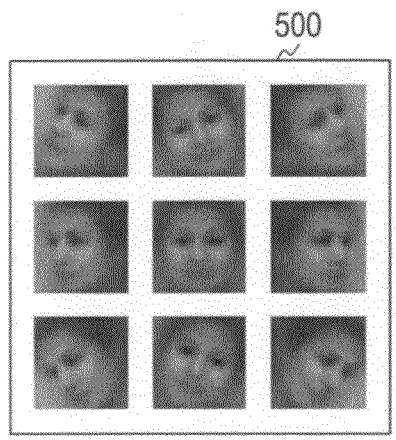
FIGS. 33A to 33D illustrate examples of objects for which evaluation values can be computed by computing the positions of two new points using a position computing unit according to the second embodiment of the present invention.
Figure 33C:
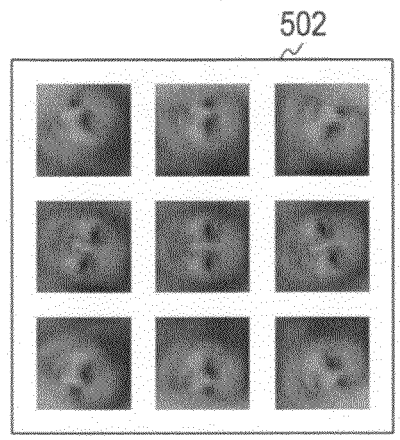
Figure 33B:
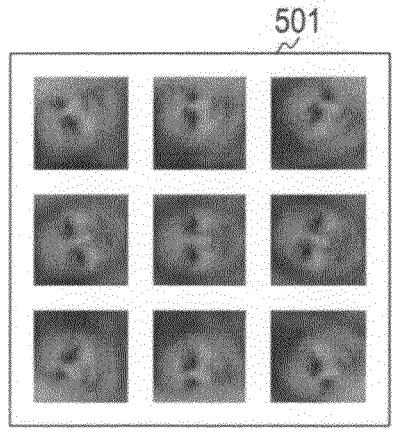
Figure 33D:
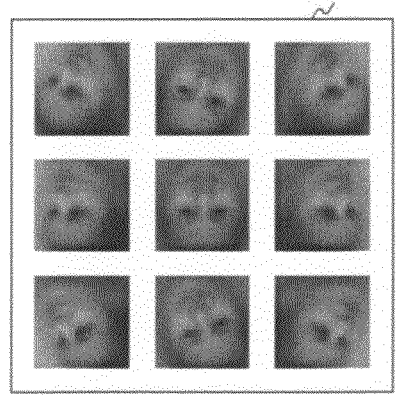

FIGS. 33A to 33D illustrate examples of objects for which the evaluation values can be computed by computing the positions of two new points using the position computing unit 251 according to the second embodiment of the present invention. FIG. 33A illustrates an object image group 500 including face images representing the objects for which the evaluation values can be computed using the evaluation value computation dictionary 301 shown in FIG. 20B. Note that the object image group 500 corresponds to the object image group 600 shown in FIG. 20A. FIGS. 33B to 33D illustrate object image groups 501 to 503 including face images for which the evaluation values can be computed by converting the values in the position 1 (u1, v1) 302 and the position 2 (u2, v2) 303 contained in the evaluation value computation dictionary 301 shown in FIG. 20B.

As described in the first embodiment of the present invention, by using the evaluation value computation dictionary 301 shown in FIG. 20B, the evaluation values relating to nine faces turned in different directions can be computed at the same time. At that time, for example, the positions of two points contained in the position 1 (u1, v1) 302 and the position 2 (u2, v2) 303 of the evaluation value computation dictionary 301 are rotated by 90 degrees in the counterclockwise direction about the center of the image to be determined. Thereafter, the above-described evaluation computing process is performed using the positions of the two points after rotation and the values in the threshold value ($\theta$) 304 and the weight ($\alpha 1$ to $\alpha 9$) 305 contained in the evaluation value computation dictionary 301 stored in association with the two points. In this way, for example, the evaluation values of the objects corresponding to the face images included in the object image group 501 shown in FIG. 33B can be computed at the same time.

Similarly, for example, the positions of two points contained in the position 1 (u1, v1) 302 and the position 2 (u2, v2) 303 of the evaluation value computation dictionary 301 are rotated by 90 degrees in the clockwise direction about the center of the image to be determined. Thereafter, the above-described evaluation computing process is performed using the positions of the two points after rotation. In this way, for example, the evaluation values of the objects corresponding to the face images included in the object image group 502 shown in FIG. 33C can be computed.

Similarly, for example, the positions of two points contained in the position 1 (u1, v1) 302 and the position 2 (u2, v2) 303 of the evaluation value computation dictionary 301 are rotated by 180 degrees about the center of the image to be determined. Thereafter, the above-described evaluation computing process is performed using the positions of the two points after rotation. In this way, for example, the evaluation values of the objects corresponding to the face images included in the object image group 503 shown in FIG. 33D can be computed.

Such conversion of the positions is performed by the position computing unit 251. In addition, affine transformation in which the positions of two points are converted using a 3×3 matrix (an affine matrix) in a two-dimensional coordinate system can be used. Furthermore, the face determination dictionary storage unit 253 stores face determination dictionaries relating to the objects corresponding to the face images included in the object image groups 500 to 503 shown in FIGS. 33A to 33D, respectively. That is, the face determination dictionary storage unit 253 stores four times the number of face determination dictionaries stored in the face determination dictionary storage unit 310 according to the first embodiment of the present invention.

FIGS. 34A to 34D illustrate an example of a relationship between the positions of the two new points computed by the position computing unit 251 according to a second embodiment of the present invention and the evaluation value computed using the positions of the two new points. Note that the evaluation values S1 to S9 shown in each of FIGS. 34A to 34D correspond to the evaluation values S1 to S9 shown in FIG. 23B.

Figure 34A:
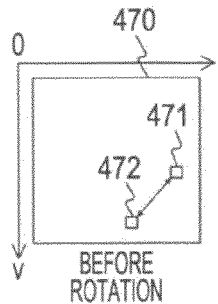

FIG. 34A illustrates an example of an evaluation value computed using the two original positions. Note that, in FIG. 34A, an image to be determined 470 for which an evaluation value is computed and one of combinations of two points in the image to be determined 470 (the positions 471 and 472 of the two points) are shown.

Figure 34B:
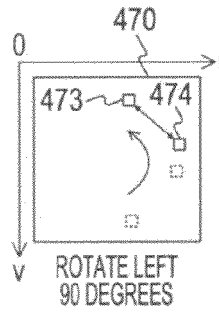

FIG. 34B illustrates the positions of two points after a 90-degree counterclockwise rotation is performed by the position computing unit 251 and an example of an evaluation value computed using the two points. For example, the positions 471 and 472 of two points shown in FIG. 34A are converted into positions 473 and 474 of two new points obtained through a 90-degree counterclockwise rotation performed by the position computing unit 251. By using the converted positions of two points in this manner, the evaluation value shown in FIG. 34B is computed by the evaluation value computing unit 252.

Figure 34C:
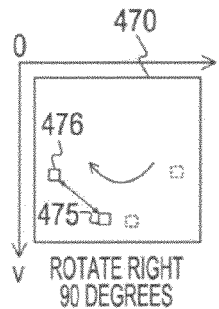

FIG. 34C illustrates the positions of two points after a 90-degree clockwise rotation is performed by the position computing unit 251 and an example of an evaluation value computed using the two points. For example, the positions 471 and 472 of two points shown in FIG. 34A are converted into positions 475 and 476 of two new points obtained through a 90-degree clockwise rotation performed by the position computing unit 251. By using the converted positions of two points in this manner, the evaluation value shown in FIG. 34C is computed by the evaluation value computing unit 252.

Figure 34D:
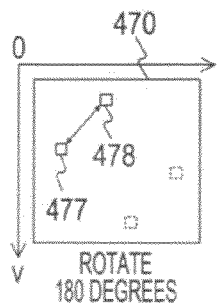

FIG. 34D illustrates the positions of two points after a 180-degree rotation is performed by the position computing unit 251 and an example of an evaluation value computed using the two points. For example, the positions 471 and 472 of two points shown in FIG. 34A are converted into positions 477 and 478 of two new points obtained through a 180-degree rotation performed by the position computing unit 251. By using the converted positions of two points in this manner, the evaluation value shown in FIG. 34D is computed by the evaluation value computing unit 252.

In this way, by converting the positions of two points contained in the position 1 (u1, v1) 302 and the position 2 (u2, v2) 303 of the evaluation value computation dictionary 301 and using the two converted positions, an evaluation value can be computed. Accordingly, by using a single evaluation value computation dictionary, more evaluation values can be computed at high speed. For example, as shown in FIGS. 34A to 34D, by performing three types of conversion using the evaluation value computation dictionary 301 that allows nine evaluation values to be computed at the same time, 36 evaluation values can be computed. Consequently, the storage capacity for an evaluation value computation dictionary can be reduced.

In addition, the evaluation values S1 to S9 computed in this manner shown in FIGS. 34A to 34D are output to the selection unit 236. Thereafter, as in the first embodiment of the present invention, the evaluation values greater than or equal to the threshold value 447 are extracted from among nine evaluation values S1 to S9. Subsequently, the selection unit 236 selects the three high evaluation values from the top and outputs the information regarding the objects corresponding to the selected evaluation values (the selected object information) to the face determination unit 237. For example, as the top three high evaluation values greater than or equal to the threshold value 447, evaluation values corresponding to images 611 and 614 shown in FIG. 34B and an image 631 shown in FIG. 34D are selected. In the bar graphs of FIGS. 34A to 34D, the selected evaluation values are shown by bars with diagonal lines.

Figure 35A:
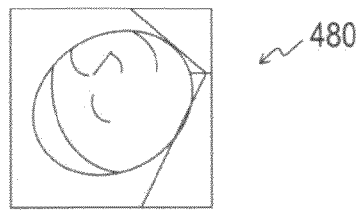

FIGS. 35A to 35E are schematic illustrations of the processing flow of a face detection process performed by the face detection unit 250 according to the second embodiment of the present invention. FIG. 35A illustrates an image to be determined 480 retrieved by the image retrieving unit 233. FIG. 35B illustrates the object image groups 500 to 503 including images representing the faces to be subjected to an evaluation value computing process. Note that, as in FIGS. 34A to 34D, evaluation values corresponding to the images 601 to 609, the images 611 to 619, the images 621 to 629, and the images 631 to 639 included in the object image groups 501 to 503 are computed by the evaluation value computing unit 252. For example, as in FIGS. 34A to 34D, the evaluation values are computed, and the evaluation values corresponding to the images 611, 614, and 631 shown in FIG. 35B are selected.

FIG. 35C illustrates a relationship between the images 611, 614, and 631 representing the faces corresponding to the evaluation values selected by the selection unit 236 and evaluation values SS10 to SS12 computed by the face determination unit 237 for the image to be determined 480. Note that a face detection process performed by the face determination unit 237 is similar to that illustrated in the first embodiment of the present invention. Accordingly, the description thereof is not repeated. For example, among the evaluation values SS10, SS11, and SS12 corresponding to the images 611, 614, and 631 shown in FIG. 35B, respectively, the highest value that is greater than or equal to the threshold value 448 is the evaluation value SS10. Accordingly, it is determined that the face contained in the image 611 that corresponds to the evaluation value SS10 is contained in the image to be determined 480.

Figure 36:
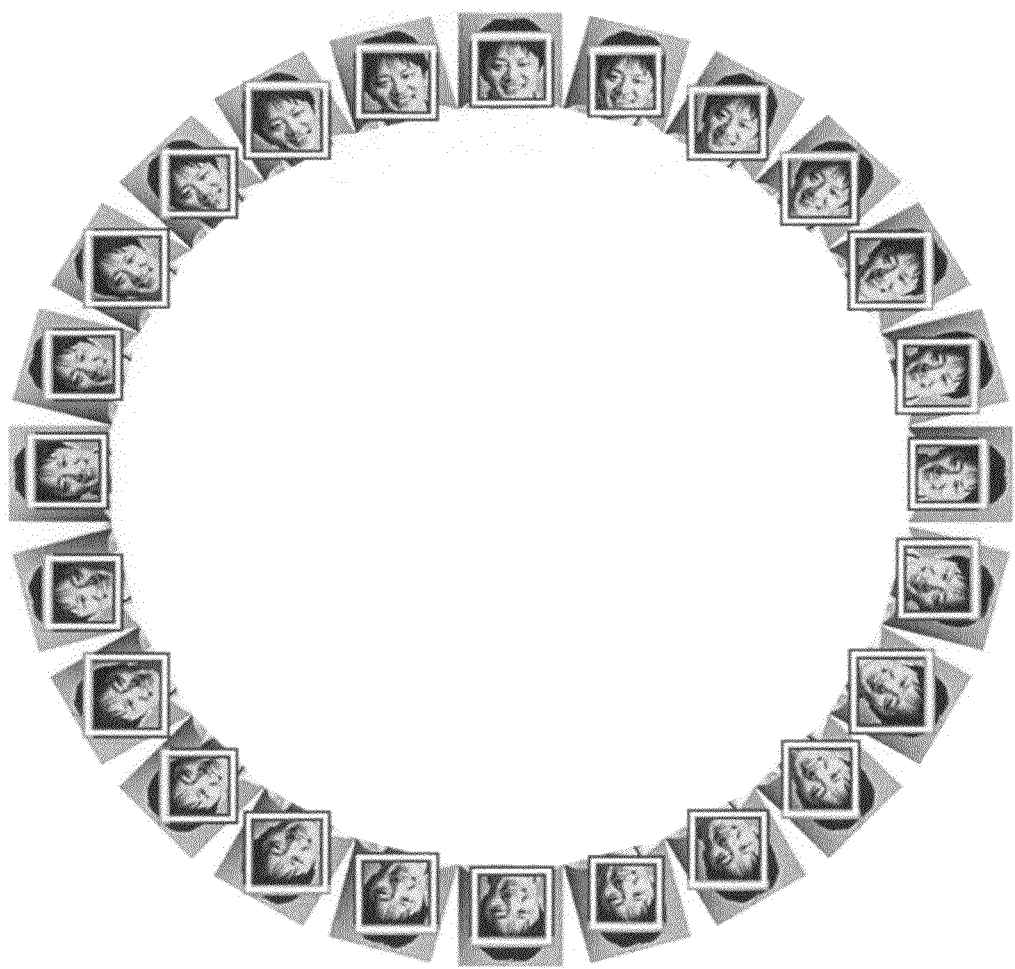
FIG. 36 illustrates a face that can be detected by the face detection unit according to the second embodiment of the present invention and an example of the detection result.

FIG. 36 illustrates a face that can be detected by the face detection unit 250 according to the second embodiment of the present invention and an example of the detection result. In FIG. 36, the faces including a front face and arranged in a circle at predetermined angular intervals are shown. In addition, the detection result is shown by a frame surrounding the face. As shown in FIG. 36, according to the second embodiment of the present invention, even the faces tilted at various angles can be detected. For example, the faces tilted at various angles, such as the face of a person lying on the ground, the face of a person stood on his/her head, and the face of the image captured while the image pickup apparatus 100 is tilted, can be detected. In addition, while FIG. 36 illustrates only the faces tilted from the front face in a roll direction, the faces tilted in a pitch or yaw direction can be detected in a similar manner.

As described above, according to the second embodiment of the present invention, by simply converting the positions of two points in the same dictionary, the evaluation values relating to objects several times the number of objects contained in the dictionary can be computed at high speed. Accordingly, the evaluation values can be significantly efficiently computed and, therefore, the object detection accuracy can be increased.

If, for example, it is supposed that the case in which the image of a subject turned upside down is captured by the image pickup apparatus 100 rarely occurs, a 180-degrees rotation may not be performed by the position computing unit 251. In addition, the face determination dictionary storage unit 253 may store only a face determination dictionary corresponding to an object for which the evaluation value can be computed using the evaluation value computation dictionary 301. Thereafter, like the above-described evaluation value computing process, the face determination unit 237 may compute the evaluation values using the values in the face determination dictionary or the converted values of the positions of two points.

Exemplary Operation of Image Pickup Apparatus

Figure 37:
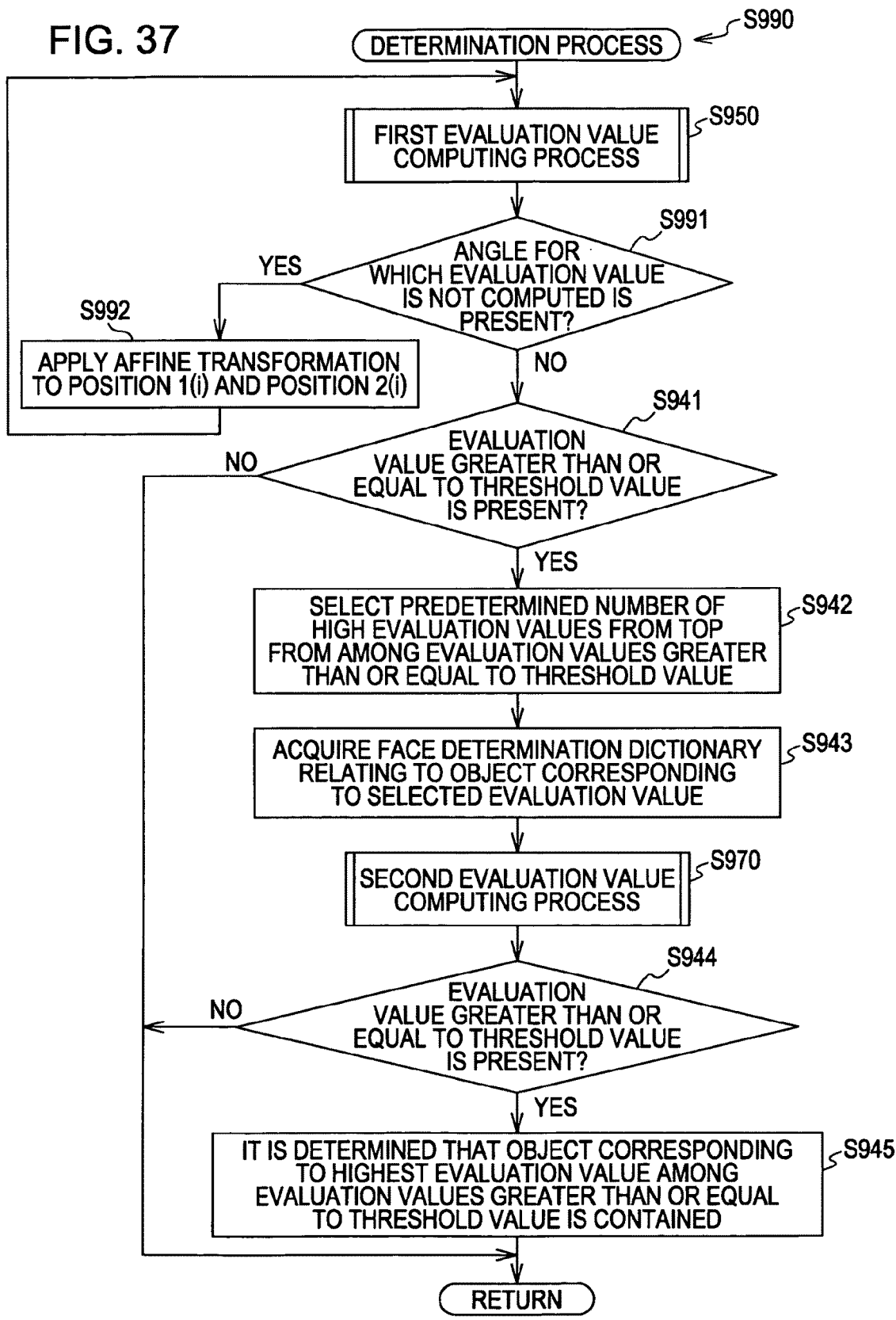
FIG. 37 is a flowchart illustrating the processing flow of a face detection process performed by an image pickup apparatus according to the second embodiment of the present invention.

FIG. 37 is a flowchart illustrating the processing flow of a face detection process performed by the image pickup apparatus 100 according to the second embodiment of the present invention. This example is a modification of the face detection process according to the first embodiment of the present invention (the processing in step S940 shown in FIG. 29). Accordingly, the same numbering will be used in describing the same processing in FIG. 37 as are utilized in describing FIG. 29, and the descriptions thereof are not repeated.

First, the evaluation value computing unit 252 performs a first evaluation value computing sub-process (step S950). Subsequently, it is determined whether an angle for which the evaluation value has not been computed is present (step S991). For example, when the evaluation values are computed for a 90-degree clockwise rotation, a 90-degree counterclockwise rotation, and a 180-degree rotation, it is determined whether the evaluation values have been computed for these angles. If an angle for which the evaluation value has not been computed is present (step S991), the position computing unit 251 converts the positions of two points contained in the position 1 (u1, v1) 302 and the position 2 (u2, v2) 303 of the evaluation value computation dictionary 301. The position computing unit 251 then computes the positions of the two new points (step S992). Thereafter, the positions of the two points after conversion and the values contained in the threshold value (θ) 304 and the weight (α1 to α9) 305 of the evaluation value computation dictionary 301 are output to the evaluation value computing unit 252. In this way, first evaluation value computing sub-process is performed (step S950).

While the embodiments of the present invention have been described with reference to detection of an object using a luminance difference value between two points in an image to be determined, the embodiments of the present invention can be applied to a method for detecting an object using a difference value of other physical quantity in two areas of an image to be determined. For example, the embodiments of the present invention may be applied to an object detection method in which the evaluation value is computed using rectangle features of two areas inside an image to be determined, and an object is detected. Alternatively, the embodiments of the present invention may be applied to an object detection method in which the evaluation value is computed using a difference value of a predetermined class of a luminance histogram between two areas inside an image to be determined, and an object is detected. In such a case, for example, histograms of oriented gradients (HOG), which is one of types of a luminance histogram, can be used as the histogram. The histograms of oriented gradients are generated by dividing a target image into a plurality of areas and computing the luminance gradient strength and the luminance gradient direction for each of the areas.

In addition, while the embodiments of the present invention have been described with reference to the faces turned in different directions, the embodiments of the present invention are applicable to objects other than a face. For example, the embodiments of the present invention can be applied to one or more animals or pets (mammals, reptiles, or fishes), motor vehicles, or airplanes serving as objects. In such a case, various types of the same object (e.g., a dog turned in different directions) or a mixture of a plurality of objects (e.g., dogs and cats) may serve as the object.

In addition, the embodiments of the present invention can be applied to a variety of image pickup apparatuses in digital video cameras (e.g., camera-equipped recorders) or cell phones having an image capturing function. Furthermore, the embodiments of the present invention can be applied to an object detecting apparatus, such as a face detection apparatus that is connected to a security camera and that detects the face of a person.

The above-described embodiments are only examples for realizing the present invention. As described above, the key features or elements of the embodiments have correspondence to key features or elements of the claimed subject matter. However, it should not be construed that the technical scope of the invention is limited thereto. It will be recognized by those skilled in the art that changes or modifications may be made to the above-described embodiments without departing from the broad inventive concepts of the invention.

In addition, the processing procedures described in the embodiments of the present invention can be considered as a method including the processing procedures. Furthermore, the processing procedures may be considered as a program for allowing a computer to execute the processing procedures or a recording medium storing the program. Examples of the recording medium include a compact disc (CD), a MiniDisc (MD), a digital versatile disk (DVD), a memory card, and a Blu-ray disc (trade name).

It should be understood by those skilled in the art that various modifications, combinations, sub-combinations and alterations may occur depending on design requirements and other factors insofar as they are within the scope of the appended claims or the equivalents thereof.

What is claimed is:

1. An object detecting apparatus comprising:
   an evaluation information storage unit configured to store evaluation information used for computing an evaluation value for each of a plurality of objects, the evaluation value being used for evaluating which one of the objects is contained in an image;
   a determination information storage unit configured to store determination information used for determining whether a respective object is contained in the image in association with each of the objects;
   a computing unit configured to compute the evaluation value for each of the objects by extracting features from a plurality of areas of the image using the evaluation information and comparing two extracted features; and
   a determination unit configured to determine whether the object is contained in the image using the determination information associated with the object relating to the evaluation value that satisfies a predetermined condition among evaluation values computed for the objects,
   wherein the plurality of objects are faces of a person turned in different directions such that the faces are of the same person.

2. The object detecting apparatus according to claim 1, wherein the determination information is information used for computing an evaluation value used when features are extracted from the plurality of areas of the image and it is determined whether the object is contained in the image or not by comparing two features among the extracted features, and wherein the evaluation information is information used for computing an evaluation value of the object using a condition less strict than a condition used for computing an evaluation value of the object using the determination information.

3. The object detecting apparatus according to claim 1, further comprising:
   a selection unit configured to select a predetermined number of evaluation values having high values from the top from among the evaluation values computed for the objects;
   wherein the determination unit makes the determination using the determination information associated with the objects relating to the selected evaluation values.

4. The object detecting apparatus according to claim 3, wherein the selection unit selects, from among the predetermined number of the evaluation values, the evaluation value higher than a predetermined value as the evaluation value that satisfies the predetermined condition.

5. The object detecting apparatus according to claim 1, wherein the evaluation information includes a combination of two positions in the image, a threshold value, and a weight value assigned to each of the objects, and wherein the computing unit extracts a feature from two areas of the image identified by the two positions, compares the extracted feature with the threshold value, computes the weight value using the comparison result for each of the objects, and computes the evaluation value for each of the object.

6. The object detecting apparatus according to claim 5, further comprising:
   a position computing unit configured to compute, by rotating the two positions contained in the evaluation information about the center of the image by a predetermined angle, two new positions in the image for computing evaluation values relating to a plurality of new objects; and a second determination information storage unit configured to store determination information relating to each of the plurality of new objects after the object is rotated by the predetermined angle in association with the new object;

wherein the computing unit performs computation of the weight value for two areas of the image identified by the two new computed positions for each of the new objects and computes the evaluation value for each of the new objects, and wherein the determination unit determines whether the object is contained in the image using the determination information associated with the object relating to the evaluation value that satisfies the predetermined condition among the evaluation values computed for the objects and the evaluation values computed for the new objects.

7. The object detecting apparatus according to claim 5, wherein the computing unit computes a difference value between the features extracted from the two areas, compares the computed difference value with the threshold value, and computes the evaluation value on the basis of the comparison result.

8. The object detecting apparatus according to claim 5, wherein the evaluation information includes a plurality of the combinations, and wherein the computing unit computes the evaluation value for each of the objects by sequentially computing the weight value of the object for each of the combinations.

9. The object detecting apparatus according to claim 1, wherein the determination unit extracts features from a plurality of areas of the image using the determination information associated with the object relating to the evaluation value that satisfies the predetermined condition, compares two of the extracted features, computes an evaluation value for each of the objects associated with the evaluation values that satisfy the predetermined condition, and determines whether the object is contained in the image on the basis of the evaluation value.

10. The object detecting apparatus according to claim 9, wherein the determination unit determines that the object relating to the highest evaluation value among the evaluation values of the objects computed using the determination information is contained in the image.

11. The object detecting apparatus according to claim 10, wherein the determination unit determines that the object relating to the highest evaluation value is contained in the image if the highest evaluation value is higher than a predetermined value.

12. An image pickup apparatus comprising:
an evaluation information storage unit configured to store evaluation information used for computing an evaluation value, the evaluation value being used for evaluating which one of a plurality of objects is contained in an image;

a determination information storage unit configured to store determination information used for determining whether ire an object is contained in the image in association with each of the objects;

an image pickup unit configured to generate captured images by capturing images of a subject;

an image retrieving unit configured to retrieve the image to be determined from captured images;

a computing unit configured to compute the evaluation value for each of the objects by extracting features from a plurality of areas of the image to be determined using the evaluation information and comparing two extracted features; and a determination unit configured to determine whether the object is contained in the image to be determined using determination information associated with the object relating to the evaluation value that satisfies a predetermined condition among the evaluation values computed for the objects, wherein the plurality of objects are faces of a person turned in different directions such that the faces are of the same person.

13. An object detecting method comprising the steps of:
computing, for each of a plurality of objects, an evaluation value for evaluating whether an object is contained in an image by extracting features from a plurality of areas of the image using evaluation information and comparing two extracted features; and determining whether the object is contained in the image using determination information associated with the object relating to the evaluation value that satisfies a predetermined condition among evaluation values computed for the objects, wherein the plurality of objects are faces of a person turned in different directions such that the faces are of the same person.

14. A non-transitory computer readable storage medium having stored thereon a program comprising:
program code for causing a computer to execute the steps of computing, for each of a plurality of objects, an evaluation value for evaluating whether an object is contained in an image by extracting features from a plurality of areas of the image using evaluation information and comparing two extracted features and determining whether the object is contained in the image using determination information associated with the object relating to the evaluation value that satisfies a predetermined condition among evaluation values computed for the objects, wherein the plurality of objects are faces of a person turned in different directions such that the faces are of the same person.

\* \* \* \* \*